US010950230B2

(12) United States Patent
Kojima

(10) Patent No.: US 10,950,230 B2
(45) Date of Patent: Mar. 16, 2021

(54) INFORMATION PROCESSING DEVICE AND INFORMATION PROCESSING METHOD

(71) Applicant: Panasonic Intellectual Property Corporation of America, Torrance, CA (US)

(72) Inventor: Yoshihiro Kojima, Hyogo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 15/790,132

(22) Filed: Oct. 23, 2017

(65) Prior Publication Data
US 2018/0122376 A1 May 3, 2018

Related U.S. Application Data

(60) Provisional application No. 62/414,179, filed on Oct. 28, 2016, provisional application No. 62/414,091, filed on Oct. 28, 2016.

(30) Foreign Application Priority Data

Feb. 28, 2017 (JP) .............. JP2017-036626
Jun. 23, 2017 (JP) .............. JP2017-123437

(51) Int. Cl.
G10L 15/18 (2013.01)
G10L 15/22 (2006.01)
(Continued)

(52) U.S. Cl.
CPC .......... *G10L 15/22* (2013.01); *G06F 16/3344* (2019.01); *G06F 40/30* (2020.01);
(Continued)

(58) Field of Classification Search
CPC ...... G06F 17/27; G06F 16/3344; G06F 40/30; G10L 15/30; G10L 15/1815
See application file for complete search history.

(56) References Cited

U.S. PATENT DOCUMENTS 5,168,566 A * 12/1992 Kuki ............... G06F 9/3851
712/E9.053
6,408,277 B1 * 6/2002 Nelken ............ G06F 9/4881
705/7.15
(Continued)

FOREIGN PATENT DOCUMENTS

JP 2012-133243 7/2012
JP 2013-064777 4/2013

*Primary Examiner* — Feng-Tzer Tzeng
(74) *Attorney, Agent, or Firm* — Greenblum & Bernstein, P.L.C.

(57) ABSTRACT

Included are a speech recognition result obtainer that obtains a speech recognition result, which is text data obtained by speech recognition processing, a priority obtainer that obtains priority corresponding to each of a plurality of tasks that are each identified by a plurality of dialog processing based on the speech recognition result; and a dialog processing controller that causes a plurality of devices to perform the distributed execution of the plurality of dialog processing mutually different from each other. The dialog processing controller provides, based on the priority, control information in accordance with a task identified by the distributed execution to an executer that operates based on the control information.

13 Claims, 20 Drawing Sheets

| OPERATION COMMAND | OPERATION CONTENTS | OPERATION CONTENT INFORMATION |
|---|---|---|
| TURN ON THE TV | TURN ON THE POWER OF THE TV | ( Device: TV, Operation: Power on ) |
| TURN OFF THE TV | TURN OFF THE POWER OF THE TV | ( Device: TV, Operation: Power off ) |
| RAISE THE VOLUME | RAISE THE VOLUME BY 3 LEVELS | ( Device: TV, Operation: Turn the volume up → +3 ) |
| VOLUME UP | | |
| SWITCH TO CHANNEL 2 | SELECT CHANNEL 2 | ( Device: TV, Operation: Select 2 channel ) |
| PROGRAM SCHEDULE | DISPLAY PROGRAM SCHEDULE | ( Device: TV, Operation: Display EPG ) |
| ... | ... | ... |

(51) Int. Cl.
  *G10L 15/30* (2013.01)
  *G06F 16/33* (2019.01)
  *G06F 40/30* (2020.01)

(52) U.S. Cl.
  CPC .......... *G10L 15/18* (2013.01); *G10L 15/1815* (2013.01); *G10L 15/30* (2013.01); *G10L 2015/223* (2013.01)

(56) References Cited

U.S. PATENT DOCUMENTS

| | | | |
|---|---|---|---|
| 2004/0117189 A1* | 6/2004 | Bennett | G09B 7/00 704/270.1 |
| 2011/0178969 A1* | 7/2011 | Falchuk | G06N 20/00 706/45 |
| 2012/0162540 A1 | 6/2012 | Ouchi et al. | |
| 2013/0155904 A1* | 6/2013 | Dokania | H04W 4/38 370/255 |

* cited by examiner

FIG. 2

| OPERATION COMMAND | OPERATION CONTENTS | CONTROL INFORMATION | RESPONSE INFORMATION |
|---|---|---|---|
| TURN ON THE AIR CONDITIONER | TURN THE POWER OF THE AIR CONDITIONER ON, AND PERFORM AUTOMATIC OPERATION | ( Air conditioner, On, Auto ) | TURNING ON AIR CONDITIONER |
| START THE AIR CONDITIONER | | | |
| COOL AIR, PLEASE | TURN THE POWER OF THE AIR CONDITIONER ON, AND PERFORM COOLING OPERATION | ( Air conditioner, On, Cooling ) | TURNING ON COOLER |
| SET TEMPERATURE TO 28 DEGREES | SET TEMPERATURE OF AIR CONDITIONER TO 28 DEGREES | ( Air conditioner, Temperature, 28 ) | SETTING TEMPERATURE TO 28 DEGREES |
| LOWER THE TEMPERATURE | LOWER THE TEMPERATURE SETTING OF THE AIR CONDITIONER BY 1 DEGREE | ( Air conditioner, Temperature, -1 ) | LOWERING TEMPERATURE BY 1 DEGREE |
| ... | ... | ... | ... |

FIG. 3

| OPERATION COMMAND | OPERATION CONTENTS | CONTROL INFORMATION | RESPONSE INFORMATION |
|---|---|---|---|
| TURN ON THE TV | TURN ON THE POWER OF THE TV | (Power On) | TURNING ON TV |
| TURN OFF THE TV | TURN OFF THE POWER OF THE TV | (Power Off) | TURNING OFF TV |
| RAISE THE VOLUME | RAISE THE VOLUME BY 3 LEVELS | (Volume, +3) | RAISING VOLUME BY 3 LEVELS |
| VOLUME UP | | | |
| SWITCH TO CHANNEL 2 | SELECT CHANNEL 2 | (Channel, 2) | SWITCHING TO CHANNEL 2 |
| PROGRAM SCHEDULE | DISPLAY PROGRAM SCHEDULE | (EPG, On) | DISPLAYING PROGRAM SCHEDULE |
| ... | ... | ... | ... |

FIG. 4

| ORDER OF ACTION | TIMING TO START ACTION | TIMING TO START EXECUTION OF PROCESSING RESULTS |
|---|---|---|
| FIRST DIALOG PROCESSING UNIT 5 | AFTER RECEIVING RECOGNIZED TEXT STRING FROM RECOGNITION CONTROL UNIT 2 | AFTER RECEIVING RESULTS FROM FIRST DIALOG PROCESSING UNIT 5 |
| THIRD DIALOG PROCESSING UNIT 23 | AFTER RECEIVING RECOGNIZED TEXT STRING FROM RECOGNITION CONTROL UNIT 2 | AFTER RECEIVING RESULTS FROM FIRST DIALOG PROCESSING UNIT 5 AND THIRD DIALOG PROCESSING UNIT 23 |
| SECOND DIALOG PROCESSING UNIT 6 | AFTER RECEIVING RESULTS OF DIALOG PROCESSING AT THIRD DIALOG PROCESSING UNIT 23 | AFTER RECEIVING RESULTS FROM FIRST DIALOG PROCESSING UNIT 5, SECOND DIALOG PROCESSING UNIT 6, AND THIRD DIALOG PROCESSING UNIT 23 |
| FOURTH DIALOG PROCESSING UNIT 24 | AFTER RECEIVING RESULTS OF DIALOG PROCESSING AT THIRD DIALOG PROCESSING UNIT 23 | AFTER RECEIVING RESULTS FROM FIRST DIALOG PROCESSING UNIT 5, SECOND DIALOG PROCESSING UNIT 6, THIRD DIALOG PROCESSING UNIT 23, AND FOURTH DIALOG PROCESSING UNIT 24 |

FIG. 11

| OPERATION COMMAND | OPERATION CONTENTS | OPERATION CONTENT INFORMATION |
|---|---|---|
| TURN ON THE AIR CONDITIONER | TURN THE POWER OF THE AIR CONDITIONER ON, AND PERFORM AUTOMATIC OPERATION | (Device: Air conditioner, Operation: Power on, Operation Mode: Auto) |
| START THE AIR CONDITIONER | | |
| COOL AIR, PLEASE | TURN THE POWER OF THE AIR CONDITIONER ON, AND PERFORM COOLING OPERATION | (Device: Air conditioner, Operation: Power on, Operation Mode: Cooling) |
| SET TEMPERATURE TO 28 DEGREES | SET TEMPERATURE OF AIR CONDITIONER TO 28 DEGREES | (Device: Air conditioner, Operation: Set the temperature → 28) |
| LOWER THE TEMPERATURE | LOWER THE TEMPERATURE SETTING OF THE AIR CONDITIONER BY 1 DEGREE | (Device: Air conditioner, Operation: Turn the temperature down → −1) |
| ... | ... | ... |

FIG. 12

| OPERATION COMMAND | OPERATION CONTENTS | OPERATION CONTENT INFORMATION |
|---|---|---|
| TURN ON THE TV | TURN ON THE POWER OF THE TV | (Device: TV, Operation: Power on) |
| TURN OFF THE TV | TURN OFF THE POWER OF THE TV | (Device: TV, Operation: Power off) |
| RAISE THE VOLUME | RAISE THE VOLUME BY 3 LEVELS | (Device: TV, Operation: Turn the volume up → +3) |
| VOLUME UP | | |
| SWITCH TO CHANNEL 2 | SELECT CHANNEL 2 | (Device: TV, Operation: Select 2 channel) |
| PROGRAM SCHEDULE | DISPLAY PROGRAM SCHEDULE | (Device: TV, Operation: Display EPG) |
| ... | ... | ... |

FIG. 13

| OPERATION CONTENT INFORMATION | CONTROL INFORMATION | RESPONSE INFORMATION |
|---|---|---|
| ( Device: TV, Operation: Power on ) | ( TV, On ) | "TURNING ON TV" |
| ( Device: TV, Operation: Power off ) | ( TV, Off ) | "TURNING OFF TV" |
| ( Device: TV, Operation: Turn the volume up → +3 ) | ( TV, On, Turn the volume up, +3 ) | "RAISING VOLUME BY 3 LEVELS" |
| ( Device: TV, Operation: Select 2 channel ) | ( TV, On, Select 2 channel ) | "SWITCHING TO CHANNEL 2" |
| ( Device: TV, Operation: Display EPG ) | ( TV, On, Display EPG ) | "DISPLAYING PROGRAM SCHEDULE" |
| ... | ... | ... |

FIG. 14

| OPERATION CONTENT INFORMATION | CONTROL INFORMATION | RESPONSE INFORMATION |
|---|---|---|
| ( Device: Air conditioner, Operation: Power on, Operation Mode: Auto ) | ( Air conditioner, On, Auto ) | "TURNING ON AIR CONDITIONER" |
| ( Device: Air conditioner, Operation: Power on, Operation Mode: Cooling ) | ( Air conditioner, On, Cooling ) | "TURNING ON COOLER" |
| ( Device: Air conditioner, Operation: Set the temperature → 28 ) | ( Air conditioner, On, Cooling, Set the temperature, 28 ) | "SETTING TEMPERATURE TO 28 DEGREES" |
| ( Device: Air conditioner, Operation: Turn the temperature down → -1 ) | ( Air conditioner, On, Cooling, Turn the temperature down, -1 ) | "LOWERING TEMPERATURE BY 1 DEGREE" |
| ... | ... | ... |

FIG. 15

| ORDER OF ACTION | TIMING TO START ACTION | TIMING TO START EXECUTION OF PROCESSING RESULTS |
|---|---|---|
| FIRST DIALOG PROCESSING UNIT 5 | AFTER RECEIVING RECOGNIZED TEXT STRING FROM RECOGNITION CONTROL UNIT 2 | AFTER RECEIVING RESULTS FROM FIRST DIALOG PROCESSING UNIT 5 |
| THIRD SPEECH UNDERSTANDING UNIT 32 | AFTER RECEIVING RECOGNIZED TEXT STRING FROM RECOGNITION CONTROL UNIT 2 | |
| THIRD RESPONSE GENERATION UNIT 17 | AFTER RECEIVING PROCESSING RESULTS OF THIRD SPEECH UNDERSTANDING UNIT 32 | AFTER RECEIVING RESULTS FROM FIRST DIALOG PROCESSING UNIT 5 AND THIRD RESPONSE GENERATION UNIT 17 |
| SECOND DIALOG PROCESSING UNIT 6 | AFTER RECEIVING PROCESSING RESULTS OF THIRD RESPONSE GENERATION UNIT 17 | AFTER RECEIVING RESULTS FROM FIRST DIALOG PROCESSING UNIT 5, SECOND DIALOG PROCESSING UNIT 6, AND THIRD SPEECH UNDERSTANDING UNIT 32 |
| FOURTH SPEECH UNDERSTANDING UNIT 33 | AFTER RECEIVING PROCESSING RESULTS OF THIRD RESPONSE GENERATION UNIT 17 | |
| FOURTH RESPONSE GENERATION UNIT 18 | AFTER RECEIVING PROCESSING RESULTS OF FOURTH SPEECH UNDERSTANDING UNIT 33 | AFTER RECEIVING RESULTS FROM FIRST DIALOG PROCESSING UNIT 5, SECOND DIALOG PROCESSING UNIT 6, THIRD RESPONSE GENERATION UNIT 17, AND FOURTH RESPONSE GENERATION UNIT 18 |

INFORMATION PROCESSING DEVICE AND INFORMATION PROCESSING METHOD

BACKGROUND

1. Technical Field

The present disclosure relates to an information processing device and an information processing method.

2. Description of the Related Art

Conventional electronic devices having speech recognition functions have performed speech recognition processing where speech uttered by a user is recognized, and dialog processing where actions of the device are identified from the results of the recognition, within the device. Accordingly, the vocabulary that can be handled in the speech recognition processing and dialog processing has been limited to around several hundred words, due to limitations in calculation capabilities of the device, memory capacity, and so forth.

As of recent, faster network speeds and technological advances in cloud computing have enabled speech recognition processing to be implemented at cloud servers. This has realized speech recognition processing regarding a vast vocabulary containing hundreds of thousands of words. A device needs to be connected to a network in order to perform such speech recognition processing using such a cloud server, and there has been a problem in that the speed of response from the server will be slow if the communication environment of the network is slow, and if traffic is heavy due to multiple devices accessing the server.

Accordingly, there has recently been proposed a client-server type speech recognition system where tasks that require a speedy response with a limited vocabulary that can be recognized are subjected to speech recognition processing in the device. On the other hand, tasks that demand a great vocabulary that can be recognized, even if there is a tradeoff that the response speed is somewhat slow, are partially or entirely subjected to speech recognition processing at the cloud server.

Examples of such client-server type speech recognition systems are disclosed in Japanese Unexamined Patent Application Publication Nos. 2012-133243 and 2013-64777. In Japanese Unexamined Patent Application Publication No. 2012-133243, the object of operation is a television receiver (hereinafter, also referred to simply as "TV"). In this invention, speech recognition and dialog processing is performed at the device side regarding device operation tasks such as selecting TV channels, adjusting volume, and so forth. On the other hand, part of speech recognition processing is performed at the server side regarding information search tasks, such as searching for program titles, cast, and so forth, with dialog processing being performed at the device side.

Japanese Unexamined Patent Application Publication No. 2013-64777 assumes a mobile terminal such as a cellular phone, smartphone, or the like, as the device. Speech recognition and dialog processing is performed at the device side regarding device operation tasks such as placing calls, using a mail app, activating a camera app, and so forth, in this invention. On the other hand, speech recognition processing is performed at the server side regarding information search tasks such as transit route searches, eatery searches, application searches, and so forth, while dialog processing is performed at the device side.

SUMMARY

In one general aspect, the techniques disclosed here feature an information processing device including a speech recognition result obtainer that obtains a speech recognition result, which is text data obtained by speech recognition processing, a priority obtainer that obtains priority corresponding to each of a plurality of tasks that are each identified by a plurality of dialog processing based on the speech recognition result, and a dialog processing controller that causes a plurality of devices to perform distributed execution of the plurality of dialog processing mutually different from each other, wherein the dialog processing controller provides, based on the priority, control information in accordance with a task identified by the distributed execution to an executer that operates based on the control information.

According to the present disclosure, an information processing device and an information processing method that can accurately execute tasks desired by a user, from speech uttered by the user, can be provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram illustrating an example of dialog rules used by a third dialog processing unit of a dialog processing server according to the first embodiment;

FIG. 3 is a diagram illustrating an example of dialog rules used by a first dialog processing unit of a device according to the first embodiment;

FIG. 4 is a diagram illustrating an example of an action schedule according to the first embodiment;

FIG. 11 is a diagram illustrating an example of speech understanding rules used by a third speech understanding unit of a speech understanding processing server according to the third embodiment;

FIG. 12 is a diagram illustrating an example of speech understanding rules used by a first speech understanding unit of a device according to the third embodiment;

FIG. 13 is a diagram illustrating an example of response generation rules used by a first response generation unit of the device according to the third embodiment;

FIG. 14 is a diagram illustrating an example of response generation rules used by a third response generation unit of the device according to the third embodiment;

FIG. 15 is a diagram illustrating an example of an action schedule according to the third embodiment;

DETAILED DESCRIPTION

Figure 1:
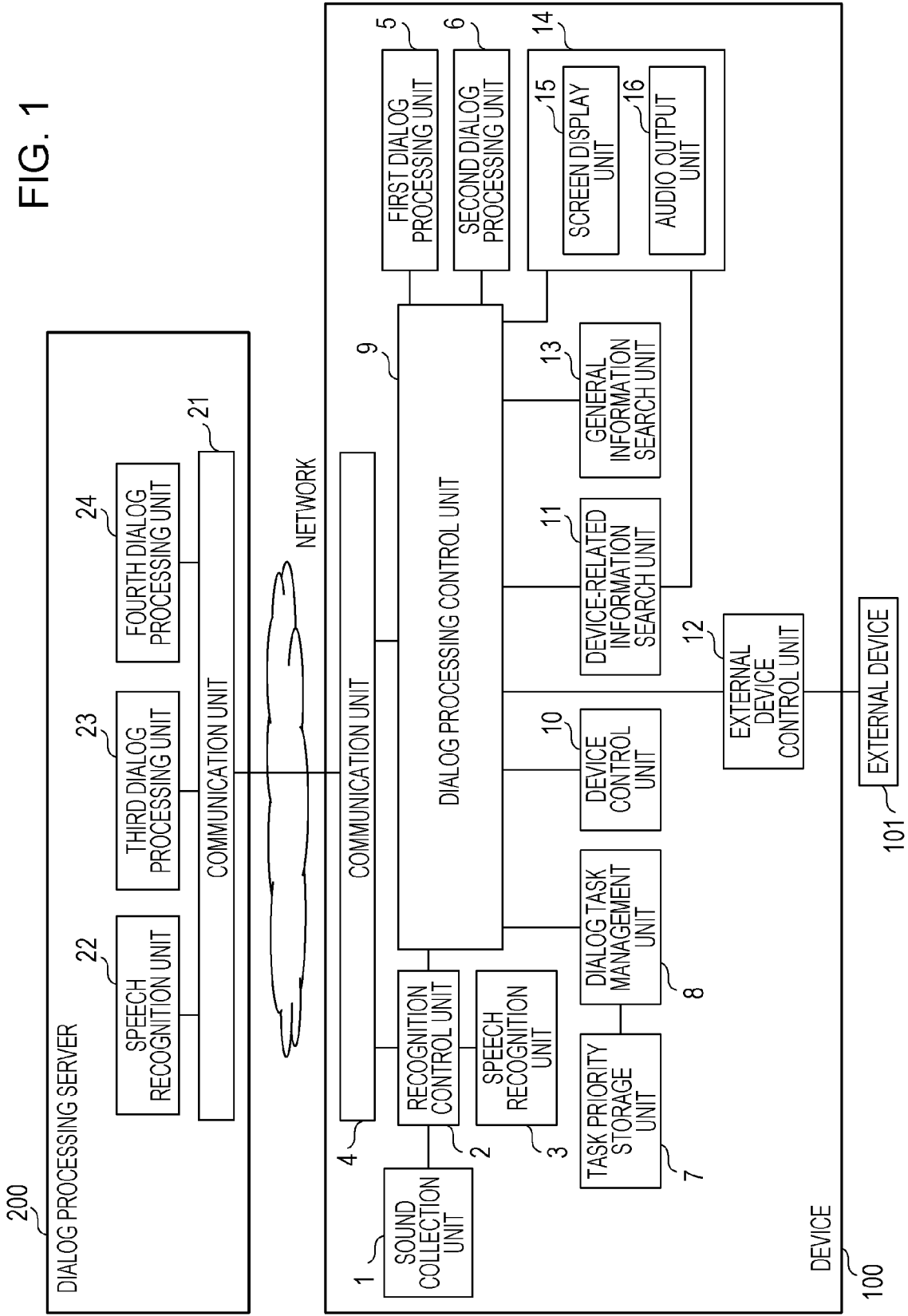
FIG. 1 is a block diagram of a dialog processing control system according to a first embodiment.

Underlying Knowledge Forming Basis of the Present Disclosure

Dialog processing, where actions of a device, which is the object of operation, are identified from a recognized text string that has been obtained as the result of recognition of speech uttered by a user, is performed at the device side in a conventional client-server type recognition system. Accordingly, there has been a problem in that the number of operation commands and the number of speech patterns (expressions) usable in dialog processing are limited, due to limited calculation capabilities, memory capacity, and so forth, of the device. That is to say, there has been a problem in that, even if the speech of the user is accurately recognized by speech recognition processing at the cloud server, the results of the recognition (text string) do not match an operation command or speech pattern in the dialog processing in the device, so that task that the user intended cannot be executed, meaning that the user cannot operate the device as intended.

Accordingly, there has been proposed a method where dialog processing is performed at the cloud server in the same way as with the speech recognition processing, enabling a vast vocabulary (number of operation commands, number of speech patterns, etc.) to be processed. However, there is a problem, the same as with the case of performing speech recognition at the cloud server, in that in a case of performing dialog processing at a cloud server, the speed of response from the server is considerably slower as compared to processing within the device, if the communication environment of the network is slow or traffic is heavy due to multiple devices accessing the server.

Thus, a client-server type dialog processing system where tasks that require a speedy response with a limited vocabulary that can be recognized are subjected to dialog processing in the device, and tasks that demand a great vocabulary that can be recognized, even if there is a tradeoff that the response speed is somewhat slow, are partially or entirely subjected to dialog processing at the cloud server, can be conceived as a method to solve the above problem. In such a system, the recognized text string is input to dialog processing at the device and the server at almost the same time, to reduce the response time from the server. Thus, the time until obtaining the final dialog processing results can be reduced.

However, dialog processing where multiple different tasks are processed with regard to the recognized text string resulting from the speech recognition is often performed in recent speech recognition devices and systems, as noted in Japanese Unexamined Patent Application Publication No. 2012-133243. For example, in the dialog processing in Japanese Unexamined Patent Application Publication No. 2012-133243, determination is first made regarding whether or not the recognized text string is an operation command (function) for the device that is the object of operation, or an application. In a case of an operation command, the relevant device operation is executed. Otherwise, an app search using the recognized text string and a search keyword is performed at an app market, and the result is presented to the user. That is to say, dialog processing, where two different tasks of a device operation task and app search task, is performed in Japanese Unexamined Patent Application Publication No. 2012-133243.

Note that the above-described dialog processing regarding the multiple different tasks is performed only within the device in Japanese Unexamined Patent Application Publication No. 2012-133243. Using a client-server type system is desirable for dialog processing of a vast vocabulary, as described above. However, in a case of performing dialog processing regarding multiple tasks at the same time at both the device side and server side, there is a need to decide which of the results of dialog processing at the device side and the results of dialog processing obtained from the server should be given priority in execution. One method would be to simply execute the valid results received first, but in a case where the order of priority of individual tasks in the dialog processing differ between the device side and server side, this method is not necessarily appropriate.

For example, a case will be considered where there are three tasks, of which the priorities differ. The system is configured such that two sets of dialog processing are consecutively performed at the device side, regarding the task of which the priority is first and the task of which the priority is third, and dialog processing is performed at the server side regarding the task of which the priority is second. In this case, the results of dialog processing are preferably executed in the order of priority, but the dialog process of the two tasks at the device side may end before the dialog processing at the server side, depending on the content of the speech by the user, the network environment, or the like. That is to say, a problem occurs where the task of which the priority is third is executed first at the device side without the task of which the priority is second being executed at the server side.

A specific example will be described regarding the above problem, with a TV as the device. The task of which the priority is first is basic operations such as selecting channels of the TV, adjusting volume, and so forth, and the task of which the priority is second is operations of an external device connected to the TV by a network, such as operating a device such as an air conditioner, lighting, or the like, for example. The task of which the priority is third is an information search regarding the TV, such as program information searching by program title or cast name, for example. In this arrangement, dialog processing regarding basic operations regarding the TV, of which the priority is first, and information searching regarding the TV, of which the priority is third, is performed at the TV side. Dialog processing regarding operation of external devices, of which the priority is second, is performed at the server side. The reason that dialog processing regarding operation of external devices of which the priority is second is performed at the server side, is in order to enable processing regarding a wide variety of operation commands for various devices.

If the user says "turn on the air conditioner" and this speech is correctly recognized in the above system, the recognized text string, "turn on the air conditioner", is output as the speech recognition result. Next, the recognized text string, "turn on the air conditioner", is input to the dialog processing at the device side and the server side at the same time. At the device side, dialog processing of basic operation tasks for the TV is performed first, and confirmation is made regarding whether or not the recognized text string is a basic operation command for the TV. The recognized text string, "turn on the air conditioner", is not included in basic operation commands of the TV, so next, dialog processing of an information search task relating to the TV is performed. That is to say, an information search (TV schedule search, Internet search, etc.) is performed using the recognized text string, "turn on the air conditioner", as a keyword.

On the other hand, dialog processing of operation tasks of external devices is performed at the server side, and confirmation is made regarding whether or not the recognized text string is an operation command for an external device connected to the TV. The recognized text string, "turn on the air conditioner", matches an operation command for the air conditioner, so information to perform an operation of turning on the power to the air conditioner, is transmitted from the server to the device.

In light of the overall system, the power operation of the air conditioner, which is the operation task of the external device of which the priority is second, should be executed before the information search task relating to the TV, of which the priority is third. However, there is a possibility that the two sets of dialog processing at the device side (basic operation task of the TV and information search task regarding the TV) will end in a shorter time than the dialog processing of the external device operation task at the server side, depending on the network environment and so forth, as described above. That is to say, depending on the network environment, displaying of the results of the keyword search for "turn on the air conditioner" may be displayed before the operation of turning on the power for the air conditioner, meaning that the user cannot operate the devices as intended.

The present disclosure provides an information processing device and information processing method that enables optimal dialog processing control to be performed, when performing dialog processing of multiple tasks having different priorities in parallel at a device side and a server side in a client-server type dialog processing control system, based on the priority of the tasks.

A dialog processing control device acting as an information processing device according to an aspect of the present disclosure includes: a speech recognition result obtainer that obtains a speech recognition result, which is text data obtained by speech recognition processing; a priority obtainer that obtains priority corresponding to each of a plurality of tasks that are each identified by a plurality of dialog processing based on the speech recognition result; and a dialog processing controller that causes a plurality of devices to perform distributed execution of the plurality of dialog processing mutually different from each other, wherein the dialog processing controller provides, based on the priority, control information in accordance with a task identified by the distributed execution to an executer that operates based on the control information.

For example, in this configuration, a dialog task management unit decides an action schedule for each task identified by dialog processing between dialog processors at the side of the devices that process the tasks and a dialog processing server, based on the priority of the tasks stored in a task priority storage. The dialog processing controller controls actions of each dialog processing between the dialog processors at the side of the devices and the side of the server, based on the action schedule. Accordingly, even in a case where dialog processing including multiple different tasks with different priorities are processed at the same time in parallel at the device and server side, execution of the tasks can be controlled in an order corresponding to the priority of the tasks. That is to say, in a case where dialog processing of tasks with high priority is performed at the server side and dialog processing of tasks with low priority is performed at the device side, at the same time by parallel processing, the processing results at the server side can be executed in accordance with the priority rather than the processing results at the device side, even if the response of the processing results from the server is delayed due to effects of the network environment.

A dialog processing control device according to another aspect of the present disclosure may further include a device state manager that manages a state of a controlled device that is controlled by the executer. The priority obtainer may obtain the priority based on the state managed by the device state manager.

For example, in this configuration as well, the dialog processing controller controls actions of each dialog processing between the dialog processors at the side of the devices and the side of the server, based on the action schedule obtained from the dialog task manager. Note however, that in this configuration, the device state manager manages the device state, and the dialog task manager decides the action schedule of the dialog processors at the side of the devices and each dialog processing at the dialog processing server based on the device state, in addition to the priority of each task stored in the task priority storage. Accordingly, the action schedule of dialog processing by the devices and dialog processing server can be dynamically changed in accordance with the state of the device that is the object of operation. That is to say, optimal processing can be performed in accordance with the device state, and overall processing time can be reduced. For example, at least one of the speech recognition result obtainer, the priority obtainer and the dialog processing controller may include a processor.

These general or specific aspects may be realized by a system, method, integrated circuit, computer program, or computer-readable recording medium such as a CD-ROM, and may be realized by any combination of a system, method, integrated circuit, computer program, and recording medium.

The following is a detailed description of embodiments with reference to the drawings. Note that the embodiments described below are all general or specific examples. Accordingly, values, shapes, materials, components, layout and connection state of components, steps, the order of steps, and so forth illustrated in the following embodiments, are only exemplary, and do not restrict the present disclosure. Components in the following embodiments which are not included in an independent Claim indicating a highest order concept are described as optional components.

First Embodiment

FIG. 1 is a block diagram illustrating the configuration of a dialog processing control system according to a first embodiment. The dialog processing control system includes a device 100 that is the object of operation by speech (dialog processing control device), an external device 101 connected by network to the device 100, by a wired local area network (LAN), wireless LAN, or the like, and a dialog processing server 200 that performs speech recognition processing and dialog processing in the cloud, as illustrated in FIG. 1. For example, the device 100 is a TV, and the external device 101 is all devices connected by network to the TV. The external device 101 includes an air conditioner connected to the TV by ECHONET (a registered trademark), in addition to conventional audio-video (AV) devices such as hard disk recorders, AV amps, and so forth, connected by High-Definition Multimedia Interface (HDMI, a registered trademark) or LAN. The external device 101 may further include lighting, white goods, and so forth. The dialog processing control device is an example of an information processing device.

The dialog processing server 200 includes a communication unit 21, a speech recognition unit 22, a third dialog processing unit 23, and a fourth dialog processing unit 24. The communication unit 21 exchanges information such as speech, recognized text strings, dialog processing results, and so forth, with the device 100. The speech recognition unit 22 recognizes speech uttered by the user, that has been input via the communication unit 21. The speech recognition unit 22 also transmits recognized text strings, which are the results of speech recognition, to the device 100 via the communication unit 21. The speech recognition unit 22 speech recognition processing in the cloud, so a vast vocabulary containing hundreds of thousands of words can be recognized. Conventional dynamic programming (DP) matching, Hidden Markov model (HMM), n-gram, and so forth may be used as methods for recognizing speech. The dialog processing server 200 is included in an external device.

The third dialog processing unit 23 and the fourth dialog processing unit 24 subject the recognized text string input from the device 100 via the communication unit 21 to dialog processing for predetermined different tasks. The third dialog processing unit 23 and fourth dialog processing unit 24 then transmit the results of dialog processing to the device 100 via the communication unit 21.

In the present embodiment, the third dialog processing unit 23 processes operation tasks of the external device 101 connected to the device 100, and the fourth dialog processing unit 24 processes general Internet information search tasks, such as weather forecast, news, and so forth. In this case, the third dialog processing unit 23 confirms whether or not the recognized text string corresponds to any of the operation commands of the external device 101, and if corresponding, control information to execute the operation of the corresponding external device is output. The fourth dialog processing unit 24 extracts a search keyword from the recognized text string, and control information for executing an Internet information search by the search keyword is output. The dialog processing units 23 and 24 also output response information for presenting results of the dialog processing to the user, besides each control information.

The third dialog processing unit 23 includes memory (omitted from illustration) for example, the memory storing operation commands for the external device 101, control information that is the result of dialog processing, and response information, and dialog rules. Note that it is not necessary for the third dialog processing unit 23 to include the aforementioned memory, and that it is sufficient for the dialog processing server 200 to include this memory. The dialog processing of the third dialog processing unit 23 is performed based on these dialog rules. For example, an example of dialog rules used by the third dialog processing unit 23 in a case where the external device 101 is an air conditioner is illustrated in FIG. 2. The third dialog processing unit 23 reads the dialog rules in FIG. 2 from the memory, and performs dialog processing based on the dialog rules that have been read out. An operation command is words where the user instructs the external device 101 to perform an operation, such as "turn on the air conditioner", "cool air, please", and so forth.

The operation contents are contents of operations that the external device 101 actually performs with regard to the operation command. For example, the operation contents corresponding to the operation command "cool air, please" are "turn the power of the air conditioner on, and perform cooling operations". Multiple operation commands may be registered to each of the operation contents. For example, two phrases "turn on the air conditioner" and "start the air conditioner" are registered as to the operation contents "turn the power of the air conditioner on, and perform cooling operations" in FIG. 2.

Control information is network commands for causing the external device 101 that is the object of operation to execute the operation contents, and is transmitted from the device 100 to the external device 101 via network. For example, in a case of causing the air conditioner to execute the operation contents of "turn on the air conditioner" in the example in FIG. 2, a network command (Air conditioner, On, Auto) is transmitted from the device 100 to the external device 101.

Response information is information presented to the user using audio and a screen when a recognized text string is accepted as an operation command illustrated in FIG. 2. For example, in a case where a recognized text string is accepted as the operation command "cool air, please" illustrated in FIG. 2, the response information "turning on cooler" is presented to the user.

The dialog processing by the fourth dialog processing unit 24 is also performed based on dialog rules, in the same way. However, there is only one dialog rule, and the processing contents thereof are to "extract a search keyword from a recognized text string, and search Internet information using that search keyword". The above dialog rule may be embedded in the fourth dialog processing unit 24 as an action that the fourth dialog processing unit 24 performs. Alternatively, the fourth dialog processing unit 24 may include memory (omitted from illustration), with the above dialog rule being stored in this memory. In this case, the fourth dialog processing unit 24 reads the dialog rule out from the memory, and performs dialog processing based on the dialog rule that has been read out. Note that it is not necessary for the fourth dialog processing unit 24 to include the aforementioned memory, and that it is sufficient for the dialog processing server 200 to include this memory. Control information output from the fourth dialog processing unit 24 as the result of dialog processing is a network command to cause a general information search unit 13 of the device 100 to search Internet information by a search keyword extracted from the recognized text string, for example. An example of response information is "displaying search results on screen" or the like.

The device 100 includes a sound collection unit 1, a recognition control unit 2, a speech recognition unit 3, a communication unit 4, a first dialog processing unit 5, a second dialog processing unit 6, a task priority storage unit 7, a dialog task management unit 8, a dialog processing control unit 9, a device control unit 10, a device-related information search unit 11, an external device control unit 12, the general information search unit 13, a graphical user interface (GUI) output unit 14, a screen display unit 15, and an audio output unit 16.

The configuration of the device 100 will now be described in detail. The sound collection unit 1 is a microphone that inputs speech uttered by a user, and outputs the input speech to the recognition control unit 2 as audio data. The recognition control unit 2 outputs the audio data input from the sound collection unit 1 to the speech recognition unit 3 at the device side, and also outputs this audio data to the speech recognition unit 22 of the dialog processing server 200 via the communication unit 4. The recognition control unit 2 decides a recognized text string based on speech recognition results obtained from the speech recognition unit 3 or the speech recognition unit 22. The speech recognition unit 3 recognizes the speech uttered by the user and input from the recognition control unit 2, and outputs a recognized text string to the recognition control unit 2 as a speech recognition result. The communication unit 4 exchanges information such as audio data, recognized text strings, dialog processing results, and so forth, with the dialog processing server 200. The speech recognition unit 3 can only recognize a small vocabulary containing around several hundred words, since speech recognition processing is performed in the device, but the response speed thereof is considerably faster than that of the speech recognition unit 22 of the dialog processing server 200. Conventional DP matching, HMM, n-gram, and so forth, may be used as methods for recognizing speech.

The first dialog processing unit 5 and the second dialog processing unit 6 perform dialog processing of predetermined different tasks, based on the recognized text string decided by the recognition control unit 2. In the present embodiment, the first dialog processing unit 5 processes basic operation tasks of the device 100, and the second dialog processing unit 6 processes information search tasks relating to the device 100. In this case, the first dialog processing unit 5 confirms whether a recognized text string corresponds to any of basic operation commands of the device 100, and if corresponding, outputs control information for executing the corresponding device operation. The second dialog processing unit 6 extracts a search keyword from the recognized text string, and outputs control information for executing a search of device related information using that search keyword. The first dialog processing unit 5 and second dialog processing unit 6 also each output response information for presenting dialog processing results to the user, besides outputting the control information.

The first dialog processing unit 5 includes memory (omitted from illustration) for example. Correlations between operation commands of the device 100, control information obtained dialog processing results, and response information, are stored in this memory as dialog rules. Note that it is not necessary for the first dialog processing unit 5 to include this memory; it is sufficient for the device 100 to include this memory. The dialog processing of the first dialog processing unit 5 is performed based on these dialog rules. FIG. 3 illustrates an example of dialog rules used by the first dialog processing unit 5 in a case where the device 100 is a TV. The first dialog processing unit 5 reads the dialog rules illustrated in FIG. 3 from the memory, for example, and performs dialog processing based on the dialog rules that have been read out. The operation commands are words that the user speaks to instruct the device 100 to perform operations, such as "turn on the TV", "program schedule", and so forth, as illustrated in FIG. 3.

The operation contents are the contents of the operation that the device 100 actually performs in response to the operation command. For example, the operation content corresponding to the operation command "turn on the TV" is "turn the power of the TV on". Multiple operation commands may be registered for each operation content. For example, two phrases, "raise the volume" and "volume up", are registered to the operation content "raise volume by 3 levels" in FIG. 3.

Control information is device control commands to cause the device 100 that is the object of operation to execute the operation contents, and is information input to the device control unit 10. For example, in a case of causing the TV to execute the operation content "turn on the TV" in the example in FIG. 3, a device control command (Power On) is input to the device control unit 10.

Response information is information presented to the user using audio and a screen when a recognized text string is accepted as an operation command illustrated in FIG. 3. For example, in a case where a recognized text string is accepted as the operation command "turn off the TV" illustrated in FIG. 3, the response information "turning off TV" is presented to the user.

The dialog processing by the second dialog processing unit 6 is also performed based on dialog rules, in the same way. However, there is only one dialog rule, and the processing contents thereof are to "extract a search keyword from a recognized text string, and search device-related information using that search keyword". For example, if the device 100 is a TV, and the device-related information is program information of a program schedule, the processing contents are to "extract a search keyword relating to program information from a recognized text string, and search program information from the program schedule using that search keyword". The above dialog rule may be embedded in the second dialog processing unit 6 as an action that the second dialog processing unit 6 performs. Alternatively, the second dialog processing unit 6 may include memory (omitted from illustration), with the above dialog rule being stored in this memory. In this case, the second dialog processing unit 6 reads the dialog rule out from the memory, and performs dialog processing based on the dialog rule that has been read out. Note that it is not necessary for the second dialog processing unit 6 to include the aforementioned memory, and that it is sufficient for the device 100 to include this memory. Control information output from the second dialog processing unit 6 as the result of dialog processing is a device control command to cause the device-related information search unit 11 of the device 100 to search program information from a program schedule by a search keyword extracted from the recognized text string, for example. An example of response information is "displaying search results of program schedule on screen" or the like.

The task priority storage unit 7 stores the priorities of tasks processed by the first dialog processing unit 5 and second dialog processing unit 6 of the device 100 and the third dialog processing unit 23 and fourth dialog processing unit 24 of the dialog processing server 200. For example, in the present embodiment, the priority of basic operation tasks of the device 100 is set to "1", the priority of search tasks for device-related information to "3", the priority of external device operation tasks for the dialog processing server 200 to "2", and the priority of general information search tasks using the Internet to "4". Note that the smaller the priority number is, the higher the priority is.

The dialog task management unit 8 obtains priorities corresponding to each of the multiple tasks identified by the multiple sets of dialog processing priority based on speech recognition results. That is to say, the dialog task management unit 8 decides action schedules for the first dialog processing unit 5 and second dialog processing unit 6 of the device 100, and the third dialog processing unit 23 and fourth dialog processing unit 24 of the dialog processing server 200, based on the priority of the tasks stored in the task priority storage unit 7. Now, an action schedule for the dialog processing units defines how, and in which order, the dialog processing units (e.g., the first dialog processing unit 5, second dialog processing unit 6, third dialog processing unit 23, and fourth dialog processing unit 24) of the device 100 and dialog processing server 200 are to operate. For example, the information of the order in which the dialog processing units are to operate, the timing to start action of the dialog processing units, and the timing to execute processing results of the dialog processing units, is described in the action schedule, as illustrated in FIG. 4. An action schedule is an example of an execution schedule.

Here, the timing to start operation of the dialog processing units means the timing at which the recognized text string is input to the dialog processing units. Also, the timing to execute processing results of the dialog processing units means the timing at which control signals to execute the processing results of the dialog processing units are output to the components that actually execute the processing results, such as the device control unit 10, device-related information search unit 11, external device control unit 12, and general information search unit 13, for example.

For example, the timing at which the processing results of the first dialog processing unit 5 are executed is the timing of executing a basic operation task of the device 100. The timing at which the processing results of the second dialog processing unit 6 are executed is the timing of executing a device-related information search task. In the same way, the timing at which the processing results of the third dialog processing unit 23 are executed is the timing of executing an operation task of the external device 101, and the timing at which the processing results of the fourth dialog processing unit 24 are executed is the timing of executing a general Internet information search task.

The dialog processing control unit 9 controls the actions of the first dialog processing unit 5 and second dialog processing unit 6 of the device 100, based on the action schedule decided at the dialog task management unit 8. The dialog processing control unit 9 also controls the actions of the third dialog processing unit 23 and fourth dialog processing unit 24 of the dialog processing server 200 via the communication unit 4 and communication unit 21.

Specifically, the dialog processing control unit 9 performs processing of inputting recognized text strings to each of the dialog processing units based on the action schedule, and causing dialog processing to start. The dialog processing control unit 9 also performs processing of outputting processing results obtained from the dialog processing units to one of the device control unit 10, device-related information search unit 11, external device control unit 12, and general information search unit 13, based on the action schedule. For example, control information for operating the device 100, which has been obtained from the first dialog processing unit 5 of the device 100, is output to the device control unit 10. Control information obtained from the second dialog processing unit 6 of the device 100, for executing a device-related information search, is output to the device-related information search unit 11. Control information for operating the external device 101, which has been obtained from the third dialog processing unit 23 of the dialog processing server 200 via the communication unit 4, is output to the external device control unit 12. Control information for executing a general Internet information search, which has been obtained from the fourth dialog processing unit 24 of the dialog processing server 200 via the communication unit 4, is output to the general information search unit 13. The device control unit 10, device-related information search unit 11, external device control unit 12, and general information search unit 13 each correspond to an execution unit.

The device control unit 10 executes operations of the device 100 based on the control information input from the dialog processing control unit 9. The device-related information search unit 11 executes a device-related information search based on the control information input from the dialog processing control unit 9. The external device control unit 12 executes operation of external devices based on control information input from the dialog processing control unit 9. The general information search unit 13 executes a generate Internet information search task based on control information input from the dialog processing control unit 9.

The GUI output unit 14 has the screen display unit 15 that is a display or the like, and the audio output unit 16 that is a speaker or the like. The screen display unit 15 displays operation results of the device 100 executed by the device control unit 10, operation results of the external device 101 executed by the external device control unit 12, search results of device-related information search for by the device-related information search unit 11, and search results for general Internet information search for by the general information search unit 13. A notification sound is output at the same time from the audio output unit 16, synchronously with the screen display.

The screen display unit 15 also outputs on a screen the response information obtained from the dialog processing units 5, 6, 23, and 24, via the dialog processing control unit 9. In the same way, the audio output unit 16 performs voice synthesis for the response information obtained from the dialog processing units 5, 6, 23, and 24, via the dialog processing control unit 9, and outputs as response audio.

Actions performed by the system in a case where a user utters speech commands related to each of multiple tasks identified by dialog processing (hereinafter, also referred to as "dialog tasks") in the dialog processing control system according to the present embodiment will be described. A specific description will be made by way of an example where the device 100 is a TV and the external device 101 is an air conditioner. In the following description, the TV that is an example of the device 100 will be described as "TV 100", and the air conditioner that is an example of the external device 101 will be described as "air conditioner 101". Accordingly, the tasks of the first dialog processing unit 5 are basic operation tasks such as channel selection, volume adjustment, and so forth, of the TV, the dialog rules thereof being illustrated in FIG. 3. The tasks of the second dialog processing unit 6 are program information searching in a program schedule. The tasks of the third dialog processing unit 23 are operation tasks such as power operation, temperature setting, and so forth, of the air conditioner, the dialog rules thereof being illustrated in FIG. 2. The tasks of the fourth dialog processing unit 24 are searching tasks of general Internet information, such as weather forecast, news, and so forth.

In a case where the user performs speech operation of the TV 100 and air conditioner 101 in the above-described dialog processing control system, the user utters a speech command toward the sound collection unit 1 of the TV 100. For example, in a case where the user wants to operate the volume of the TV, the user may say "raise the volume", or may say "lower the temperature" to lower the temperature set to the air conditioner. In the same way, in a case of performing an information search by voice, if the user wants to search for titles of TV dramas that will be broadcast tomorrow from the TV schedule, the user may say "dramas on tomorrow" or the like, or may say "weather for Tokyo" or the like to search for weather forecasts from the Internet.

Figure 5:
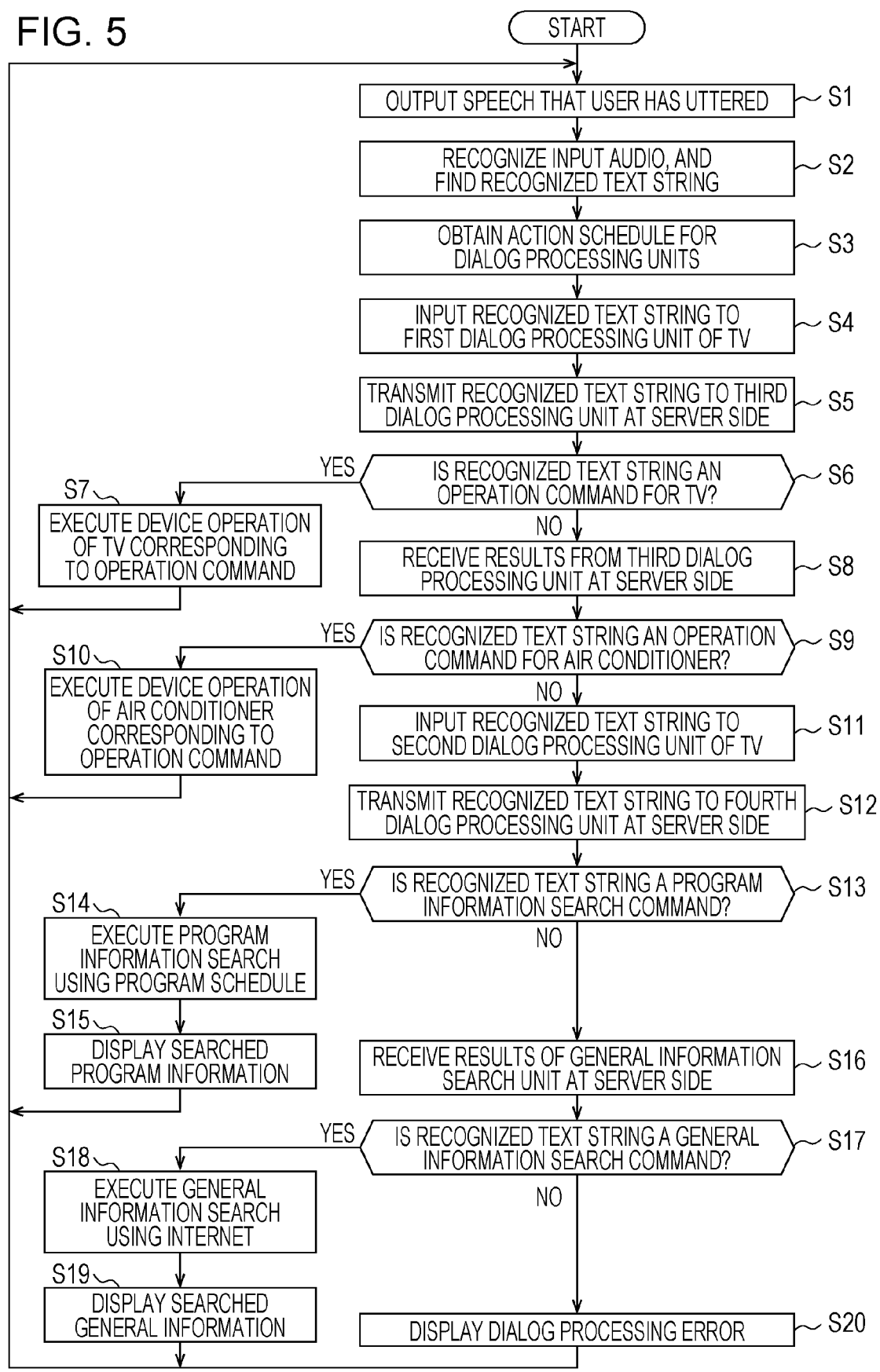
FIG. 5 is a flowchart for describing operations of the dialog processing control system according to the first embodiment.

FIG. 5 is a flowchart illustrating the flow of processing when the user inputs a speech command to the sound collection unit 1 of the device 100. The flow of actions of the dialog processing control system will be described below with reference to FIG. 5.

The sound collection unit 1 of the TV 100 collects the voice of the user, and outputs audio data including the collected voice to the recognition control unit 2 (S1). The recognition control unit 2 causes the speech recognition unit 3 of the TV 100 and the speech recognition unit 22 of the dialog processing server 200 to subject the audio data input from the sound collection unit 1 to speech recognition processing, and finds a recognized text string based on the speech recognition results (S2). Specifically, the following series of actions is performed.

The recognition control unit 2 outputs the audio data input from the sound collection unit 1 to the speech recognition unit 3. At the same time, the recognition control unit 2 also outputs the audio data input from the sound collection unit 1 from the communication unit 4 of the TV 100 to the speech recognition unit 22 of the dialog processing server 200 via the communication unit 21 of the dialog processing server 200.

The speech recognition unit 3 performs speech recognition on the input audio data, and outputs a speech recognition result thereof to the recognition control unit 2. That is to say, the speech recognition unit 3 obtains speech recognition result, which are text data obtained by speech recognition processing. In the same way, the speech recognition unit 22 of the dialog processing server 200 performs speech recognition on the input audio data, and outputs a speech recognition result thereof to the recognition control unit 2 from the communication unit 21 of the dialog processing server 200 via the communication unit 4 of the TV 100. Normally, the speech recognition result from the speech recognition unit 3 of the TV 100 are obtained before the speech recognition result from the speech recognition unit 22 of the dialog processing server 200, so the recognition control unit 2 first confirms the speech recognition result of the speech recognition unit 3. If the speech recognition unit 3 has succeeded in recognition, the recognition control unit 2 outputs a text string that is the speech recognition results to the dialog processing control unit 9. If the speech recognition unit 3 fails in recognition, the recognition control unit 2 then confirms the speech recognition result from the speech recognition unit 22 of the dialog processing server 200. IF the speech recognition unit 22 succeeds in recognition, the recognition control unit 2 outputs a text string that is the speech recognition result to the dialog processing control unit 9. If this recognition fails as well, the recognition control unit 2 presents the user with information to the effect that recognition has failed, using the screen display unit 15 and/or audio output unit 16 of the GUI output unit 14, and prompts the user to speak again.

Upon receiving a recognized text string from the recognition control unit 2, the dialog processing control unit 9 obtains the respective action schedules from each of the dialog processing units, i.e., the first dialog processing unit 5, second dialog processing unit 6, third dialog processing unit 23, and fourth dialog processing unit 24, from the dialog task management unit 8 (S3). Note that the action schedules are decided beforehand by the dialog task management unit 8, based on the priority of the dialog processing tasks stored in the task priority storage unit 7. Information stipulating the actions of the dialog processing units such as described above are described in the action schedule such as illustrated in FIG. 4, for example. The following actions will be described here with reference to the action schedule in FIG. 4.

The dialog processing control unit 9 first inputs the recognized text string obtained from the recognition control unit 2 to the first dialog processing unit 5 of the TV 100 (S4). The dialog processing control unit 9 also transmits the recognized text string from the communication unit 4 of the TV 100 to the communication unit 21 of the dialog processing server 200 at almost the same time, to be input to the third dialog processing unit 23 of the dialog processing server 200 (S5).

The first dialog processing unit 5 performs dialog processing of basic operations of the TV 100, and outputs the processing results thereof to the dialog processing control unit 9. Note that the dialog processing of the first dialog processing unit 5 is performed based on the dialog rules in FIG. 3, as described earlier. Specifically, the first dialog processing unit 5 confirms whether or not the recognized text string that has been input matches any of the device operation commands of the TV described in the dialog rules (S6). In a case of matching (a case of Y in S6), the first dialog processing unit 5 reads out the control information and response information corresponding to that operation command, and outputs to the dialog processing control unit 9. In a case of not matching (a case of N in S6), the first dialog processing unit 5 determines that the input recognized text string is not a basic operation command for the TV 100, and outputs dialog processing rejection information to the dialog processing control unit 9.

In a case where the dialog processing has succeeded at the first dialog processing unit 5, the dialog processing control unit 9 executes the device operation command for the TV 100 that is the result of the dialog processing at the first dialog processing unit 5, based on the action schedule (S7). Specifically, the dialog processing control unit 9 outputs control information obtained from the first dialog processing unit 5 to the device control unit 10, and outputs response information to the screen display unit 15 and/or audio output unit 16 of the GUI output unit 14. The device control unit 10 executes the operation of the TV 100 based on the control information input from the dialog processing control unit 9.

The device control unit 10 also presents the response information input from the dialog processing control unit 9 to the user via the screen display unit 15 and/or audio output unit 16, and also presents the operation results of the TV 100 executed by the device control unit 10. The processing flow then returns to the start point (A), and stands by for the user to speak again.

The following is description of a specific example with regard to the flow of actions in dialog processing relating to basic operation tasks of the TV 100. For example, if the user utters "switch to Channel 2" to the sound collection unit 1, and the speech recognition unit 3 succeeds in speech recognition, the recognized text string "switch to Channel 2" is input to the first dialog processing unit 5 (S4). The first dialog processing unit 5 subjects the input recognized text string to dialog processing relating to basic operation tasks of the TV 100. The recognized text string "switch to Channel 2" matches an operation command described in the dialog rules in FIG. 3 (Y in S6), so the first dialog processing unit 5 outputs corresponding control information (Channel, 2) and response information "switching to Channel 2" to the dialog processing control unit 9.

Next, the dialog processing control unit 9 outputs the received control information (Channel, 2) to the device control unit 10 (S7). The dialog processing control unit 9 also outputs the response information "switching to Channel 2" to the screen display unit 15 and/or the audio output unit 16. The device control unit 10 changes the channel of the TV 100 to Channel 2, based on the received control information. The screen display unit 15 and/or audio output unit 16 perform screen display and/or speech synthesis and audio output of the response information "switching to Channel 2". Thereafter, the program on Channel 2 is shown.

This so far has been description of a specific example of the flow of actions in dialog processing relating to basic operation tasks of the TV 100. Now, in a case where dialog processing at the first dialog processing unit 5 has failed, i.e., in a case where the dialog processing control unit 9 has received dialog processing rejection information from the first dialog processing unit 5 (a case of N in S6), the dialog processing control unit 9 receives the results of dialog processing transmitted from the third dialog processing unit 23 of the dialog processing server 200, based on the action schedule (S8).

Note that normally, dialog processing of the first dialog processing unit 5 within the TV 100 is not influenced by network communication state and so forth, as the dialog processing performed at the third dialog processing unit 23 in the dialog processing server 200 is, and accordingly ends quickly. Accordingly, there are cases where the dialog processing control unit 9 has to wait for a while from obtaining dialog processing results of the first dialog processing unit 5 until receiving the dialog processing results of the third dialog processing unit 23.

The third dialog processing unit 23 of the dialog processing server 200 subjects the recognized text string to dialog processing for operation tasks of the air conditioner 101, and transmits the processing results from the communication unit 21 to the dialog processing control unit 9 of the TV 100, via the communication unit 4. The dialog processing of the third dialog processing unit 23 is performed based on the dialog rules illustrated in FIG. 2, as described earlier. Specifically, the third dialog processing unit 23 confirms whether or not the input recognized text string matches any of the operation commands for the air conditioner 101 that are described in the dialog rules. In a case where there is a match, the third dialog processing unit 23 reads out the control information and response information corresponding to that operation command, and outputs these to the dialog processing control unit 9. In a case where there is not match, the third dialog processing unit 23 determines that the input recognized text string is not an operation command for the air conditioner 101, and transmits dialog processing rejection information to the dialog processing control unit 9.

After having received the results of the dialog processing at the third dialog processing unit 23 from the dialog processing server 200, the dialog processing control unit 9 confirms the processing results thereof (S9). In a case where the dialog processing at the third dialog processing unit 23 has succeeded, that is to say, in a case where the recognized text string is an air conditioner operation command (a case of Y in S9), the dialog processing control unit 9 executes the device operation command for the air conditioner 101, which is the result of the dialog processing of the third dialog processing unit 23, based on the action schedule (S10). Specifically, the dialog processing control unit 9 outputs control information obtained from the third dialog processing unit 23 to the external device control unit 12. The dialog processing control unit 9 also outputs response information to the screen display unit 15 and/or the audio output unit 16. The external device control unit 12 executes operation of the air conditioner 101 based on the control information input from the dialog processing control unit 9. The external device control unit 12 also, via the screen display unit 15 and/or audio output unit 16, presents the response information input from the dialog processing control unit 9 to the user, and presents the operation results of the air conditioner 101 executed by the external device control unit 12 to the user. The processing flow then returns to the start point (A), and stands by for the user to speak again.

A specific example will be described below regarding the flow of actions of dialog processing relating to operation tasks of the air conditioner 101. For example, if the user has spoken "turn on the air conditioner" to the sound collection unit 1, and either one of the speech recognition unit 3 and speech recognition unit 22 has succeeded in speech recognition, the recognition control unit 2 inputs the recognized text string "turn on the air conditioner" to the dialog processing control unit 9. Next, the dialog processing control unit 9 inputs the recognized text string "turn on the air conditioner" to the first dialog processing unit 5 of the TV 100 (S4). The dialog processing control unit 9 also inputs this recognized text string to the third dialog processing unit 23 of the dialog processing server 200 as well (S5). The first dialog processing unit 5 subjects the input recognized text string to dialog processing relating to basic operation tasks for the TV 100. The recognized text string "turn on the air conditioner" does not match any of the operation commands described in the dialog rules in FIG. 3, so the first dialog processing unit 5 outputs dialog processing rejection information to the dialog processing control unit 9 (a case of N in S6).

In parallel with the dialog processing of the first dialog processing unit 5, the third dialog processing unit 23 of the dialog processing server 200 subjects the input recognized text string to dialog processing relating to operation tasks of the air conditioner 101. The recognized text string "turn on the air conditioner" matches an operation command described in the dialog rules in FIG. 2, so the third dialog processing unit 23 transmits the corresponding control information (Air conditioner, On, Auto) and response information "turning on cooler" to the dialog processing control unit 9 of the TV 100.

After the dialog processing at the first dialog processing unit 5 of the TV 100 has been rejected, the dialog processing control unit 9 receives control information and response information that are the results of the dialog processing at the third dialog processing unit 23 of the dialog processing server 200 (S8). The dialog processing at the third dialog processing unit 23 has been successful, i.e., the recognized text string is an operation command for the air conditioner 101 (a case of Y in S9), so the dialog processing control unit 9 outputs the received control information (Air conditioner, On, Auto) to the external device control unit 12 (S10). The dialog processing control unit 9 also outputs the response information "turning on cooler" to the screen display unit 15 and/or audio output unit 16. The external device control unit 12 turns the power of the air conditioner 101 on based on the received control information, and starts automatic operation. The screen display unit 15 and/or audio output unit 16 perform text display on a screen and/or speech synthesis and audio output of the response information "turning on cooler", and thereafter present the operation results of the air conditioner 101 to the user.

This so far has been description of a specific example of the flow of actions in dialog processing relating to basic operation tasks of the air conditioner 101. Now, in a case where dialog processing at the third dialog processing unit 23 has failed, i.e., in a case where the dialog processing control unit 9 has received dialog processing rejection information from the third dialog processing unit 23 of the dialog processing server 200 (a case of N in S9), the dialog processing control unit 9 inputs the recognized text string obtained from the recognition control unit 2 to the second dialog processing unit 6, in accordance with the action schedule (S11). The dialog processing control unit 9 also transmits the recognized text string from the communication unit 4 of the TV 100 to the communication unit 21 of the dialog processing server 200 at almost the same time, to be input to the fourth dialog processing unit 24 of the dialog processing server 200 (S12).

The second dialog processing unit 6 performs an information search regarding the TV 100 using the recognized text string. Specifically, the second dialog processing unit 6 performs dialog processing of a program information search task using a program schedule, and outputs the processing results thereof to the dialog processing control unit 9. The dialog processing of the second dialog processing unit 6 is performed based on the above-described dialog rules. Specifically, the second dialog processing unit 6 determines whether or not the input recognized text string is a program information search command (S13). Determination methods include determining whether or not a search keyword for searching for program information, e.g., date, genre, program title, or the like, can be extracted from the recognized text string. That is to say, if a search keyword is successfully extracted, the second dialog processing unit 6 determines that this is a program information search command (a case of Y in S13), and generates control information for executing a program information search from the program schedule of the TV 100 using the extracted search keyword, which is output to the dialog processing control unit 9. The second dialog processing unit 6 also outputs response information for presenting the results of the dialog processing to the user to the dialog processing control unit 9. On the other hand, in a case of determining that the input recognized text string is not a program information search command (a case of N in S13), i.e., in a case where no search keyword for searching for program information could be extracted from the recognized text string, the second dialog processing unit 6 transmits dialog processing rejection information to the dialog processing control unit 9.

In a case where the dialog processing at the second dialog processing unit 6 is successful, the dialog processing control unit 9 executes a program information search using the program schedule that is the result of the dialog processing at the second dialog processing unit 6, based on the action schedule (S14). Specifically, the dialog processing control unit 9 outputs the control information obtained from the second dialog processing unit 6 to the device-related information search unit 11. The dialog processing control unit 9 also outputs the response information to the screen display unit 15 and/or audio output unit 16 of the GUI output unit 14. The device-related information search unit 11 performs a program information search using the program schedule of the TV 100, based on the control information input from the dialog processing control unit 9. The device-related information search unit 11 presents the response information input from the dialog processing control unit 9 via the screen display unit 15 and/or audio output unit 16. In a case where there are at least one or more hits for program information as a result of the program information search, the device-related information search unit 11 presents the program information that has been found to the user via the screen display unit 15 and/or audio output unit 16 (S15). The processing flow then returns to the start point (A), and stands by for the user to speak again.

The following is a specific example regarding dialog processing relating to a program information search task. For example, if the user utters "dramas on tomorrow" to the sound collection unit 1, and either of the speech recognition unit 3 and speech recognition unit 22 succeeds in speech recognition, the recognition control unit 2 inputs the recognized text string "dramas on tomorrow" to the dialog processing control unit 9. Next, the dialog processing control unit 9 inputs the recognized text string "dramas on tomorrow" to the first dialog processing unit 5 of the device 100 (S4). The dialog processing control unit 9 also inputs this recognized text string to the third dialog processing unit 23 of the dialog processing server 200 as well (S5). The first dialog processing unit 5 and third dialog processing unit 23 both subject the recognized text string "dramas on tomorrow" to dialog processing regarding basic operation tasks for the TV 100 and operation tasks for the air conditioner 101, but there is no match with the operation commands described in the dialog rules in FIGS. 2 and 3, so dialog processing rejection information is sequentially returned to the dialog processing control unit 9 from both dialog processing units.

In a case of having received dialog processing rejection information from the third dialog processing unit 23 (a case of N in S9), the dialog processing control unit 9 inputs the recognized text string "dramas on tomorrow" to the second dialog processing unit 6 of the TV 100 (S11). The second dialog processing unit 6 subjects the recognized text string "dramas on tomorrow" to dialog processing with regard to program information search tasks. Specifically, the second dialog processing unit 6 determines whether or not the recognized text string "dramas on tomorrow" is a program information search command, by whether or not a search keyword for searching for program information can be extracted (S13). Here, a date keyword "tomorrow" and a genre keyword "drama" for searching for program information can be extracted, so the second dialog processing unit 6 determines that the recognized text string is a program information search command (the processing of Y in S13).

Next, the second dialog processing unit 6 generates control information for a program information search using the date keyword "tomorrow" and genre keyword "drama", and outputs this control information to the dialog processing control unit 9. The second dialog processing unit 6 outputs to the dialog processing control unit 9 response information for presenting the results of the dialog processing to the user, e.g., "searching program schedule for dramas on tomorrow".

Upon receiving the control information for performing a program information search, which is the result of the dialog processing at the second dialog processing unit 6, the dialog processing control unit 9 outputs this control information to the device-related information search unit 11 (S14). The dialog processing control unit 9 also outputs the response information "searching program schedule for dramas on tomorrow" on the screen display unit 15 and/or audio output unit 16. The screen display unit 15 and/or audio output unit 16 perform text display and/or speech synthesis and audio output of the response information "searching program schedule for dramas on tomorrow". The device-related information search unit 11 searches the program schedule of the TV 100 for program information matching keywords, based on the input control information for program information search, i.e., the date keyword "tomorrow" and genre keyword "drama". In a case where there are at least one or more hits for program information corresponding to the search keywords as a result of the program information search, the device-related information search unit 11 presents the search results that have been found to the user via the screen display unit 15 and/or audio output unit 16 (S15).

This so far has been description of a specific example of the flow of actions in dialog processing relating to a program information search task. Now, in a case where dialog processing at the second dialog processing unit 6 has failed, i.e., in a case where the dialog processing control unit 9 has received dialog processing rejection information from the second dialog processing unit 6 (a case of N in S13), The dialog processing control unit 9 receives the results of the dialog processing transmitted from the fourth dialog processing unit 24 of the dialog processing server 200, based on the action schedule (S16).

The fourth dialog processing unit 24 of the dialog processing server 200 performs an Internet information search using the recognized text string, specifically dialog processing of a general information search task such as weather forecast, news, etc., and outputs the processing results thereof to the dialog processing control unit 9. The dialog processing at the fourth dialog processing unit 24 is performed based on the above-described dialog rules. Specifically, the fourth dialog processing unit 24 determines whether or not the input recognized text string is a general information search command. Determination methods include determining whether or not a search keyword for searching for general information on the Internet, e.g., search keywords necessary for searching weather, news, maps, or the like, can be extracted from the recognized text string. That is to say, if a search keyword is successfully extracted, the fourth dialog processing unit 24 determines that this is a general information search command, generates control information for executing a general information search on the Internet using the extracted search keyword, and outputs this control information to the dialog processing control unit 9. The fourth dialog processing unit 24 also outputs response information for presenting the results of the dialog processing to the user to the dialog processing control unit 9. On the other hand, in a case of determining that the input recognized text string is not a general information search command, i.e., in a case where no search keyword for a general information search could be extracted from the recognized text string, the fourth dialog processing unit 24 transmits dialog processing rejection information to the dialog processing control unit 9.

The dialog processing control unit 9 receives the results of dialog processing at the fourth dialog processing unit 24 from the dialog processing server 200, and confirms the processing results (S17). In a case where the dialog processing at the fourth dialog processing unit 24 is successful, i.e., in a case where the recognized text string is determined to be a general information search command (Y in S17), the dialog processing control unit 9 executes an Internet general information search in accordance with the result of the dialog processing at the fourth dialog processing unit 24, based on the action schedule (S18). Specifically, the dialog processing control unit 9 outputs the control information obtained from the fourth dialog processing unit 24 to the general information search unit 13. The dialog processing control unit 9 also outputs the response information to the screen display unit 15 and/or audio output unit 16 of the GUI output unit 14.

The general information search unit 13 performs a general information search using the Internet, based on control information input from the dialog processing control unit 9. The general information search unit 13 also presents the user with the response information input from the dialog processing control unit 9 via the screen display unit 15 and/or audio output unit 16. In a case where there are at least one or more hits for general information as a result of the general information search, the general information search unit 13 presents the general information that has been found to the user via the screen display unit 15 and/or audio output unit 16 (S19). The processing flow then returns to the start point (A), and stands by for the user to speak again.

The following is a specific example regarding an operation flow of dialog processing relating to a general information search task. For example, if the user utters "weather for Tokyo" to the sound collection unit 1, and either of the speech recognition unit 3 and speech recognition unit 22 succeeds in speech recognition, the recognition control unit 2 inputs the recognized text string "weather for Tokyo" to the dialog processing control unit 9. Next, the dialog processing control unit 9 inputs the recognized text string "weather for Tokyo" to the first dialog processing unit 5 of the TV 100 (S4). The dialog processing control unit 9 also inputs this recognized text string to the third dialog processing unit 23 of the dialog processing server 200 as well (S5). The first dialog processing unit 5 and third dialog processing unit 23 both subject the recognized text string "weather for Tokyo" to dialog processing regarding basic operation tasks for the TV 100 and operation tasks for the air conditioner 101, but there is no match with the operation commands described in the dialog rules in FIGS. 2 and 3, so dialog processing rejection information is sequentially returned to the dialog processing control unit 9 from both dialog processing units.

In a case of having received dialog processing rejection information from the third dialog processing unit 23 (a case of N in S9), the dialog processing control unit 9 inputs the recognized text string "weather for Tokyo" to the second dialog processing unit 6 of the TV 100 (S11). The dialog processing control unit 9 also inputs this recognized text string to the fourth dialog processing unit 24 of the dialog processing server 200 as well (S12). The second dialog processing unit 6 subjects the recognized text string "weather for Tokyo" to dialog processing with regard to program information search tasks, but no keyword for searching for program information can be extracted from the recognized text string, so dialog processing rejection information is output to the dialog processing control unit 9 (processing of N in S13).

In parallel with the dialog processing at the second dialog processing unit 6, the fourth dialog processing unit 24 of the dialog processing server 200 subjects the input recognized text string to dialog processing relating to a general information search task. Specifically, the fourth dialog processing unit 24 determines whether or not the recognized text string is a general information search command, by whether or not a search keyword for performing a general information search can be extracted from the recognized text string "weather for Tokyo". Here, an area keyword "Tokyo" and information type keyword "weather" for performing a general information search can be extracted, so the fourth dialog processing unit 24 determines that the recognized text string is a general information search command. Next, the fourth dialog processing unit 24 generates control information of performing a general information search on the Internet using the area keyword "Tokyo" and information type keyword "weather", and outputs this control information to the dialog processing control unit 9. The fourth dialog processing unit 24 also outputs response information to the dialog processing control unit 9 for presenting the results of the dialog processing to the user, such as "searching Internet for weather in Tokyo".

After the dialog processing of the second dialog processing unit 6 of the TV 100 has been rejected, the dialog processing control unit 9 receives the control information and response information that are the result of the dialog processing at the fourth dialog processing unit 24 of the dialog processing server 200 (S16). The dialog processing at the fourth dialog processing unit 24 has been successful, i.e., the recognized text string is a command for a general information search on the Internet (a case of Y in S17), so the dialog processing control unit 9 outputs the received control information to the general information search unit 13. The dialog processing control unit 9 also outputs the received response information "searching Internet for weather in Tokyo" to the screen display unit 15 and/or audio output unit 16.

Based on the control information for the general information search that has been input, i.e., the area keyword "Tokyo" and information type keyword "weather", the general information search unit 13 searches for information on the Internet corresponding to these keywords. In a case where there are at least one or more hits for the search keywords as a result of the information search, the general information search unit 13 presents the search results to the user via the screen display unit 15 and/or audio output unit 16 (S19).

This so far has been description of dialog processing relating to a general information search task. Now, in a case where dialog processing at the fourth dialog processing unit 24 has failed, i.e., in a case of receiving dialog processing rejection information from the fourth dialog processing unit 24 (a case of N in S17), the dialog processing control unit 9 makes a presentation to the user to the effect that all dialog processing has failed (S20). For example, the dialog processing control unit 9 presents "not able to understand what you said" or the like to the user via the screen display unit 15 and/or audio output unit 16. The processing flow then returns to the start point (A), and stands by for the user to speak again.

As described above, in the dialog processing control system according to the present embodiment, the dialog task management unit 8 decides the action schedule of the first dialog processing unit 5 and second dialog processing unit 6 of the TV 100 and the third dialog processing unit 23 and fourth dialog processing unit 24 of the dialog processing server 200, based on the priority of each task stored in the task priority storage unit 7 beforehand. When a recognized text string, which is the result of speech recognition of an utterance by the user, is input to the dialog processing control unit 9, the dialog processing control unit 9 controls the actions of the dialog processing units at the TV 100 side and the dialog processing units at the dialog processing server 200 side, based on the action schedule. Accordingly, each dialog processing can be controlled in the order according to the priority of each task, even in a case where dialog processing containing multiple different tasks with different priorities is to be performed in parallel and at the same time at the TV 100 side and dialog processing server 200 side.

For example, a case will be considered where dialog processing relating to basic operations of the TV 100, which is a task of which the priority is first, and dialog processing relating to program information searching, which is a task of which the priority is third, are performed at the TV 100 side, and at the same time, dialog processing relating to operations of the air conditioner 101, which is a task of which the priority is second, and dialog processing relating to general information searching on the Internet, which is a task of which the priority is fourth, are performed at the dialog processing server 200 side, in parallel, as described in the embodiment above. In this case, even if the response of the dialog processing results regarding air conditioner operations from the dialog processing server 200 is late due to the effects of the network environment or the like, the actions of each dialog processing is controlled based on the action schedule decided from the priorities of the tasks. Accordingly, the results of dialog processing priority relating to operations of the air conditioner 101 at the dialog processing server 200 having high priority can be executed first, and not the results of dialog processing relating to the program information searched at the TV 100 side having low priority.

That is to say, in a case where dialog processing of a task at the server side having high priority, and dialog processing of a task at the device side having low priority, are being processed in parallel at the same time, the processing results at the server side can be executed in accordance with priority rather than the processing results at the device side, even if the response of processing results from the server is delayed due to the effects of the network environment or the like.

Second Embodiment

Figure 6:
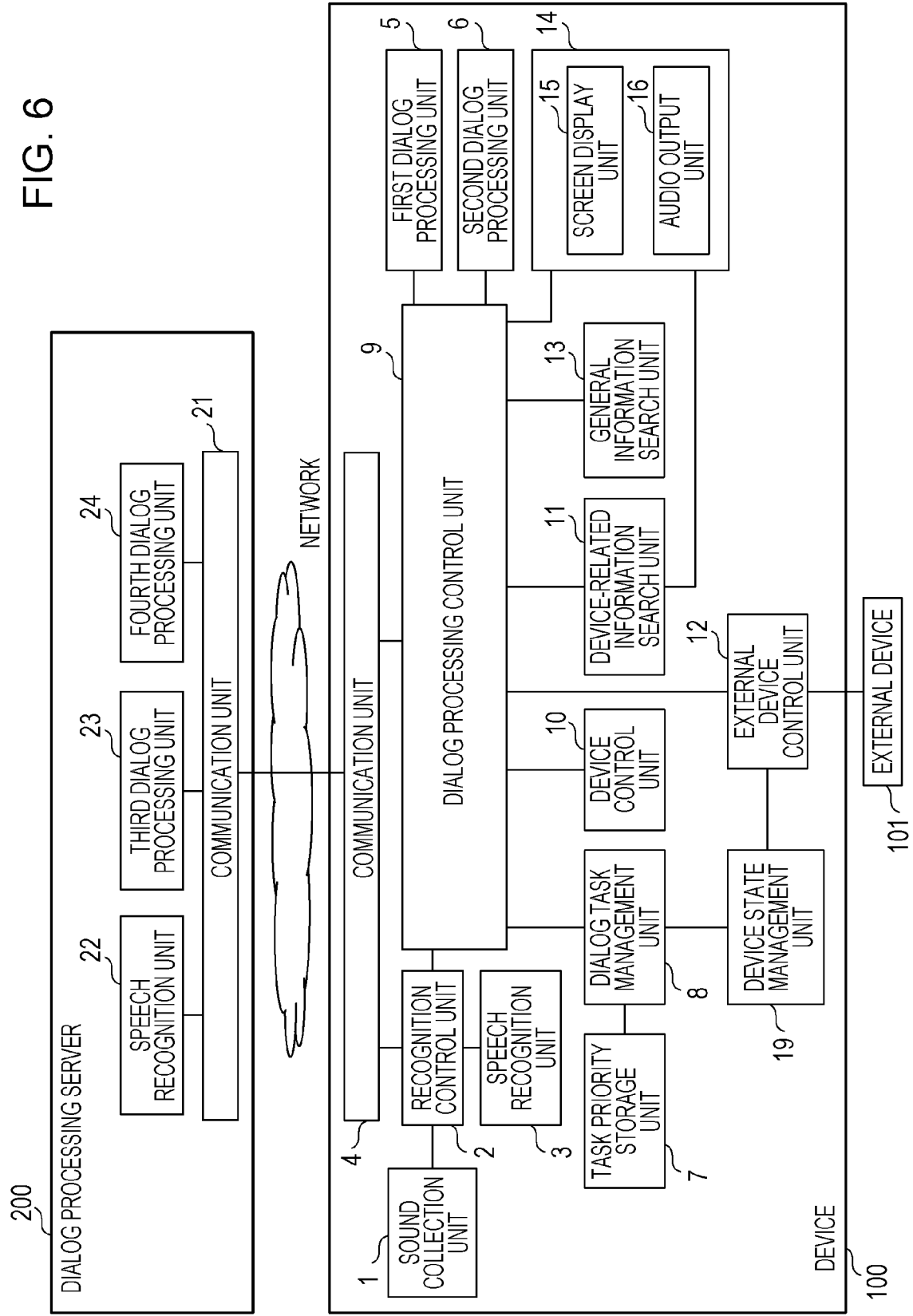
FIG. 6 is a block diagram of a dialog processing control system according to a second embodiment.

A modification of the dialog processing control system according to the first embodiment described above will be described in a second embodiment. FIG. 6 is a block diagram illustrating the configuration of the dialog processing control system according to the second embodiment. The dialog processing control system according to the present embodiment has almost the same configuration as the dialog processing control system according to the first embodiment, the only difference being that a device state management unit 19 is provided to the device 100 that is a component of the dialog processing control system according to the first embodiment. Accordingly, configurations in the dialog processing control system according to the second embodiment that are the same as those in the dialog processing control system according to the first embodiment are denoted by the same reference numerals as in the first embodiment. Only configurations that differ from the first embodiment will be described, and configurations that are the same as in the first embodiment will be omitted from description.

The device state management unit 19 in the dialog processing control system according to the second embodiment manages the state of the device 100. The state of the device 100 is the state of connection to the dialog processing server 200, the state of the device 100 operable by the device control unit 10, and the state of the external device 101 operable by the external device control unit 12. If the device 100 is a TV for example, the state of the device operable by the device control unit 10 is the state such as the channel selected, volume, screen output, and so forth, of the TV 100. If the external device 101 is an air conditioner for example, the state of the device operable by the external device control unit 12 is the connection state of the TV and air conditioner, and the operating state of the air conditioner (power, mode, temperature settings) and so forth.

The dialog task management unit 8 decides the action schedule of the first dialog processing unit 5 and second dialog processing unit 6 of the device 100, and the third dialog processing unit 23 and fourth dialog processing unit 24 of the dialog processing server 200, based on the priority of each of the tasks stored in the task priority storage unit 7 and on the current state of the device 100 managed by the device state management unit 19. The action schedule for the dialog processing units defines how, and in which order, the dialog processing units 5, 6, 23, 24 of the device 100 and dialog processing server 200 are to operate. Thus, the point of the second embodiment that differs from the configuration of the first embodiment is that not only the priorities of each of the tasks stored in the task priority storage unit 7, but also the state of the device 100 managed by the device state management unit 19, is used when the dialog task management unit 8 decides the action schedule of the first through fourth dialog processing units.

Now, the operations of the dialog task management unit 8, in a case of updating the action schedule of the dialog processing units in accordance with the state of the device 100, in the dialog processing control system according to the second embodiment will be described. Specific description will be made below by way of an example where the device 100 is a TV and the external device 101 is an air conditioner. In the following description, the TV that is an example of the device 100 will be described as "TV 100", and the air conditioner that is an example of the external device 101 will be described as "air conditioner 101". Accordingly, the tasks of the first dialog processing unit 5 are basic operation tasks such as channel selection, volume adjustment, and so forth, of the TV, the dialog rules thereof being illustrated in FIG. 3. The tasks of the second dialog processing unit 6 are program information searching in a program schedule. The tasks of the third dialog processing unit 23 are operation tasks such as power operation, temperature setting, and so forth, of the air conditioner, the dialog rules thereof being illustrated in FIG. 2. The tasks of the fourth dialog processing unit 24 are searching tasks of general Internet information, such as weather forecast, news, and so forth.

Figure 7:
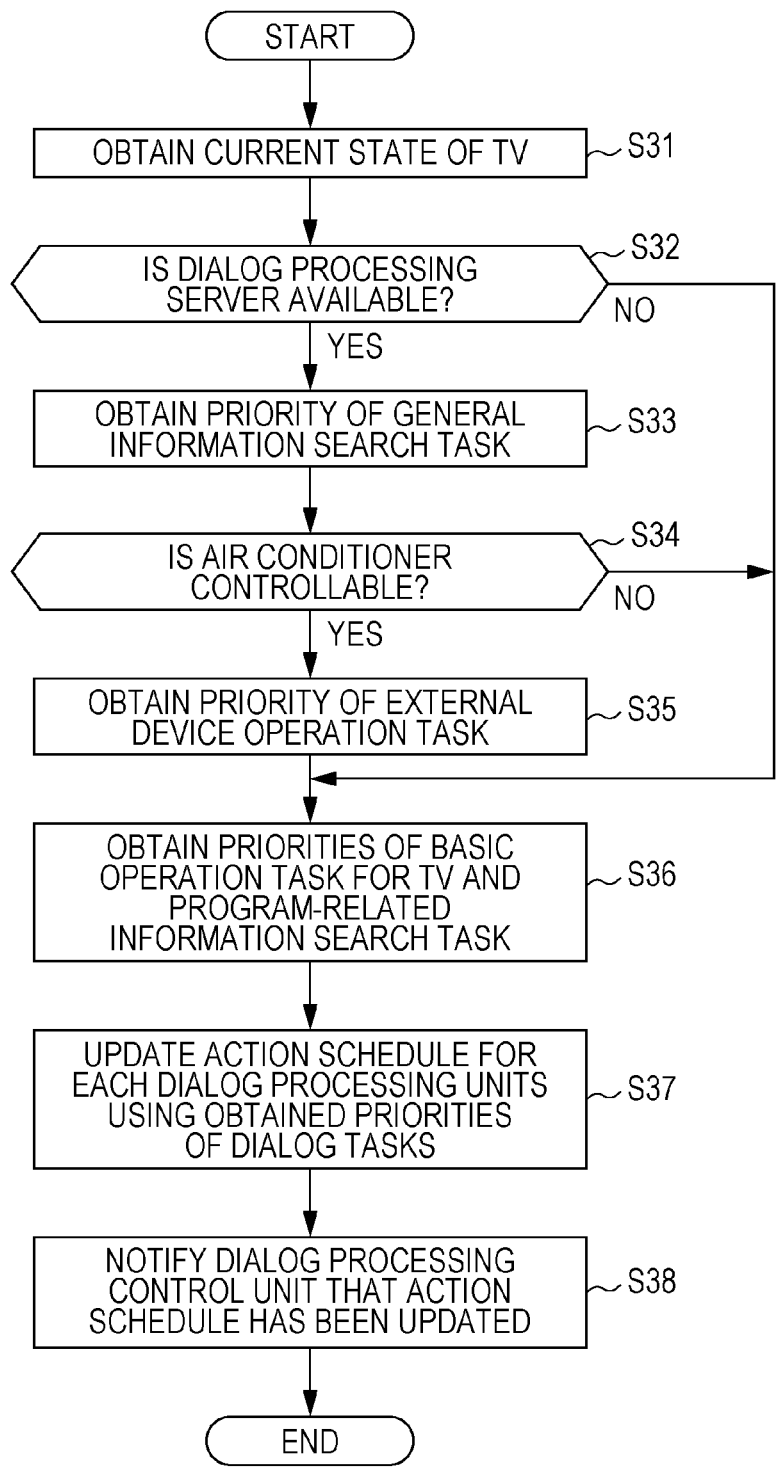
FIG. 7 is a flowchart for describing the flow of processing of a dialog task management unit according to the second embodiment creating action schedules for each dialog processing unit and so forth.

FIG. 7 is a flowchart illustrating the flow of processing when the dialog task management unit 8 updates the action schedule of the dialog processing units. The operations of the dialog task management unit 8 will now be described with reference to FIG. 7.

The dialog task management unit 8 first obtains the state of the TV 100 that the device state management unit 19 is managing (S31). Next, the dialog task management unit 8 uses the state of the TV 100 that has been obtained to confirm whether or not the TV 100 is connected to the dialog processing server 200 by network, and is available (S32). In a case where the dialog processing server 200 is found to be available as the result of the confirmation (a case of Y in S32), the dialog task management unit 8 obtains, from the task priority storage unit 7, priority "4" for the general information search on the Internet that the fourth dialog processing unit 24 processes (S33).

Next, in the same way, the dialog task management unit 8 uses the state of the TV 100 that has been obtained to confirm whether or not the air conditioner 101 is controllable from the TV 100 (S34). In a case where the air conditioner 101 is found to be controllable as the result of the confirmation (a case of Y in S34), the dialog task management unit 8 obtains, from the task priority storage unit 7, priority "2" for the operation task for the air conditioner 101 that the third dialog processing unit 23 processes (S35), and the flow advances to S36. That is to say, the dialog task management unit 8 obtains the priority in accordance with controllability, indicating whether or not controllable.

On the other hand, in a case where the dialog processing server 200 is not available, due to a reason such as the TV 100 not being connected to the network or the system of the dialog processing server 200 being down (a case of N in S32), the dialog task management unit 8 does not obtain the priority of the task for the fourth dialog processing unit 24, and the flow advances to S36. In the same way, in a case where the air conditioner 101 cannot be controlled from the TV 100, due to a reason such as the TV 100 and air conditioner 101 not being connected by network or the air conditioner 101 malfunctioning (a case of N in S34), the dialog task management unit 8 does not obtained the priority of the task for the third dialog processing unit 23, and the flow advances to S36.

In S36, the dialog task management unit 8 obtains the priority "1" of basic operation tasks of the TV 100 that the first dialog processing unit 5 processes, and the priority "3" of the program information search task for the TV 100 that the second dialog processing unit 6 processes, that are stored in the task priority storage unit 7.

The dialog task management unit 8 then updates the action schedule of the dialog processing units based on the priorities of the tasks obtained in accordance with the state of the TV 100 (S37).

Finally, the dialog task management unit 8 notifies the dialog processing control unit 9 that the action schedule has been updated in accordance with the state of the TV 100 (S38). This so far has been a description of the operation flow of processing where the dialog task management unit 8 updates the action schedule of the dialog processing units.

Now, the actions of the dialog processing units are controlled by the dialog processing control unit 9 based on the action schedule updated in accordance with the state of the TV 100 in the dialog processing control system according to the second embodiment. Note however, that in a case where the TV 100, dialog processing server 200, and air conditioner 101 are correctly connected, the flow of operations of the system when the user has spoken a command is the same as that of the first embodiment illustrated in FIG. 5.

Figure 8:
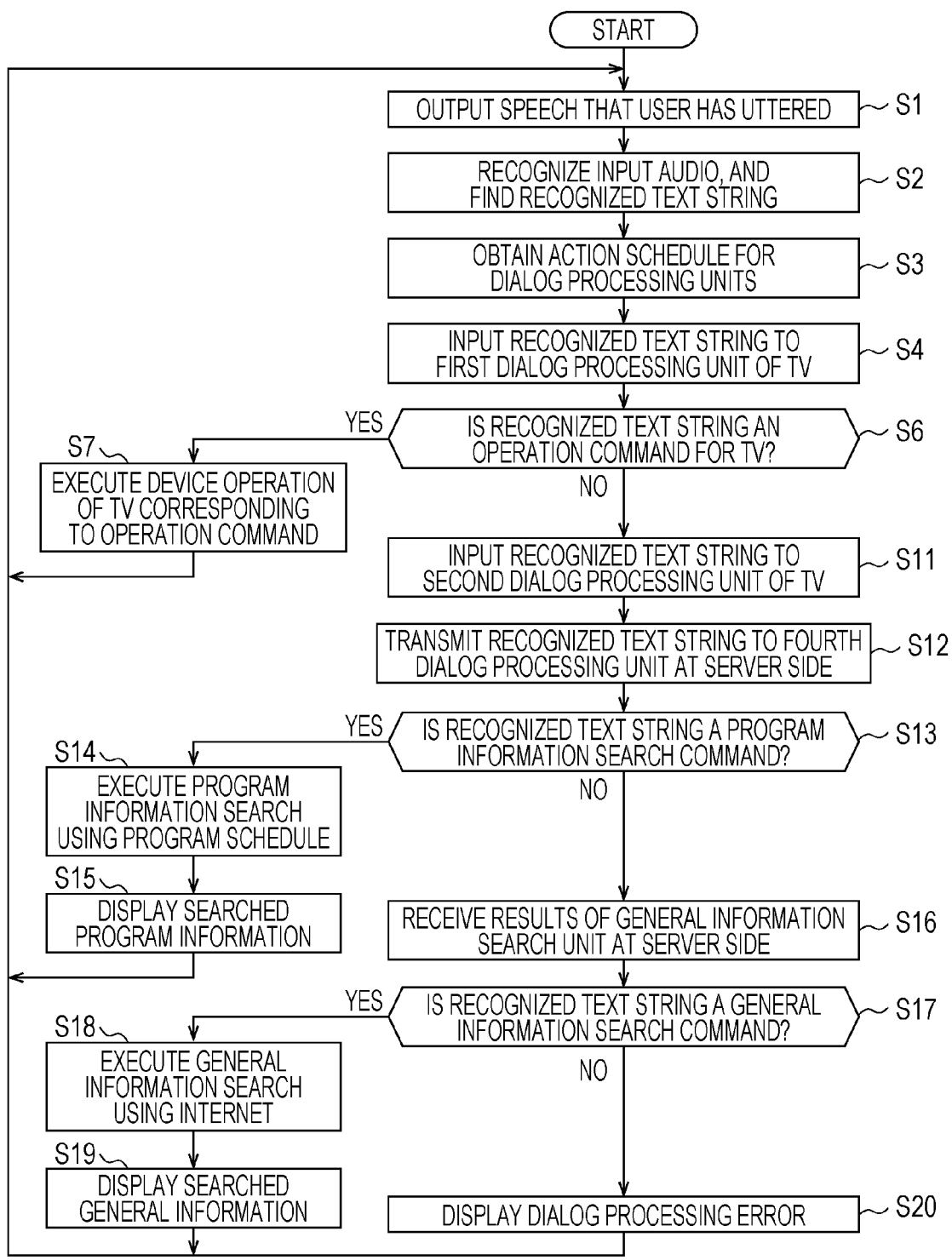
FIG. 8 is a flowchart for describing operations of the of the dialog processing control system in a case where a device according to the second embodiment cannot control an external device.

However, in a case where the dialog processing server 200 is available but the air conditioner 101 cannot be controlled from the TV 100, for example, the action schedule is decided based on the priorities of the tasks performed by the first dialog processing unit 5, second dialog processing unit 6, and fourth dialog processing unit 24, with the task priority of the third dialog processing unit 23 omitted. That is to say, the action schedule is updated by the dialog task management unit 8 such that dialog processing for basic operation tasks of the TV 100 is performed first, dialog processing for a program information search task is performed next, and finally dialog processing of a general information search task using the Internet is performed. Accordingly, the operation flow of the system in this case is an operation flow illustrated in FIG. 8, where processing relating to the third dialog processing unit 23 (S5 and S8 through S10) has been omitted from the operation flow in FIG. 5.

Figure 9:
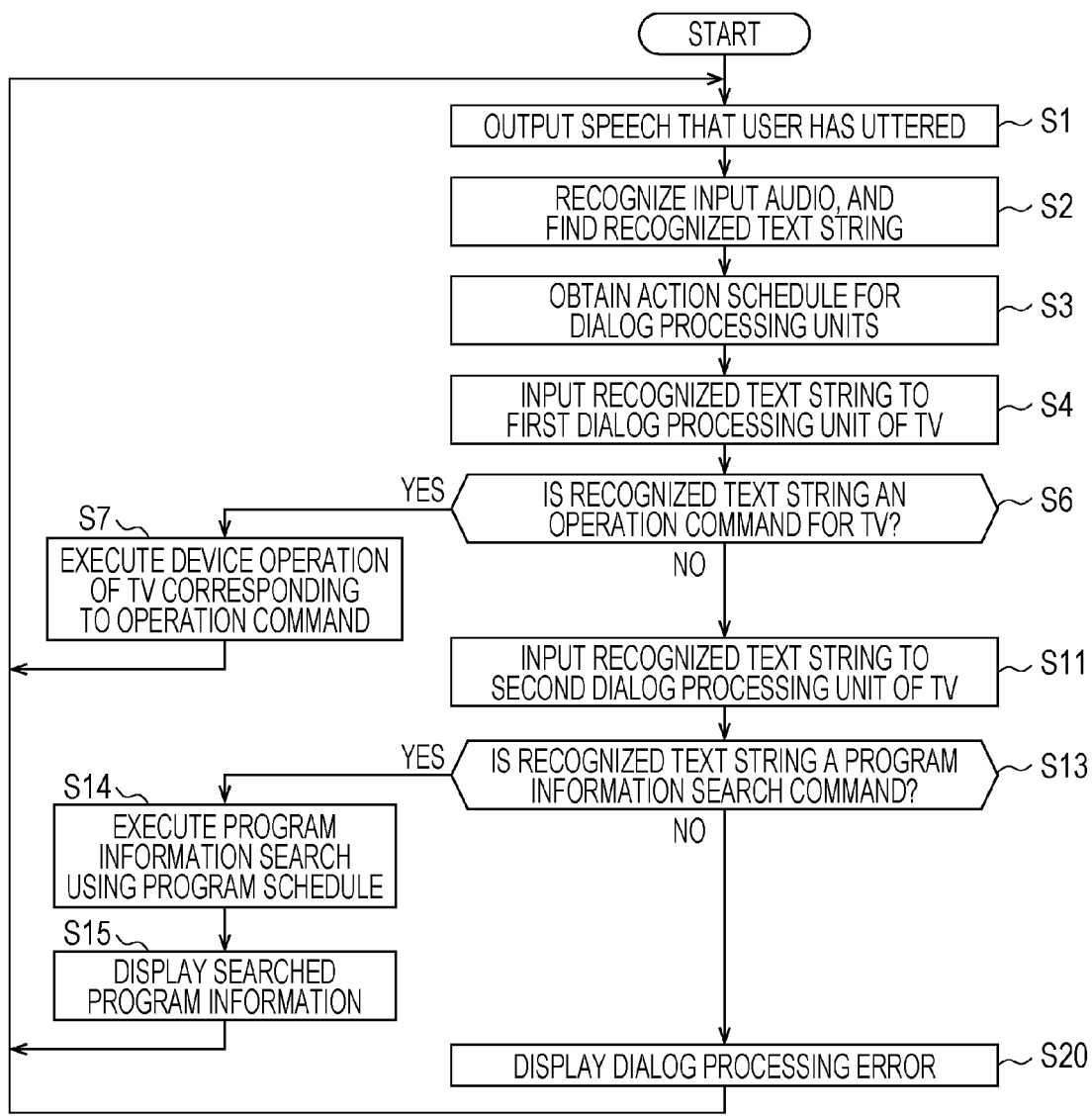
FIG. 9 is a flowchart for describing operations of the dialog processing control system in a case where a device according to the second embodiment cannot use a dialog processing server.

Also, in a case where the dialog processing server 200 is not available, the action schedule is decided based on the priorities of the tasks performed by the first dialog processing unit 5 and second dialog processing unit 6, with the task priorities of the third dialog processing unit 23 and fourth dialog processing unit 24 omitted. That is to say, the action schedule is updated by the dialog task management unit 8 such that dialog processing for basic operation tasks of the TV 100 is performed first, and dialog processing for a program information search task is performed next. Accordingly, the operation flow of the system in this case is an operation flow illustrated in FIG. 9, where processing relating to the third dialog processing unit 23 (S5 and S8 through S10) and the fourth dialog processing unit 24 (S12 and S16 through S19) have been omitted from the operation flow in FIG. 5.

In the dialog processing control system according to the second embodiment of the present disclosure, the dialog processing control unit 9 controls the actions of the first dialog processing unit 5 and second dialog processing unit 6 of the TV 100, and third dialog processing unit 23 and fourth dialog processing unit 24 of the dialog processing server 200, based on the action schedule obtained from the dialog task management unit 8, in the same way as in the first embodiment as described above. Note however, that in the second embodiment, the device state management unit 19 that has been newly added to the configuration of the first embodiment manages the state of the TV 100, such as the connection state with the dialog processing server 200, and the connection state with the air conditioner 101, which is an external device, and the operating state of the air conditioner 101. The dialog task management unit 8 decides the action schedule of the first dialog processing unit 5 and second dialog processing unit 6, and third dialog processing unit 23 and fourth dialog processing unit 24 of the dialog processing server 200, based on the state of the TV 100 in addition to the priorities of the tasks stored in the task priority storage unit 7.

Accordingly, the action schedule of the dialog processing units of the TV 100 and dialog processing server 200 can be dynamically changed in according with the state of the TV 100, and more specifically, in accordance with the connection state with the dialog processing server 200, and the connection state with the air conditioner 101 and operating state of the air conditioner 101. For example, in a case where the air conditioner 101 cannot be controlled from the TV 100, the action schedule is updated by the dialog processing control unit 9 so that the dialog processing at the third dialog processing unit 23 is not performed. In the same way, in a case where the dialog processing server 200 is not available, the action schedule is updated so that the dialog processing at the third dialog processing unit 23 and fourth dialog processing unit 24 is not executed. Accordingly, the overall system can avoid needless dialog processing, i.e., optimal dialog processing can be performed, in accordance with the state of the TV 100, and the processing time of the overall system can be reduced.

Note that while the number of external devices 101 connected by network to the device 100 has been described as one in the above embodiments, multiple external devices (e.g., an air conditioner and a lighting fixture, etc.) may be connected. In this case, the correlation between the operation commands for the multiple external devices, and the control information and response information that are the result of dialog processing, is described in the dialog rules for the third dialog processing unit 23. For example, in a case where the external devices are an air conditioner and a lighting fixture, operation commands for the lighting fixture, such as "turn on the light" and "turn off the light" are added to the dialog rules in FIG. 2. The external device control unit 12 controls the multiple external devices based on control information output from the third dialog processing unit 23.

While description has been made in the above embodiments that the tasks of the first dialog processing unit 5 are basic operations of the device 100, tasks of the second dialog processing unit 6 are information searching relating to the device 100, tasks of the third dialog processing unit 23 are operation of the external device 101, and tasks of the fourth dialog processing unit 24 are an Internet information search task, other task than those described above may be set, as long as the tasks of the first dialog processing unit 5 and second dialog processing unit 6 in the device 100 differ. For example, the tasks of the third dialog processing unit 23 may be set to operation tasks of the device 100 other than basic operation tasks of the device 100. If the device 100 is a TV, the first dialog processing unit 5 may perform basic operation tasks such as shown in the dialog rules in FIG. 3, and the second dialog processing unit 6 may be set to perform operation tasks such as displaying subtitles, displaying help, selecting video/audio mode, and so forth, or may be set to perform operation tasks for the entire TV including basic operation tasks. Note, however, that the priorities of these task need to be stored in the task priority storage unit 7 beforehand.

In the above-described embodiments, the priority of basic operation tasks of the device 100 is set to "1", the priority of search tasks for device-related information to "3", the priority of external device operation tasks for the dialog processing server 200 to "2", and the priority of general information search tasks using the Internet to "4", in the task priority storage unit 7. However, other priorities than those described above may be set.

Also, while the dialog processing server 200 includes two dialog processing units (the third dialog processing unit 23 and fourth dialog processing unit 24) in the embodiments described above, it is sufficient for the dialog processing server 200 to have at least one or more dialog processing unit. The dialog processing server 200 is provided with the speech recognition unit 22, but an arrangement may be made where a speech recognition server that is a different server from the dialog processing server 200 is provided, and this speech recognition server has the speech recognition unit 22.

Third Embodiment

More Underlying Knowledge Forming Basis of the Present Disclosure

Dialog processing relating to device operations generally include two types of processing, which are speech understanding processing and response generation processing. Speech understanding processing is to analyze a recognized text string obtained from speech recognition processing, and identify from the recognized text string the operation contents of the device that the user intends. Response generation processing is to generate control information for controlling the device to be operated and response information for the user, based on the operation contents that have been identified.

Now, as described earlier, dialog processing, where actions of a device, which is the object of operation, are identified from a recognized text string that has been obtained as the result of recognition of speech uttered by a user, is performed at the device side in a conventional client-server type speech recognition system. Accordingly, there has been a problem in that the number of operation commands and the number of speech patterns (expressions) usable in dialog processing, and speech understanding processing in particular are limited, due to limited calculation capabilities, memory capacity, and so forth, of the device. That is to say, there has been a problem in that, even if the speech of the user is accurately recognized by speech recognition processing at the cloud server, the results of the recognition (text string) do not match an operation command or speech pattern in the dialog processing in the device, so that task that the user intended cannot be executed, meaning that the user cannot operate the device as intended.

Accordingly, there has been proposed a method where speech understanding processing is performed at the cloud server in the same way as with the speech recognition processing, enabling a vast vocabulary (number of operation commands, number of speech patterns, etc.) to be processed. However, there is a problem, the same as with the case of performing speech recognition processing at the cloud server, in that in a case where speech understanding processing is performed at the cloud server, the speed of response from the server is considerably slower as compared to processing within the device, if the communication environment of the network is slow or traffic is heavy due to multiple devices accessing the server.

Thus, a client-server type dialog processing system that performs distributed dialog processing, where tasks that require a speedy response with a limited vocabulary of which speech understanding processing can be performed are subjected to dialog processing (speech understanding and response generation processing) in the device, and tasks that demand a great vocabulary of which speech understanding processing can be performed, even if there is a tradeoff that the response speed is somewhat slow, are partially or entirely subjected to speech understanding processing at the cloud server, and then subjected to response generation processing at the device side, can be conceived as a method to solve the above problem. In such a system, the recognized text string is input to speech understanding processing at the device and the server at almost the same time, to reduce the response time from the server. Thus, the time until obtaining the final results of the speech understanding processing can be reduced.

However, dialog processing where multiple different tasks are processed with regard to the recognized text string resulting from the speech recognition is often performed in recent speech recognition devices and systems. For example, determination is first made regarding whether or not the recognized text string is an operation command (function) for the device that is the object of operation, or an application. In a case of an operation command, the relevant device operation is executed. Otherwise, an app search using the recognized text string and a search keyword is performed at an app market, and the result is presented to the user. That is to say, dialog processing, where two different tasks of a device operation task and app search task, is performed.

Note that the above-described dialog processing (speech understanding processing and response generation processing) regarding the multiple different tasks is performed only within the device. Using a client-server type system is desirable for dialog processing, and particularly speech understanding processing, of a vast vocabulary, as described above. However, in a case of performing in tandem dialog processing that is performed only within the device, and distributed dialog processing at both the device side and server side, regarding multiple tasks, there is a need to decide which of the results of dialog processing within the device, and results of the distributed dialog processing (processing where response generation processing is performed at the device side after performing speech understanding processing at the server side) should be given priority in execution. One method would be to simply execute the valid results received first, but in a case where the order of priority of individual tasks in the dialog processing differ between the dialog processing within the device and the distributed dialog processing, this method is not necessarily appropriate.

For example, a case will be considered where there are three tasks, of which the priorities differ. The system is configured such that two sets of dialog processing are consecutively performed at the device side, regarding the task of which the priority is first and the task of which the priority is third, and distributed dialog processing is performed regarding the task of which the priority is second where speech understanding processing is performed at the server side while response generation processing is performed at the device side. In this case, the results of dialog processing are preferably executed in the order of priority, but the dialog process of the two tasks at the device side may end before the distributed dialog processing at the server side, due to taking time depending on the content of the speech by the user, the network environment, or the like. That is to say, a problem occurs where the task of which the priority is third is executed first at the device side, without the task of which the priority is second that has been subjected to distributed dialog processing being executed.

A specific example will be described regarding the above problem, with a TV as the device. The task of which the priority is first is basic operations such as selecting channels of the TV, adjusting volume, and so forth, and the task of which the priority is second is operations of an external device connected to the TV by a network, such as operating a device such as an air conditioner, lighting, or the like, for example. The task of which the priority is third is an information search regarding the TV, such as program information searching by program title or cast name, for example. In this arrangement, dialog processing regarding basic operations regarding the TV, of which the priority is first, and information searching regarding the TV, of which the priority is third, is performed at the TV side in this system. Distributed dialog processing is performed regarding external device operations of which the priority is second, where speech understanding processing is performed at the server side, and response generation processing is performed at the TV (device) side. The reason that speech understanding processing regarding external device operations is performed at the server side, is in order to enable processing regarding a wide variety of operation commands for various devices.

If the user says "turn on the air conditioner" and this speech is correctly recognized in the above system, the recognized text string, "turn on the air conditioner", is output as the speech recognition result. Next, the recognized text string, "turn on the air conditioner", is input at the same time to the dialog processing at the TV side and the speech understanding processing at the server side. At the TV side, dialog processing of basic operation tasks for the TV is performed first, and confirmation is made regarding whether or not the recognized text string is a basic operation command for the TV. The recognized text string, "turn on the air conditioner", is not included in basic operation commands of the TV, so next, dialog processing for an information search task regarding the TV is performed. That is to say, an information search (TV schedule search, Internet search, etc.) is performed using the recognized text string, "turn on the air conditioner", as a search keyword.

On the other hand, speech understanding processing of operation tasks of external devices is performed at the server side, and analysis is performed regarding whether or not the recognized text string is an operation command for an external device connected to the TV, such as an air conditioner, light fixture, etc. The recognized text string, "turn on the air conditioner" is identified as having the operation contents of "air conditioner power on operation" as a result of the analysis, so information indicating the operation contents of "air conditioner power on operation" is transmitted from the server to the TV.

In light of the overall system, the air conditioner power on operation, which is the operation task of the external device of which the priority is second, should be executed before the information search task relating to the TV, of which the priority is third. However, there is a possibility that the two sets of dialog processing at the device side (basic operation task of the TV and information search task regarding the TV) will end in a shorter time than the speech understanding processing of the external device operation task at the server, depending on the network environment and so forth, as described above. That is to say, depending on the network environment, displaying of the results of the keyword search for "turn on the air conditioner" may be executed before the operation of turning on the power for the air conditioner, meaning that the user cannot operate the devices as intended.

The present disclosure provides an information processing device and information processing method that enables optimal dialog processing control to be performed, when performing in tandem, dialog processing performed only in the device, and distributed dialog processing where dialog processing is performed both at the device side and the server side, regarding multiple tasks having different priorities, based on the priority of the tasks.

A dialog processing control device acting as an information processing device according to an aspect of the present disclosure includes: a speech recognition result obtainer that obtains a speech recognition result, which is text data obtained by speech recognition processing; a priority obtainer that obtains priority corresponding to each of a plurality of tasks that are each identified by a plurality of dialog processing based on the speech recognition result; and a dialog processing controller that causes a plurality of devices to perform distributed execution of the plurality of dialog processing mutually different from each other, wherein the dialog processing controller provides, based on the priority, control information in accordance with a task identified by the distributed execution to an executer that operates based on the control information. The dialog processing control device further comprises a dialog processor that performs one of the plurality of dialog processing based on the speech recognition result and a task priority storage unit that stores the priority. Any of the plurality of devices is the dialog processing control device. Any of the plurality of devices is an external device that is connected to the dialog processing control device via network. The external device includes a dialog processor that performs another one of the plurality of dialog processing based on the speech recognition result. The priority obtainer obtains the priority stored in the task priority storage. The dialog processing controller provides the speech recognition result to the dialog processor and the external device, and provides, based on the priority, to the executer, the control information obtained by the dialog processing performed by the dialog processor or the external device. The each of the plurality of dialog processing includes at least speech understanding processing that generates operation content information. The external device includes a dialog processor that performs the speech understanding processing. The dialog processor of the at least one of the plurality of devices includes a speech understander that performs the speech understanding processing and a response generator that generates response information and the control information based on the operation content information.

For example, in this configuration, the dialog task management unit 8 decides the action schedule for the speech understanding processing of the dialog processing units and response generation units at the device side, and the speech understanding processing server, for each task, based on the priority of each task stored in the task priority storage unit 7. The dialog processing control unit 9 controls actions of speech understanding processing at the dialog processing units and response generation units at the device side, and the speech understanding processing server, based on the action schedule. Accordingly, even in a case of performing in tandem dialog processing that is performed only within the device, and distributed dialog processing at both the device side and server side, regarding multiple tasks having different priorities, each dialog processing can be controlled in an order according to the priority of each task. That is to say, in a case where speech understanding processing of tasks with high priority is performed at the server side and dialog processing of tasks with low priority is performed at the device side by parallel processing at the same time, the results of dialog processing performed by distributed processing between the device side and server side can be executed in accordance with the priority rather than the processing results at the device side, even if the response of the dialog processing results of speech understanding processing from the server is delayed.

A dialog processing control device according to another aspect of the present disclosure may further include a device state manager manages a state of a controlled device that is controlled by the executer. The priority obtainer may obtain the priority based on the state managed by the device state manager.

For example, in this configuration as well, the dialog processing control unit 9 controls the actions of speech understanding processing at the dialog processing units and response generation units at the side of the devices, and the speech understanding processing server, based on the action schedule obtained from the dialog task management unit 8. Note however, that in this configuration, the device state management unit 19 manages the device state, and the dialog task management unit 8 decides the action schedule of speech understanding processing at the dialog processing units and response generation units at the side of the devices, and the speech understanding processing server, based on the device state in addition to the priority of tasks stored in the task priority storage unit 7. Accordingly, the action schedule of dialog processing and response generation processing by the devices, and speech understanding processing at the speech understanding processing server, can be dynamically changed in accordance with the state of the device that is the object of operation. That is to say, optimal processing can be performed in accordance with the device state, and overall processing time can be reduced.

Figure 10:
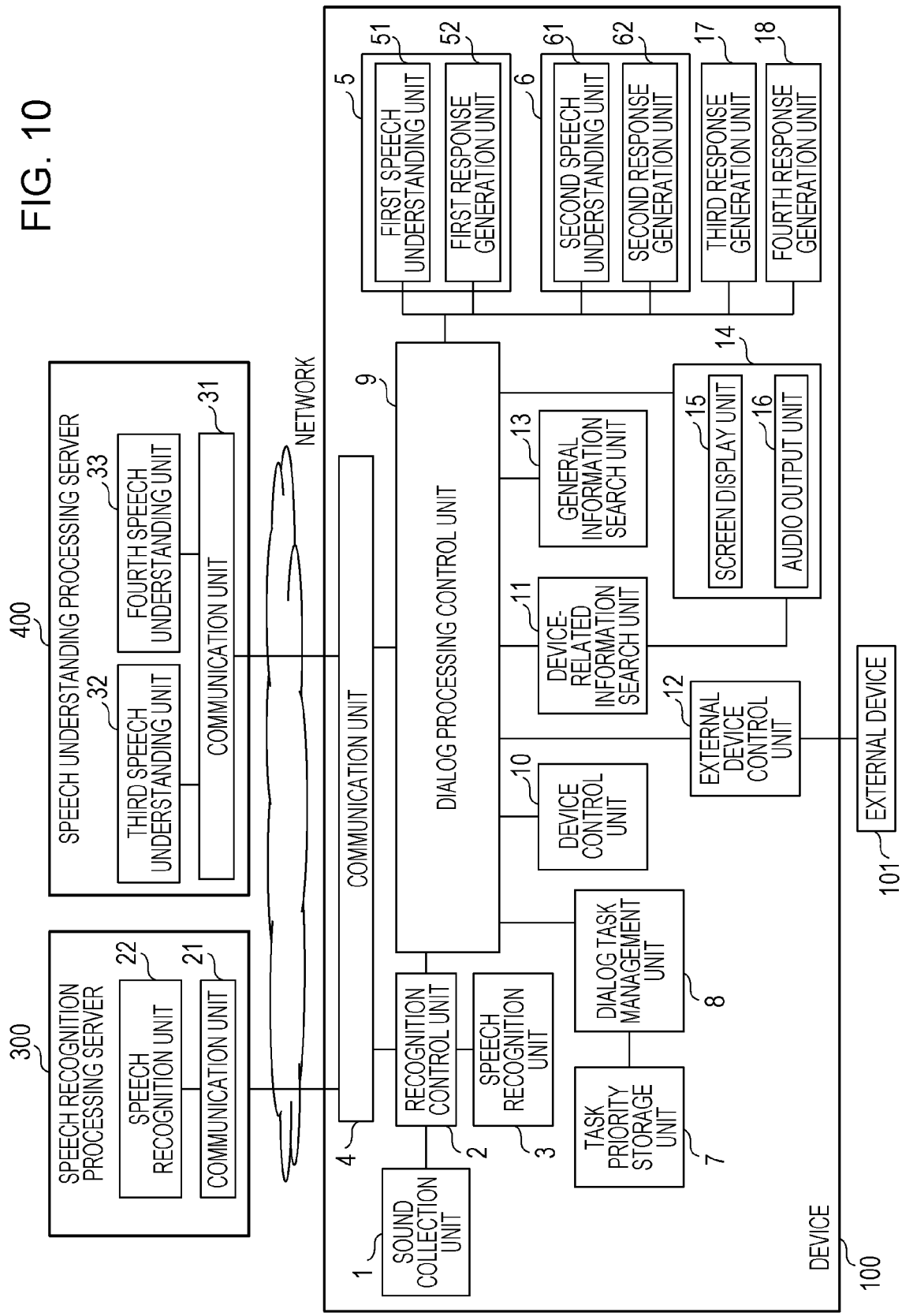
FIG. 10 is a block diagram of a dialog processing control system according to a third embodiment.

FIG. 10 is a block diagram illustrating the configuration of a dialog processing control system according to a third embodiment. The dialog processing control system includes a device 100 that is the object of operation by speech, an external device 101 connected by network to the device 100, by a wired LAN, wireless LAN, or the like, a speech recognition processing server 300 that performs speech recognition processing in the cloud, and a speech understanding processing server 400 that performs speech understanding processing, which is part of dialog processing, in the cloud as well. For example, the device 100 is a TV, and the external device 101 is all devices connected by network to the TV. The external device 101 includes an air conditioner, lighting, white goods, and so forth, connected to the TV by ECHONET (a registered trademark), in addition to conventional AV devices such as hard disk recorders, AV amps, and so forth, connected by HDMI (a registered trademark) or LAN.

The speech recognition processing server 300 includes a communication unit 21 and a speech recognition unit 22. The communication unit 21 exchanges information such as speech, recognized text strings that are dialog processing results, and so forth, with the device 100. The speech recognition unit 22 recognizes speech uttered by the user, that has been input via the communication unit 21. The speech recognition unit 22 also transmits recognized text strings, which are the results of speech recognition, to the device 100 via the communication unit 21. The speech recognition unit 22 performs speech recognition processing in the cloud, so a vast vocabulary containing hundreds of thousands of words can be recognized in the same way as with conventional arrangements. Conventional DP matching, HMM, n-gram, and so forth may be used as methods for recognizing speech. The speech recognition processing server 300 is included in an external device.

The speech understanding processing server 400 includes a communication unit 31, a third speech understanding unit 32, and a fourth speech understanding unit 33. The communication unit 31 exchanges information such as recognized text strings, results of processing performed on the recognized text strings by the speech understanding units, and so forth, with the device 100. The speech understanding processing server 400 is included in an external device.

The third speech understanding unit 32 and fourth speech understanding unit 33 subject recognized text strings input from the device 100 via the communication unit 31 to speech understanding processing for predetermined different tasks. The third speech understanding unit 32 and fourth speech understanding unit 33 then transmit the results of the speech understanding processing to the device 100 via the communication unit 31.

In the present embodiment, the third speech understanding unit 32 processes operation tasks of the external device 101 connected to the device 100, and the fourth speech understanding unit 33 processes general information search tasks on the Internet, such as weather forecasts, news, and so forth. In this case, the third speech understanding unit 32 confirms whether the recognized text string corresponds to an operation command of the external device 101, and if corresponding, outputs information specifically indicating the content of the operation of the corresponding external device (operation content information). The fourth speech understanding unit 33 outputs information specifically indicating the content of Internet search operations (operation content information) using a search keyword extracted from the recognized text string for performing a general information search.

Note that a method for speech comprehension of the recognized text string used at the third speech understanding unit 32 generally is a method where the recognized text string is subjected to morphological analysis and then to syntax parsing, thereby converting the recognized text string into operation contents for the external device 101. However, a method where the recognized text string is simply matched with text strings representing all operation commands may be used. In the same way, a method for speech comprehension of the recognized text string used at the fourth speech understanding unit 33 generally is a method where the recognized text string is subjected to morphological analysis and then to syntax parsing, thereby extracting a search keyword from the recognized text string. However, a method where the recognized text string is simply matched with text strings representing all operation commands may be used.

The third speech understanding unit 32 includes memory (omitted from illustration) for example, the memory storing correlations between operation commands of the external device 101 and operation content information that is the result of speech understanding processing, as speech understanding rules. The third speech understanding unit 32 reads out the speech understanding rules from the memory, and performs speech understanding processing based on the speech understanding rules that have been read out. Note that it is not necessary for the third speech understanding unit 32 to include the aforementioned memory, and that it is sufficient for the speech understanding processing server 400 to include this memory. An example of speech understanding rules that the third speech understanding unit 32 uses in a case where the external device 101 is an air conditioner, for example, is illustrated in FIG. 11. An operation command is words where the user instructs the external device 101 to perform an operation, such as "turn on the air conditioner", "cool air, please", and so forth, as illustrated in FIG. 11.

The operation contents are contents of operations that the external device 101 actually performs with regard to the operation command. For example, the operation contents corresponding to the operation command "cool air, please" are "turn the power of the air conditioner on, and perform cooling operations". Multiple operation commands may be registered to each of the operation contents. For example, two phrases "turn on the air conditioner" and "start the air conditioner" are registered as to the operation contents "turn the power of the air conditioner on, and perform cooling operations" in FIG. 11.

Operation content information represents the operation content of the external device 101 to be operated as parameters, and is output as processing results of the third speech understanding unit 32. For example, in the example in FIG. 11, (Device: Air conditioner, Operation: Power on, Operation Mode: Auto) is output as the processing results of speech understanding of "turn on the air conditioner".

The speech understanding processing by the fourth speech understanding unit 33 is also performed based on speech understanding rules, in the same way. However, there is only one speech understanding rule, and the processing contents thereof are to "extract a search keyword for a general information search from a recognized text string, and search Internet information using that search keyword". The above speech understanding rule may be embedded in the fourth speech understanding unit 33 as an action that the fourth speech understanding unit 33 performs. Alternatively, the above speech understanding rule may be stored in memory in the speech understanding processing server 400, for example. In this case, the fourth speech understanding unit 33 reads the speech understanding rule out from the memory, and performs dialog processing based on the speech understanding rule that has been read out. Note that it is not necessary for the fourth speech understanding unit 33 to include the aforementioned memory, and that it is sufficient for the speech understanding processing server 400 to include this memory. Operation content information output as the results of speech understanding processing from the fourth speech understanding unit 33 represents the content of this search operation as parameters, for example. For example, in a case where the recognized text string is "weather in Tokyo", the operation content information is (Operation: Search Internet, Information: Weather. Area: Tokyo), which is output as speech understanding processing results of the fourth speech understanding unit 33.

The device 100 includes the sound collection unit 1, recognition control unit 2, speech recognition unit 3, communication unit 4, first dialog processing unit 5, second dialog processing unit 6, task priority storage unit 7, dialog task management unit 8, dialog processing control unit 9, device control unit 10, device-related information search unit 11, external device control unit 12, general information search unit 13, GUI output unit 14, screen display unit 15, audio output unit 16, a third response generation unit 17, and a fourth response generation unit 18. The first dialog processing unit 5 includes a first speech understanding unit 51 and a first response generation unit 52, and the second dialog processing unit 6 includes a second speech understanding unit 61 and a second response generation unit 62.

The configuration of the device 100 will now be described in detail. The sound collection unit 1 is a microphone that inputs speech uttered by a user, and outputs the input speech to the recognition control unit 2 as audio data. The recognition control unit 2 outputs the audio data input from the sound collection unit 1 to the speech recognition unit 3, and also outputs this audio data to the speech recognition unit 22 of the speech recognition processing server 300 via the communication unit 4. The recognition control unit 2 decides a recognized text string based on speech recognition results obtained from the speech recognition unit 3 or the speech recognition unit 22. The speech recognition unit 3 recognizes the speech uttered by the user and input from the recognition control unit 2, and outputs a recognized text string to the recognition control unit 2 as a speech recognition result. The communication unit 4 exchanges information such as audio data recognized text strings, dialog processing results, and so forth, with the speech recognition processing server 300. The communication unit 4 also exchanges information such as recognized text strings and speech understanding processing results and so forth with the speech understanding processing server 400. The speech recognition unit 3 can only recognize a small vocabulary containing around several hundred words, since speech recognition processing is performed in the device, but the response speed thereof is considerably faster than that of the speech recognition unit 22 of the speech recognition processing server 300. Conventional DP matching, HMM, n-gram, and so forth, may be used as methods for recognizing speech.

The first dialog processing unit 5 and the second dialog processing unit 6 perform dialog processing of predetermined different tasks, based on the recognized text string decided by the recognition control unit 2. In the present embodiment, the first dialog processing unit 5 processes basic operation tasks of the device 100, and the second dialog processing unit 6 processes information search tasks relating to the device 100. In this case, the first speech understanding unit 51 confirms whether a recognized text string that has been input corresponds to any of basic operation commands of the device 100, and if corresponding, outputs information specifically indicating contents of corresponding device operations (operation content information) as speech understanding processing results. Next, the first response generation unit 52 outputs control information for executing the corresponding device operations, based on the operation content information output from the first speech understanding unit 51.

Also, in the second dialog processing unit 6, the second speech understanding unit 61 extracts a search keyword from the recognized text string that has been input, and outputs information specifically indicating the contents of the search operation for device-related information using that search keyword (operation content information) as speech understanding processing results. Next, the second response generation unit 62 outputs control information for executing the search operation for device-related information, based on the operation content information output from the second speech understanding unit 61. The first response generation unit 52 and second response generation unit 62 further output response information for presenting the results of dialog processing to the user, besides each outputting control information.

Note that a method for speech comprehension of the recognized text string used at the first speech understanding unit 51 generally is a method where the recognized text string is subjected to morphological analysis and then to syntax parsing, thereby converting the recognized text string into operation contents for the device 100. However, a method where the recognized text string is simply matched with text strings representing all operation commands may be used. In the same way, a method for speech comprehension of the recognized text string used at the second speech understanding unit 61 generally is a method where the recognized text string is subjected to morphological analysis and then to syntax parsing, thereby extracting a keyword for searching device-related information from the recognized text string. However, a method where the recognized text string is simply matched with text strings representing all operation commands may be used.

The first speech understanding unit 51 of the first dialog processing unit 5 includes memory, for example. Correlations between operation commands of the device 100 and operation content information that is the results of speech understanding processing are stored in this memory as speech understanding rules. FIG. 12 illustrates an example of speech understanding rules used by the first speech understanding unit 51 in a case where the device 100 is a TV. The first speech understanding unit 51 reads the speech understanding rules illustrated in FIG. 12 from the memory, for example, and performs speech understanding processing based on the speech understanding rules that have been read out. Note that it is not necessary for the first speech understanding unit 51 to include this memory; it is sufficient for the device 100 to include this memory. The operation commands are words that the user speaks to instruct the device 100 to perform operations, such as "turn on the TV", "program schedule", and so forth, as illustrated in FIG. 12.

The operation contents are the contents of the operation that the device 100 actually performs in response to the operation command. For example, the operation content corresponding to the operation command "turn on the TV" is "turn the power of the TV on". Multiple operation commands may be registered for each operation content. For example, two phrases, "raise the volume" and "volume up", are registered to the operation content "raise volume by 3 levels" in FIG. 12.

The operation content information represents the operation contents of the device 100 that is to be operated as parameters, and is output as processing results of the first speech understanding unit 51. For example, in the example in FIG. 12, (Device: TV, Operation: Power on) is output as the processing results of the speech understanding regarding "turn on the TV" as to the TV.

The first response generation unit 52 includes memory (omitted from illustration), for example. Correlations between operation content information of the device 100, and control information and response generation information of the device 100 that are the results of response generation processing, are stored in this memory as response generation rules. FIG. 13 illustrates an example of response generation rules corresponding to the speech understanding rules illustrated in FIG. 12. The first response generation unit 52 reads the response generation rules illustrated in FIG. 13 from the memory, for example, and performs response generation processing based on the response generation rules that have been read out. Note that it is not necessary for the first response generation unit 52 to include this memory; it is sufficient for the device 100 to include this memory. The operation content information is the same as the speech understanding rules in FIG. 12, as can be seen from FIG. 13, representing the operation contents of the device 100 to be operated as parameters.

Control information is device control commands to cause the device 100 that is the object of operation to execute the operation contents, and is information input to the device control unit 10. For example, in a case of causing the TV to execute the operation content "turn on the TV" in the example in FIG. 13, a device control command (TV, On) is input to the device control unit 10.

Response information is information presented to the user using audio and a screen when a recognized text string is accepted as an operation command illustrated in FIG. 13. For example, in a case where a recognized text string is accepted as the operation command "turn on the TV" illustrated in FIG. 12, the response information "turning on TV" in FIG. 13 is presented to the user.

The speech understanding processing by the second speech understanding unit 61 of the second dialog processing unit 6 is also performed based on speech understanding rules, in the same way. However, there is only one speech understanding rule, and the processing contents thereof are to "extract a search keyword from a recognized text string, and search device-related information using that search keyword". The above speech understanding rule may be embedded in the second speech understanding unit 61 as an action that the second speech understanding unit 61 performs. Alternatively, the second speech understanding unit 61 may include memory (omitted from illustration), with the above speech understanding rule being stored in this memory. In this case, the second speech understanding unit 61 reads the speech understanding rule out from the memory, and performs dialog processing based on the dialog rule that has been read out. Note that it is not necessary for the second speech understanding unit 61 to include the aforementioned memory, and that it is sufficient for the device 100 to include this memory. If the device 100 is a TV and the device-related information is program information of a program schedule, for example, the contents of processing are to "extract a search keyword from a recognized text string to search for program information in the recognized text string, and search for program information from the program schedule using that search keyword". The operation content information represents the contents of this search operation as parameters, and is output as results of speech understanding processing by the second speech understanding unit 61. For example, in a case where the recognized text string is "dramas on tomorrow", (Operation: Search EPG, Day: Tomorrow, Genre: Drama) is output as the results of speech understanding processing.

The response generation processing by the second response generation unit 62 is also performed based on response generation rules. However, there is only one response generation rule, and the processing contents thereof are to "generate control information and response information for executing search of device-related information, based on operation content information". The above response generation rule may be embedded in the second response generation unit 62 as an action that the second response generation unit 62 performs. Alternatively, the second response generation unit 62 may include memory (omitted from illustration), with the above response generation rule being stored in this memory. In this case, the second response generation unit 62 reads the response generation rule out from the memory, and performs response generation processing based on the response generation rule that has been read out. Note that it is not necessary for the second response generation unit 62 to include the aforementioned memory, and that it is sufficient for the device 100 to include this memory. If the device 100 is a TV and the device-related information is program information of a program schedule, for example, the control information output as the results of response generation processing from the second response generation unit 62 is a device control command to cause the device-related information search unit 11 of the device 100 to search for program information from the program schedule using a search keyword extracted from the recognized text string, and the response information is "displaying search results of program schedule on screen" or the like.

The third response generation unit 17 performs response generation processing for predetermined tasks, based on the results of speech understanding processing by the third speech understanding unit 32 of the speech understanding processing server 400. As described earlier, the third speech understanding unit 32 processes operation tasks of the external device 101 and the third response generation unit 17 processes operation tasks of the external device 101 in the present embodiment. That is to say, the third response generation unit 17 outputs control information for executing operation of a corresponding external device based on the operation content information output from the third speech understanding unit 32. The third response generation unit 17 also outputs response information for presenting the user with results of the speech understanding processing, besides control information.

The third response generation unit 17 includes memory (omitted from illustration), for example. Correlations between operation content information of the external device 101, and control information and response information that are the results of response generation processing are stored in this memory as response generation rules. FIG. 14 illustrates an example of response generation rules corresponding to the speech understanding rules illustrated in FIG. 11. The third response generation unit 17 reads out the response generation rules illustrated in FIG. 14 from the memory, for example, and performs response generation processing based on the response generation rules that have been read out. Note that it is not necessary for the third response generation unit 17 to include this memory; it is sufficient for the device 100 to include this memory. The operation content information is the same as the speech understanding rules in FIG. 11, representing the operation contents of the external device 101 to be operated as parameters, as illustrated in FIG. 14.

The control information is a network command to cause the external device 101 that is the object of operation to execute the operation contents, and is transmitted from the device 100 to the external device 101 via network. For example, in a case of causing the air conditioner to execute the operation content of "turn on the air conditioner" in the example in FIG. 14 (e.g., in a case where the operation content information is "Device: Air Conditioner, Operation: Power On, Operation Mode: Auto"), the network command (Air Conditioner, On, Auto) is transmitted from the device 100 to the external device 101.

The response information is information presented to the user using audio or a screen in a case where a recognized text string has been accepted as an operation command illustrated in FIG. 11. For example, in a case where a recognized text string is accepted as the operation command "cool air, please" illustrated in FIG. 11, the user is presented with the response information "turning on cooler", illustrated in FIG. 14.

The fourth response generation unit 18 performs response generation processing for predetermined tasks, based on the results of speech understanding processing by the fourth speech understanding unit 33 of the speech understanding processing server 400. As described earlier, the fourth speech understanding unit 33 processes general information search tasks in the Internet, such as weather forecasts, news, and so forth, in the present embodiment. That is to say, the fourth response generation unit 18 outputs control information for searching Interned information using a keyword extracted from a recognized text string to the general information search unit 13 of the device 100, based on operation content information output from the fourth speech understanding unit 33. The fourth response generation unit 18 also outputs response information for presenting the user with results of the speech understanding processing, besides control information.

The response generation processing by the fourth response generation unit 18 is also performed based on response generation rules. However, there is only one response generation rule, and the processing contents thereof are to "generate control information and response information for performing a general information search on the Internet, based on operation content information". The above response generation rule may be embedded in the fourth response generation unit 18 as an action that the fourth response generation unit 18 performs. Alternatively, the fourth response generation unit 18 may include memory (omitted from illustration), with the above response generation rule being stored in this memory. In this case, the fourth response generation unit 18 reads the response generation rule out from the memory, and performs response generation processing based on the response generation rule that has been read out. Note that it is not necessary for the fourth response generation unit 18 to include the aforementioned memory, and that it is sufficient for the device 100 to include this memory. Control information output from the fourth response generation unit 18 as the result of response generation processing is a network command to cause the general information search unit 13 of the device 100 to search Internet information by a search keyword extracted from the recognized text string. The response information is "displaying search results on screen" or the like.

The task priority storage unit 7 stores the priorities of tasks processed by the first dialog processing unit 5 and second dialog processing unit 6 of the device 100, the third speech understanding unit 32 of the speech understanding processing server 400 and the third response generation unit 17 of the device 100, and the fourth speech understanding unit 33 of the speech understanding processing server 400 and the fourth response generation unit 18 of the device 100. In the present embodiment, the priority of basic operation tasks of the device 100 is set to "1", the priority of search tasks for device-related information to "3", the priority of external device operation tasks to "2", and the priority of general information search tasks using the Internet to "4", for example. Note that the smaller the priority number is, the higher the priority is.

The dialog task management unit 8 decides action schedules for the first dialog processing unit 5, second dialog processing unit 6, third response generation unit 17, and fourth response generation unit 18, of the device 100, and the third speech understanding unit 32 and fourth speech understanding unit 33 of the speech understanding processing server 400, based on the priority of the tasks stored in the task priority storage unit 7. Now, an action schedule for the dialog processing units, and the speech understanding processing units that are components thereof, defines how, and in which order, the dialog processing units (e.g., the first dialog processing unit 5, second dialog processing unit 6, third response generation unit 17, fourth response generation unit 18, third speech understanding unit 32, and fourth speech understanding unit 33) are to operate. For example, the information of the order in which the processing units are to operate,
    the timing to start action of the processing units, and
    the timing to execute processing results of the processing units, is described in the action schedule illustrated in FIG. 15.

For example, the timing to start operation of the dialog processing units or speech understanding processing units means the timing at which the recognized text string is input to the dialog processing units, or the speech understanding units of the speech understanding processing server 400. Also, the timing to execute processing results of the dialog processing units or speech understanding processing units means the timing at which control signals to execute the processing results of the dialog processing units are output to the components that actually execute the processing results, such as the device control unit 10, device-related information search unit 11, external device control unit 12, and general information search unit 13, for example.

For example, the timing at which the processing results of the first dialog processing unit 5 are executed is the timing of executing a basic operation task of the device 100. The timing at which the processing results of the second dialog processing unit 6 are executed is the timing of executing a device-related information search task. In the same way, the timing at which the processing results of the third dialog processing unit 17 are executed is the timing of executing an operation task of the external device 101, and the timing at which the processing results of the fourth dialog processing unit 18 are executed is the timing of executing a general Internet information search task.

The dialog processing control unit 9 controls the actions of the first dialog processing unit 5, second dialog processing unit 6, third response generation unit 17, and fourth response generation unit 18, of the device 100, based on the action schedule decided at the dialog task management unit 8. The dialog processing control unit 9 also controls the actions of the third speech understanding unit 32 and fourth speech understanding unit 33 of the speech understanding processing server 400 via the communication units 4 and 31.

Specifically, the dialog processing control unit 9 performs processing of inputting recognized text strings to each of the dialog processing units and the speech understanding units of the speech understanding processing server 400 based on the action schedule, and causing speech understanding processing to start. The dialog processing control unit 9 also performs processing of outputting processing results obtained from the response generation units to one of the device control unit 10, device-related information search unit 11, external device control unit 12, and general information search unit 13, based on the action schedule. For example, control information for operating the device 100, which has been obtained from the first response generation unit 52 of the first dialog processing unit 5 of the device 100, is output to the device control unit 10. Control information obtained from the second response generation unit 62 of the second dialog processing unit 6 of the device 100, for executing a device-related information search, is output to the device-related information search unit 11. Control information for operating the external device 101, which has been obtained from the third response generation unit 17, is output to the external device control unit 12. Control information for executing a general Internet information search, which has been obtained from the fourth response generation unit 18, is output to the general information search unit 13. The device control unit 10, device-related information search unit 11, external device control unit 12, and general information search unit 13 each correspond to an execution unit.

The device control unit 10 executes operations of the device 100 based on the control information input from the dialog processing control unit 9. The device-related information search unit 11 executes a device-related information search based on the control information input from the dialog processing control unit 9. The external device control unit 12 executes operation of external devices based on control information input from the dialog processing control unit 9. The general information search unit 13 executes a generate Internet information search task based on control information input from the dialog processing control unit 9.

The GUI output unit 14 has the screen display unit 15 that is a display or the like, and the audio output unit 16 that is a speaker or the like. The screen display unit 15 displays operation results of the device 100 executed by the device control unit 10, operation results of the external device 101 executed by the external device control unit 12, search results of device-related information search for by the device-related information search unit 11, and search results for general Internet information search for by the general information search unit 13. A notification sound is output at the same time from the audio output unit 16, synchronously with the screen display.

The screen display unit 15 also outputs on a screen the response information obtained from the response generation units 52, 62, 17, and 18, via the dialog processing control unit 9. In the same way, the audio output unit 16 performs voice synthesis for the response information obtained from the response generation units 52, 62, 17, and 18, and outputs as response audio.

Actions performed by the system in a case where a user utters speech commands related to tasks, to perform the dialog tasks, in the dialog processing control system according to the present embodiment, will be described. A specific description will be made by way of an example where the device 100 is a TV and the external device 101 is an air conditioner. In the following description, the TV that is an example of the device 100 will be described as "TV 100", and the air conditioner that is an example of the external device 101 will be described as "air conditioner 101". Accordingly, the tasks of the first dialog processing unit 5 are basic operation tasks such as channel selection, volume adjustment, and so forth, of the TV, the speech understanding rules and response generation rules thereof being illustrated in FIGS. 12 and 13, respectively. The tasks of the second dialog processing unit 6 are program information searching in a program schedule. The tasks of the third speech understanding unit 32 of the speech understanding processing server 400 and the third response generation unit 17 of the device 100 are device operation tasks such as power operation, temperature setting, and so forth, of the air conditioner, the speech understanding rules and response generation rules thereof being illustrated in FIGS. 11 and 14. The tasks of the fourth speech understanding unit 33 of the speech understanding server 400 and the fourth response generation unit 18 of the device 100 are searching tasks of general Internet information, such as weather forecast, news, and so forth.

In a case where the user performs speech control of the TV 100 or air conditioner 101 in the above-described dialog processing control system, the user utters a speech command toward the sound collection unit 1 of the TV 100. For example, in a case where the user wants to operate the volume of the TV, the user may say "raise the volume", or may say "lower the temperature" to lower the temperature set to the air conditioner. In the same way, in a case of performing an information search by voice, if the user wants to search for titles of TV dramas that will be broadcast tomorrow from the TV schedule, for example, the user may say "dramas on tomorrow" or the like, or may say "weather tomorrow" or the like to search for weather forecasts from the Internet.

Figure 16:
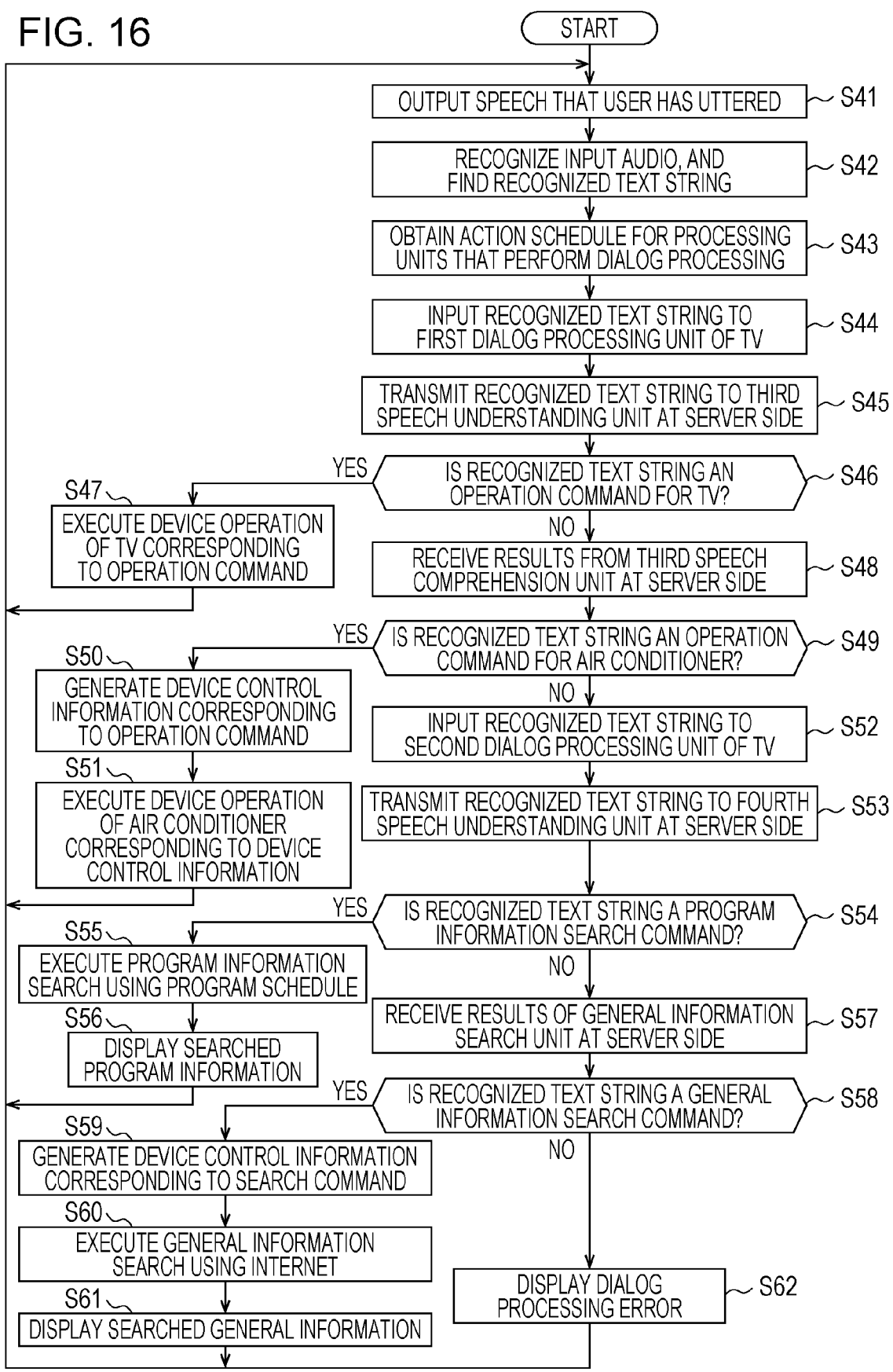
FIG. 16 is a flowchart for describing operations of the dialog processing control system according to the third embodiment.

FIG. 16 is a flowchart illustrating the flow of processing when the user inputs a speech command to the sound collection unit 1 of the TV 100. The flow of actions of the dialog processing control system will be described below with reference to FIG. 16.

The sound collection unit 1 of the TV 100 collects the voice of the user, and outputs audio data including the collected voice to the recognition control unit 2 (S41). The recognition control unit 2 causes the speech recognition unit 3 of the TV 100 and the speech recognition unit 22 of the speech recognition processing server 300 to subject the audio data input from the sound collection unit 1 to speech recognition processing, and finds a recognized text string based on the speech recognition results (S42). Specifically, the following series of actions is performed.

The recognition control unit 2 outputs the audio data input from the sound collection unit 1 to the speech recognition unit 3. At the same time, the recognition control unit 2 also outputs the audio data input from the sound collection unit 1 from the communication unit 4 to the speech recognition unit 22 of the speech recognition processing server 300 via the communication unit 21 of the speech recognition processing server 300.

The speech recognition unit 3 performs speech recognition on the input audio data, and outputs a speech recognition result thereof to the recognition control unit 2. In the same way, the speech recognition unit 22 of the speech recognition processing server 300 performs speech recognition on the input audio data, and outputs a speech recognition result thereof to the recognition control unit 2 from the communication unit 21 of the speech recognition processing server 300 via the communication unit 4 of the TV 100. Normally, the speech recognition result from the speech recognition unit 3 of the device 100 are obtained before the speech recognition result from the speech recognition unit 22 of the speech recognition processing server 300, so the recognition control unit 2 first confirms the speech recognition result of the speech recognition unit 3. If the speech recognition unit 3 has succeeded in recognition, the recognition control unit 2 outputs a text string that is the speech recognition result to the dialog processing control unit 9. If the speech recognition unit 3 fails in recognition, the recognition control unit 2 then confirms the speech recognition result from the speech recognition unit 22 of the speech recognition processing server 300. IF the speech recognition unit 22 succeeds in recognition, the recognition control unit 2 outputs a text string that is the speech recognition result to the dialog processing control unit 9. If this recognition fails as well, the recognition control unit 2 presents the user with information to the effect that recognition has failed, using the screen display unit 15 and/or audio output unit 16 of the GUI output unit 14, and prompts the user to speak again.

Upon receiving a recognized text string from the recognition control unit 2, the dialog processing control unit 9 obtains the action schedules of the processing units that perform dialog processing from the dialog task management unit 8 (S43). That is to say, the dialog processing control unit 9 obtains the action schedules of each of the first dialog processing unit 5, second dialog processing unit 6, third response generation unit 17, fourth response generation unit 18, and third speech understanding unit 32 and fourth speech understanding unit 33 of the speech understanding processing server 400. Note that as described earlier, the action schedules are decided beforehand by the dialog task management unit 8, based on the priority of the dialog processing tasks stored in the task priority storage unit 7, and are information stipulating the actions of the first dialog processing unit 5, second dialog processing unit 6, third response generation unit 17, fourth response generation unit 18, and third speech understanding unit 32 and fourth speech understanding unit 33, such as illustrated in FIG. 15, for example. The following actions will be described here with reference to the action schedule in FIG. 15.

The dialog processing control unit 9 first inputs the recognized text string obtained from the recognition control unit 2 to the first dialog processing unit 5 of the TV 100, following the obtained action schedule (S44). The dialog processing control unit 9 also transmits the recognized text string from the communication unit 4 of the TV 100 to the communication unit 31 of the speech understanding processing server 400 at almost the same time, to be input to the third speech understanding unit 32 of the speech understanding processing server 400 (S45).

The first dialog processing unit 5 performs dialog processing of basic operation tasks of the TV 100, and outputs the processing results thereof to the dialog processing control unit 9. The operations of the first dialog processing unit 5 will be described in detail. First, the recognized text string is input to the first speech understanding unit 51, where speech understanding processing is performed. Processing of the first speech understanding unit 51 is performed based on the speech understanding rules illustrated in FIG. 12, as described earlier. That is to say, the first speech understanding unit 51 confirms whether or not the recognized text string that has been input matches any of the device operation commands of the TV described in the speech understanding rules (S46). In a case of matching (a case of Y in S46), information specifically indicating the contents of the device operation corresponding to that operation command (operation content information) is output. The operation content information output from the first speech understanding unit 51 is input to the first response generation unit 52, and response generation processing is performed. The processing of the first response generation unit 52 is performed based on the response generation rules illustrated in FIG. 13, as described earlier. That is to say, the first response generation unit 52 reads out the control information and response information corresponding to the input operation content information, and outputs to the dialog processing control unit 9. On the other hand, in a case of the input recognized text string not matching a device operation command (a case of N in S46), the first speech understanding unit 51 determines that the input recognized text string is not a basic operation command for the TV 100, and outputs speech understanding processing rejection information to the dialog processing control unit 9.

In a case where the dialog processing has succeeded at the first dialog processing unit 5, the dialog processing control unit 9 executes the device operation command for the TV 100 that is the result of the dialog processing at the first dialog processing unit 5, based on the action schedule (S47). Specifically, the dialog processing control unit 9 outputs control information obtained from the first dialog processing unit 5 to the device control unit 10, and outputs response information to the screen display unit 15 and/or audio output unit 16 of the GUI output unit 14. The device control unit 10 executes the operation of the TV 100 based on the control information input from the dialog processing control unit 9. The device control unit 10 also presents the response information input from the dialog processing control unit 9 to the user via the screen display unit 15 and/or audio output unit 16, and also presents the operation results of the TV 100 executed by the device control unit 10. The processing flow then returns to the start point (A), and stands by for the user to speak again.

The following is description of a specific example with regard to the flow of actions in dialog processing relating to basic operation tasks of the TV 100. For example, if the user utters "switch to Channel 2" to the sound collection unit 1, and the speech recognition unit 3 succeeds in speech recognition, the recognized text string "switch to Channel 2" is input to the first dialog processing unit 5 (S44). The first dialog processing unit 5 subjects the input recognized text string to dialog processing relating to basic operation tasks of the TV 100. The recognized text string "switch to Channel 2" is first input to the first speech understanding unit 51, and speech understanding processing based on the speech understanding rules in FIG. 12 is performed. The recognized text string "switch to Channel 2" matches an operation command described in the speech understanding rules in FIG. 12 (Y in S46), so the operation contents are judged to be (select Channel 2), and the corresponding operation content information (Device: TV, Operation: Select 2 channel) is output to the first response generation unit 52. Upon receiving the input of operation content information corresponding to (select Channel 2), the first response generation unit 52 reads out the corresponding control information (TV, On, Select 2 channel) and response information "switching to Channel 2" from the response generation rules in FIG. 13, which are output to the dialog processing control unit 9.

Next, the dialog processing control unit 9 outputs the received control information (TV, On, Select 2 channel) to the device control unit 10 (S47). The dialog processing control unit 9 also outputs the response information "switching to Channel 2" to the screen display unit 15 and/or the audio output unit 16. The device control unit 10 changes the channel of the TV 100 to Channel 2, based on the received control information. The screen display unit 15 and/or audio output unit 16 perform screen display and/or speech synthesis and audio output of the response information "switching to Channel 2". Thereafter, the program on Channel 2 is shown.

This so far has been description of a specific example of the flow of actions in dialog processing relating to basic operation tasks of the TV 100. Now, in a case where dialog processing at the first dialog processing unit 5 has failed, i.e., in a case where the dialog processing control unit 9 has received speech understanding processing rejection information from the first dialog processing unit 5 (a case of N in S46), the dialog processing control unit 9 receives the results of speech understanding processing transmitted from the third speech understanding unit 32 of the speech understanding processing server 400, based on the action schedule (S48).

Note that normally, dialog processing of the first dialog processing unit 5 within the device 100 is not influenced by network communication state and so forth, as the TV speech understanding processing performed at the third speech understanding unit 32 in the speech understanding processing server 400 is, and accordingly ends quickly. Accordingly, there are cases where the dialog processing control unit 9 has to wait for a while from obtaining dialog processing results of the first dialog processing unit 5 until receiving the speech understanding processing results of the third speech understanding unit 32.

The third speech understanding unit 32 of the speech understanding processing server 400 subjects the recognized text string to speech understanding processing for operation tasks of the air conditioner 101, and transmits the processing results from the communication unit 31 to the dialog processing control unit 9 of the TV 100, via the communication unit 4. The speech understanding processing of the third speech understanding unit 32 is performed based on the speech understanding rules illustrated in FIG. 11, as described earlier. Specifically, the third speech understanding unit 32 confirms whether or not the input recognized text string matches any of the operation commands for the air conditioner 101 that are described in the speech understanding rules. In a case where there is a match, information specifically indicating the content of device operations corresponding to that operation command (operation content information) is transmitted from the communication unit 31 to the dialog processing control unit 9 via the communication unit 4. The third speech understanding unit 32 reads out the control information and response information corresponding to that operation command, and outputs these to the dialog processing control unit 9. In a case where the input recognized text string does not match an operation command, the third speech understanding unit 32 determines that the input recognized text string is not an operation command for the air conditioner 101, and transmits speech understanding processing rejection information to the dialog processing control unit 9.

After having received the results of the speech understanding processing at the third speech understanding unit 32 from the speech understanding processing server 400, the dialog processing control unit 9 confirms the processing results thereof (S49). Specifically, the dialog processing control unit 9 confirms whether the received processing results are operation content information of the air conditioner 101 or speech understanding processing rejection information.

In a case where the dialog processing at the third speech understanding unit 32 has been found to be successful as a result of the confirmation, that is to say, in a case where the recognized text string is an air conditioner operation command (a case of Y in S49), the dialog processing control unit 9 outputs the operation content information received from the speech understanding processing server 400 to the third response generation unit 17. Based on the action schedule. Response generation processing is performed at the third response generation unit 17 based on the response generation rules illustrated in FIG. 14, as described earlier (S50). That is to say, the third response generation unit 17 reads out control information and response information corresponding to the input operation content information, and outputs this to the dialog processing control unit 9.

Upon receiving input of control information and response information for the air conditioner 101 from the third response generation unit 17 as the result of response generation processing, the dialog processing control unit 9 executes the device operation command for the air conditioner 101, based on the action schedule (S51). Specifically, the dialog processing control unit 9 outputs control information obtained from the third response generation unit 17 to the external device control unit 12. The dialog processing control unit 9 also outputs response information to the screen display unit 15 and/or the audio output unit 16. The external device control unit 12 executes operation of the air conditioner 101 based on the control information input from the dialog processing control unit 9. The external device control unit 12 also, via the screen display unit 15 and/or audio output unit 16, presents the response information input from the dialog processing control unit 9 to the user, and presents the operation results of the air conditioner 101 executed by the external device control unit 12 to the user. The processing flow then returns to the start point (A), and stands by for the user to speak again.

Thus, the dialog processing regarding operation tasks of the air conditioner 101 are performed in a distributed manner between the third speech understanding unit 32 of the speech understanding processing server 400 and the third response generation unit 17 of the device 100.

A specific example will be described below regarding the flow of actions of dialog processing relating to operation tasks of the air conditioner 101. For example, if the user has spoken "turn on the air conditioner" to the sound collection unit 1, and either one of the speech recognition unit 3 and speech recognition unit 22 of the speech recognition processing server 300 has succeeded in speech recognition, the recognition control unit 2 inputs the recognized text string "turn on the air conditioner" to the dialog processing control unit 9. Next, the dialog processing control unit 9 inputs the recognized text string "turn on the air conditioner" to the first dialog processing unit 5 of the TV 100 (S44). The dialog processing control unit 9 also inputs this recognized text string to the third speech understanding unit 32 of the speech understanding processing server 400 as well (S45). The first dialog processing unit 5 subjects the input recognized text string to dialog processing relating to basic operation tasks for the TV 100. The recognized text string "turn on the air conditioner" does not match any of the operation commands described in the speech understanding rules in FIG. 12, so the first dialog processing unit 5 outputs speech understanding processing rejection information to the dialog processing control unit 9 (a case of N in S46).

In parallel with the dialog processing of the first dialog processing unit 5, the third speech understanding unit 32 of the speech understanding processing server 400 subjects the input recognized text string to dialog processing relating to operation tasks of the air conditioner 101. The recognized text string "turn on the air conditioner" matches an operation command described in the speech understanding rules in FIG. 11, so the operation content is judged to be (turn on power of air conditioner, and perform automatic operation), and the third speech understanding unit 32 transmits the corresponding control information (Device: Air conditioner, Operation: Power on, Operation Mode: Auto) to the dialog processing control unit 9 of the TV 100.

After the dialog processing at the first dialog processing unit 5 of the TV 100 has been rejected, the dialog processing control unit 9 receives operation content information that is the results of the speech understanding processing at the third speech understanding unit 32 of the speech understanding processing server 400 (S48). The speech understanding processing at the third speech understanding unit 32 has been successful, i.e., the recognized text string is an operation command for the air conditioner 101 (a case of Y in S49), so the dialog processing control unit 9 outputs the received operation content information received from the speech understanding processing server 400 to the third response generation unit 17. Upon receiving input of the operation content information corresponding to (turn on power of air conditioner, and perform automatic operation), the third response generation unit 17 reads out corresponding control information (Air conditioner, On, Auto) and response information "turning on air conditioner" from the response generation rules in FIG. 14, and outputs to the dialog processing control unit 9 (S50).

Next, the dialog processing control unit 9 outputs the received control information (Air conditioner, On, Auto) to the external device control unit 12 (S51). The dialog processing control unit 9 also outputs the response information "turning on cooler" to the screen display unit 15 and/or audio output unit 16. The external device control unit 12 turns the power of the air conditioner 101 on based on the received control information, and starts automatic operation. The screen display unit 15 and/or audio output unit 16 perform screen display and/or speech synthesis and audio output of the response information "turning on air conditioner", and thereafter present the operation results of the air conditioner 101 to the user.

This so far has been description of a specific example of the flow of actions in dialog processing relating to operation tasks of the air conditioner 101. Now, in a case where speech understanding processing at the third speech understanding unit 32 has failed, i.e., in a case where the dialog processing control unit 9 has received speech understanding processing rejection information from the third speech understanding unit 32 of the speech understanding processing server 400 (a case of N in S49), the dialog processing control unit 9 inputs the recognized text string obtained from the recognition control unit 2 to the second dialog processing unit 6 of the TV 100, in accordance with the action schedule (S52). The dialog processing control unit 9 also transmits the recognized text string from the communication unit 4 of the TV 100 to the communication unit 21 of the speech understanding processing server 400 at almost the same time, to be input to the fourth speech understanding unit 33 of the speech understanding processing server 400 (S53).

The second dialog processing unit 6 performs an information search regarding the TV 100 using the recognized text string. Specifically, the second dialog processing unit 6 performs dialog processing of a program information search task using a program schedule, and outputs the processing results thereof to the dialog processing control unit 9.

The operations of the second dialog processing unit 6 will be described in detail. First, a recognized text string is input to the second speech understanding unit 61 of the second dialog processing unit 6, where speech understanding processing is performed. As described above, the dialog processing of the second speech understanding unit 61 is performed based on dialog rules. Specifically, the second speech understanding unit 61 determines whether or not the input recognized text string is a program information search command (S54). Determination methods include determining whether or not a search keyword for searching for program information, e.g., date, genre, program title, or the like, can be extracted from the recognized text string. That is to say, if a search keyword is successfully extracted, the second speech understanding unit 61 determines that this is a program information search command (a case of Y in S54), and outputs information indicating the contents of the search operation for program information from the extracted keyword (operation content information). The operation content information output from the second speech understanding unit 61 is input to the second response generation unit 62, where response generation processing is performed. The processing of the second response generation unit 62 is performed based on response generation rules, as described earlier. Specifically, the second response generation unit 62 generates control information for executing a program information search using the extracted search keyword, from the program schedule of the TV 100, based on the operation content information output from the second speech understanding unit 61, and the control information is output to the dialog processing control unit 9. Response information for presenting the results of the speech understanding processing to the user to the dialog processing control unit 9 is also output, besides control information. On the other hand, in a case of determining that the input recognized text string is not a program information search command (a case of N in S54), i.e., in a case where no search keyword for searching for program information could be extracted from the recognized text string, the second dialog processing unit 6 transmits speech understanding processing rejection information to the dialog processing control unit 9.

In a case where the dialog processing at the second dialog processing unit 6 is successful, the dialog processing control unit 9 executes a program information search using the program schedule that is the result of the dialog processing at the second dialog processing unit 6, based on the action schedule (S55). Specifically, the dialog processing control unit 9 outputs the control information obtained from the second dialog processing unit 6 to the device-related information search unit 11, and also outputs the response information to the screen display unit 15 and/or audio output unit 16 of the GUI output unit 14. The device-related information search unit 11 performs a program information search using the program schedule of the TV 100, based on control information input from the dialog processing control unit 9. The device-related information search unit 11 presents the response information input from the dialog processing control unit 9 via the screen display unit 15 and/or audio output unit 16. In a case where there are at least one or more hits for program information as a result of the program information search, the device-related information search unit 11 presents the program information that has been found to the user via the screen display unit 15 and/or audio output unit 16 (S56). The processing flow then returns to the start point (A), and stands by for the user to speak again.

The following is a specific example regarding dialog processing relating to a program information search task. For example, if the user utters "dramas on tomorrow" to the sound collection unit 1, and either of the speech recognition unit 3 and speech recognition unit 22 of the speech recognition processing server 300 succeeds in speech recognition, the recognition control unit 2 inputs the recognized text string "dramas on tomorrow" to the dialog processing control unit 9 (S44). The dialog processing control unit 9 also inputs this recognized text string to the third speech understanding unit 32 of the speech understanding server 400 as well (S45). The first dialog processing unit 5 and third speech understanding unit 32 both subject the recognized text string "dramas on tomorrow" to speech understanding processing regarding basic operation tasks for the TV 100 and operation tasks for the air conditioner 101, but there is no match with the operation commands described in the speech understanding rules in FIGS. 11 and 12, so speech understanding processing rejection information is sequentially returned to the dialog processing control unit 9 from both speech understanding processing units.

In a case of having received speech understanding processing rejection information from the third speech understanding unit 32 (a case of N in S49), the dialog processing control unit 9 inputs the recognized text string "dramas on tomorrow" to the second dialog processing unit 6 of the TV 100 (S52). The second dialog processing unit 6 subjects the recognized text string "dramas on tomorrow" that has been input to dialog processing with regard to program information search tasks. The recognized text string "dramas on tomorrow" is first input to the second speech understanding unit 61, where speech understanding processing based on speech understanding rules is performed. Specifically, the second speech understanding unit 61 determines whether or not the recognized text string is a program information search command by whether or not a search keyword d for searching for program information can be extracted from the recognized text string "dramas on tomorrow" (S54). Here, a date keyword "tomorrow" and a genre keyword "drama" for searching for program information can be extracted, so the second speech understanding unit 61 determines that the recognized text string is a program information search command (processing of Y in S54). Next, the second speech understanding unit 61 uses the extracted date keyword "tomorrow" and a genre keyword "drama" to generate operation content information (Operation: Search EPG, Day: Tomorrow, Genre: Drama), and outputs this to the second response generation unit 62. Upon the above operation content information for searching for "dramas on tomorrow" being input, the second response generation unit 62 performs response generation processing based on response generation rules. Specifically, the second response generation unit 62 generates control information for executing a program information search using the extracted search keywords, from the program schedule of the TV 100 based on the operation content information, and outputs this control information to the dialog processing control unit 9. The second response generation unit 62 also outputs to the dialog processing control unit 9 response information for presenting the results of the dialog processing to the user, e.g., "searching program schedule for dramas on tomorrow".

Upon receiving the control information for performing a program information search, which is the result of the dialog processing at the second dialog processing unit 6, the dialog processing control unit 9 outputs this control information to the device-related information search unit 11 (S55). The dialog processing control unit 9 also outputs the response information "searching program schedule for dramas on tomorrow" on the screen display unit 15 and/or audio output unit 16. The screen display unit 15 and/or audio output unit 16 perform text display and/or speech synthesis and audio output of the response information "searching program schedule for dramas on tomorrow". The device-related information search unit 11 searches the program schedule of the TV 100 for program information based on the input control information for program information search, i.e., the date keyword "tomorrow" and genre keyword "drama". In a case where there are at least one or more hits for program information corresponding to the keywords as a result of the program information search, the device-related information search unit 11 presents the program information that has been found to the user via the screen display unit 15 and/or audio output unit 16 (S56).

This so far has been description of a specific example of the flow of actions in dialog processing relating to a program information search task. Now, in a case where dialog processing at the second dialog processing unit 6 has failed, i.e., in a case where the dialog processing control unit 9 has received speech understanding processing rejection information from the second dialog processing unit 6 (a case of N in S54), The dialog processing control unit 9 receives the results of the speech understanding processing transmitted from the fourth speech understanding unit 33 of the speech understanding processing server 400 based on the action schedule (S57).

The fourth speech understanding unit 33 of the speech understanding processing server 400 performs an Internet information search using the recognized text string, specifically speech understanding processing of a general information search task such as weather forecast, news, etc., and transmits the processing results thereof from the communication unit 31 to the dialog processing control unit 9 of the TV 100 via the communication unit 4. The speech understanding processing at the fourth speech understanding unit 33 is performed based on the above-described speech understanding rules. Specifically, the fourth speech understanding unit 33 determines whether or not the input recognized text string is a general information search command. Determination methods include determining whether or not a search keyword for searching for general information on the Internet, e.g., search keywords necessary for searching weather, news, maps, or the like, can be extracted from the recognized text string. That is to say, if a search keyword is successfully extracted, the fourth speech understanding unit 33 determines that this is a general information search command, and transmits information indicating the content of a general information search operation using the extracted search keyword (operation content information) from the communication unit 31 to the dialog processing control unit 9 via the communication unit 4. On the other hand, in a case of determining that the input recognized text string is not a general information search command, i.e., in a case where no search keyword for a general information search could be extracted from the recognized text string, the fourth speech understanding unit 33 transmits speech understanding processing rejection information to the dialog processing control unit 9.

The dialog processing control unit 9 receives the results of speech understanding processing at the fourth speech understanding unit 33 from the speech understanding processing server 400, and confirms the processing results (S58). Specifically, the dialog processing control unit 9 confirms whether the received processing results are information indicating content for a general information search operation (operation content information) or speech understanding processing rejection information.

In a case where the speech understanding processing at the fourth speech understanding unit 33 has been found to be successful from the confirmation, i.e., in a case where the recognized text string is determined to be a general information search command (Y in S58), the dialog processing control unit 9 outputs the operation content information received from the speech understanding processing server 400 to the fourth response generation unit 18, based on the action schedule. The fourth response generation unit 18 performs response generation processing based on response generation rules, as described earlier (S59). Specifically, the fourth response generation unit 18 generates control information for executing an Internet information search using the extracted search keyword, and outputs the control information to the dialog processing control unit 9. The fourth response generation unit 18 also outputs response information to the dialog processing control unit 9 to present the results of the speech understanding processing to the user, besides the control information.

Upon receiving input of the control information for performing a general information search from the Internet, and response information, as results of the response generation processing from the fourth response generation unit 18, the dialog processing control unit 9 executes a general information search using the Internet, based on the action schedule (S60). Specifically, the dialog processing control unit 9 outputs the control information obtained from the fourth response generation unit 18 to the general information search unit 13. The dialog processing control unit 9 also outputs the response information to the screen display unit 15 and/or audio output unit 16 of the GUI output unit 14.

The general information search unit 13 performs a general information search using the Internet, based on control information input from the dialog processing control unit 9. The general information search unit 13 also presents the response information input from the dialog processing control unit 9 via the screen display unit 15 and/or audio output unit 16. In a case where there are at least one or more hits for general information as a result of the general information search, the general information search unit 13 presents the general information that has been found to the user via the screen display unit 15 and/or audio output unit 16 (S61). The processing flow then returns to the start point (A), and stands by for the user to speak again.

The following is a specific example regarding dialog processing relating to a general information search task. For example, if the user utters "weather for Tokyo" to the sound collection unit 1, and either of the speech recognition unit 3 and speech recognition unit 22 of the speech recognition processing server 300 succeeds in speech recognition, the recognition control unit 2 inputs the recognized text string "weather for Tokyo" to the dialog processing control unit 9. Next, the dialog processing control unit 9 inputs the recognized text string "weather for Tokyo" to the first dialog processing unit 5 of the TV 100 (S44). The dialog processing control unit 9 also inputs this recognized text string to the third speech understanding unit 32 of the speech understanding processing server 400 as well (S45). The first dialog processing unit 5 and third speech understanding unit 32 both subject the recognized text string "weather for Tokyo" to speech understanding processing regarding basic operation tasks for the TV 100 and operation tasks for the air conditioner 101, but there is no match with the operation commands described in the speech understanding rules in FIGS. 11 and 12, so speech understanding processing rejection information is sequentially returned to the dialog processing control unit 9 from both speech understanding processing units.

In a case of having received speech understanding processing rejection information from the third speech understanding unit 32 (a case of N in S49), the dialog processing control unit 9 inputs the recognized text string "weather for Tokyo" to the second dialog processing unit 6 of the TV 100 (S52). The dialog processing control unit 9 also inputs this recognized text string to the fourth dialog processing unit 24 of the speech understanding processing server 400 as well (S53). The second dialog processing unit 6 subjects the recognized text string "weather for Tokyo" to dialog processing with regard to program information search tasks, but no keyword for searching for program information can be extracted from the recognized text string, so speech understanding processing rejection information is output to the dialog processing control unit 9 (processing of N in S54).

In parallel with the dialog processing at the second dialog processing unit 6, the fourth speech understanding unit 33 of the speech understanding processing server 400 subjects the input recognized text string to speech understanding processing relating to a general information search task. Specifically, the fourth speech understanding unit 33 determines whether or not the recognized text string is a general information search command, by whether or not a search keyword for performing a general information search can be extracted from the recognized text string "weather for Tokyo". Here, an area keyword "Tokyo" and information type keyword "weather" for performing a general information search can be extracted, so the fourth speech understanding unit 33 determines that the recognized text string is a general information search command. Next, fourth speech understanding unit 33 uses the area keyword "Tokyo" and information type keyword "weather" that have been extracted, to generate operation content information (Operation: Search Internet, Information: Weather. Area: Tokyo) indicating the content of the general information search operation from the Internet, and transmits this to the dialog processing control unit 9 of the TV 100.

After the dialog processing of the second dialog processing unit 6 of the TV 100 has been rejected, the dialog processing control unit 9 receives the operation content information that is the result of the speech understanding processing at the fourth speech understanding unit 33 of the speech understanding processing server 400 (S58). The speech understanding processing at the fourth speech understanding unit 33 has been successful, i.e., the recognized text string is a command for a general information search on the Internet (a case of Y in S58), so the dialog processing control unit 9 outputs the received operation content information to the fourth response generation unit 18. Upon receiving input of the above operation content information for searching for "weather for Tokyo", the fourth response generation unit 18 performs response generation processing based on response generation rules. Specifically, the fourth response generation unit 18 generates control information for executing an Internet information search using the extracted search keywords, based on the operation content information, and outputs the control information to the dialog processing control unit 9 (S59). The fourth response generation unit 18 also outputs response information to present the results of the dialog processing to the user, such as "searching Internet for weather in Tokyo" for example, to the dialog processing control unit 9.

Upon receiving the control information for performing a general information search from the Internet, which is the results of the response generation processing at the fourth response generation unit 18, the dialog processing control unit 9 outputs the control information to the general information search unit 13 (S60). The dialog processing control unit 9 also outputs the received response information "searching Internet for weather in Tokyo" to the screen display unit 15 and/or audio output unit 16.

Based on the control information for the general information search that has been input, i.e., the area keyword "Tokyo" and information type keyword "weather", the general information search unit 13 searches for information on the Internet corresponding to these keywords. In a case where there are at least one or more hits for the search keywords as a result of the information search, the general information search unit 13 presents the search results to the user via the screen display unit 15 and/or audio output unit 16 (S61).

This so far has been description of dialog processing relating to a general information search task. Now, in a case where speech understanding processing at the fourth speech understanding unit 33 has failed, i.e., in a case of receiving speech understanding processing rejection information from the fourth speech understanding unit 33 (a case of N in S58), the dialog processing control unit 9 makes a presentation to the user to the effect that all dialog processing has failed (S62). For example, the dialog processing control unit 9 presents "not able to understand what you said" or the like to the user via the screen display unit 15 and/or audio output unit 16. The processing flow then returns to the start point (A), and stands by for the user to speak again.

As described above, in the dialog processing control system according to the present embodiment, the dialog task management unit 8 decides the action schedule of the first dialog processing unit 5, second dialog processing unit 6, third response generation unit 17, and fourth response generation unit 18, of the device 100, and the third speech understanding unit 32 and fourth speech understanding unit 33 of the speech understanding processing server 400, based on the priority of each task stored in the task priority storage unit 7 beforehand. When a recognized text string, which is the result of speech recognition of an utterance by the user, is input to the dialog processing control unit 9, the dialog processing control unit 9 controls the actions of the dialog processing units and response generation units at the TV 100 side and the speech understanding processing units at the speech understanding processing server 400 side, based on the action schedule. Accordingly, each dialog processing priority can be controlled in the order according to the priority of each task, even in a case of performing in tandem dialog processing that is performed only within the TV 100, and distributed dialog processing at both the TV 100 side and server 400 side, regarding multiple different tasks with different priorities.

This will be described in detail. In the system according to the present embodiment, dialog processing relating to basic operations of the TV 100, which is a task of which the priority is first, and dialog processing relating to program information searching, which is a task of which the priority is third, are performed at the TV 100 side. Also, regarding operations of the air conditioner 101, which is a task of which the priority is second, and general information searching on the Internet, which is a task of which the priority is fourth, distributed dialog processing is performed, where speech understanding processing is performed at the speech understanding processing server 400, and response generation processing is performed at the TV 100 side. The dialog processing at the TV 100 side and the speech understanding processing at the server side are processed in parallel, almost at the same time.

In this case, even if the response of the speech understanding processing results regarding air conditioner operations from the speech understanding processing server 400 is late due to the effects of the network environment or the like, the actions of each dialog processing is controlled based on the action schedule decided from the priorities of the tasks. Accordingly, the results of dialog processing priority relating to operations of the air conditioner 101 having high priority and performed in a distributed manner at the speech understanding processing server 400 and TV 100 can be executed first, rather than the results of dialog processing relating to the program information searched at the device 100 side having low priority.

That is to say, in a case where speech understanding processing in dialog processing at the server side having high priority, and dialog processing at the device side having low priority, are being processed in parallel, the processing results of dialog processing executed in a distributed manner between the server side and device can be executed in accordance with priority rather than the processing results at the device side, even if the response of processing results from the server is delayed due to the effects of the network environment or the like.

Fourth Embodiment

Figure 17:
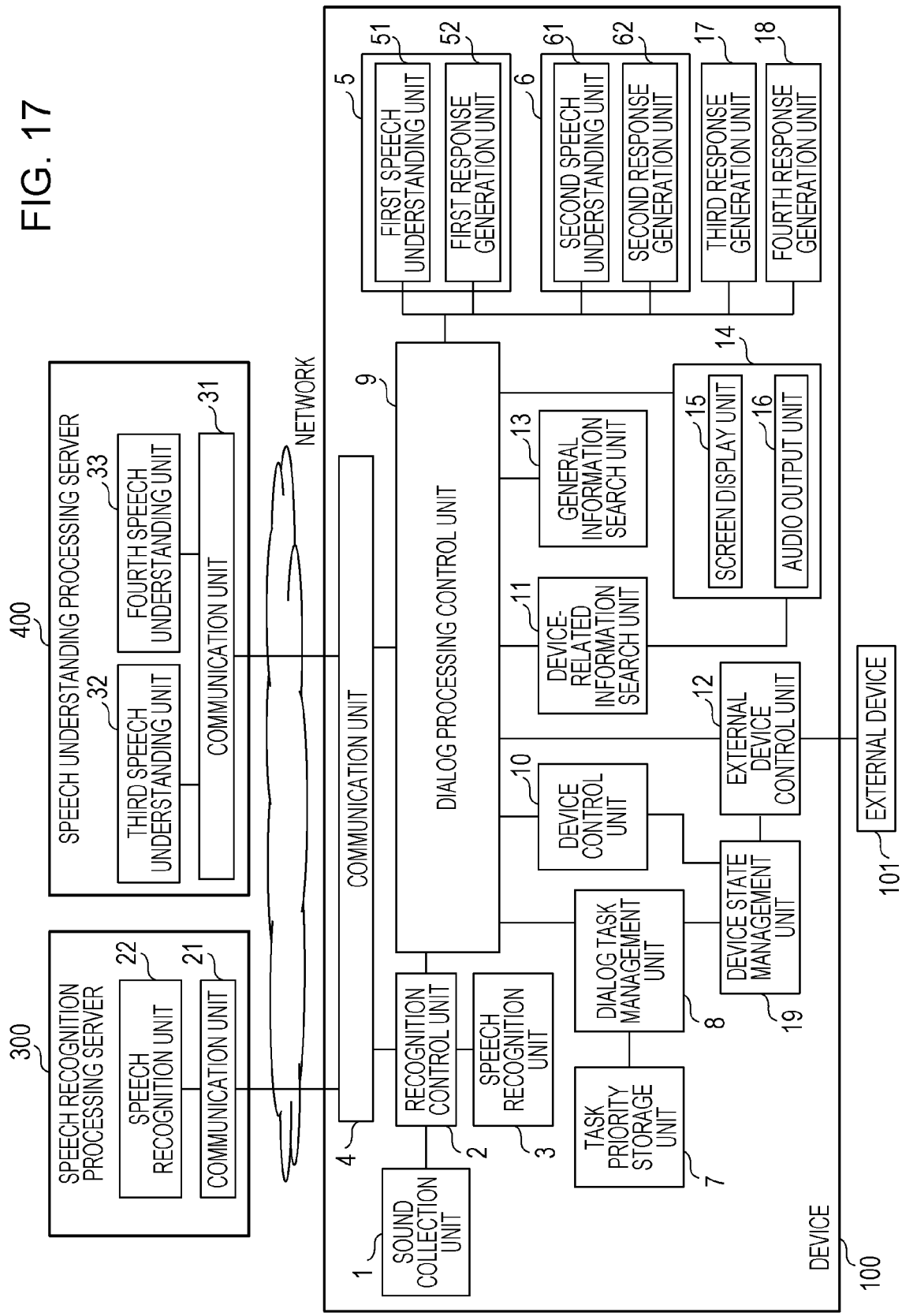
FIG. 17 is a block diagram of a dialog processing control system according to a fourth embodiment.

A modification of the dialog processing control system according to the third embodiment described above will be described in a fourth embodiment. FIG. 17 is a block diagram illustrating the configuration of the dialog processing control system according to the fourth embodiment. The dialog processing control system according to the fourth embodiment has almost the same configuration as the dialog processing control system according to the third embodiment, the only difference being that a device state management unit 19 is provided to the device 100 provided to the dialog processing control system according to the first embodiment. Accordingly, configurations in the dialog processing control system according to the fourth embodiment that are the same as those in the dialog processing control system according to the third embodiment are denoted by the same reference numerals as in the third embodiment. Only configurations that differ from the third embodiment will be described, and configurations that are the same as in the third embodiment will be omitted from description.

The device state management unit 19 newly added to the dialog processing control system according to the third embodiment manages the state of the device 100. The state of the device 100 is the state of connection to the speech recognition processing server 300 and speech understanding processing server 400, the state of the device 100 operable by the device control unit 10, and the state of the external device 101 operable by the external device control unit 12. If the device 100 is a TV for example, the state of the device operable by the device control unit 10 is the state such as the channel selected, volume, screen output, and so forth, of the TV 100. If the external device 101 is an air conditioner for example, the state of the device operable by the external device control unit 12 is the connection state of the TV and air conditioner, and the operating state of the air conditioner (power, mode, temperature settings) and so forth.

The dialog task management unit 8 decides the action schedule of the first dialog processing unit 5, second dialog processing unit 6, third response generation unit 17, and fourth response generation unit 18, of the device 100, and the third speech understanding unit 32 and fourth speech understanding unit 33 of the speech understanding processing server 400, based on the priority of each of the tasks stored in the task priority storage unit 7 and on the current state of the device 100 managed by the device state management unit 19. The action schedule for the dialog processing units, and the speech understanding units and response generation units that are components thereof defines how, and in which order, the processing units (dialog processing units, speech understanding units, response generation units), are to operate, in the same way as in the third embodiment. Thus, the point of the fourth embodiment that differs from the configuration of the third embodiment is that not only the priorities of each of the tasks stored in the task priority storage unit 7, but also the state of the device 100 managed by the device state management unit 19, is used when the dialog task management unit 8 decides the action schedule of the processing units (dialog processing units, speech understanding units, response generation units).

Now, the operations of the dialog task management unit 8, in a case of updating the action schedule of the processing units (dialog processing units, speech understanding units, response generation units) in accordance with the state of the device 100, in the dialog processing control system according to the fourth embodiment will be described. Specific description will be made below by way of an example where the device 100 is a TV and the external device 101 is an air conditioner, in the same way as in the third embodiment. In the following description, the TV that is an example of the device 100 will be described as "TV 100", and the air conditioner that is an example of the external device 101 will be described as "air conditioner 101". Accordingly, the tasks of the first dialog processing unit 5 are basic operation tasks such as channel selection, volume adjustment, and so forth, of the TV, the speech understanding rules thereof being illustrated in FIG. 12, and the response generation rules in FIG. 13. The tasks of the second dialog processing unit 6 are program information searching in a program schedule. The tasks of the third speech understanding unit 32 and third response generation unit 17 are operation tasks such as power operation, temperature setting, and so forth, of the air conditioner, the speech understanding rules thereof being illustrated in FIG. 11, and the response generation rules in FIG. 14. The tasks of the fourth speech understanding unit 33 and fourth response generation unit 18 are searching tasks of general Internet information, such as weather forecast, news, and so forth.

Figure 18:
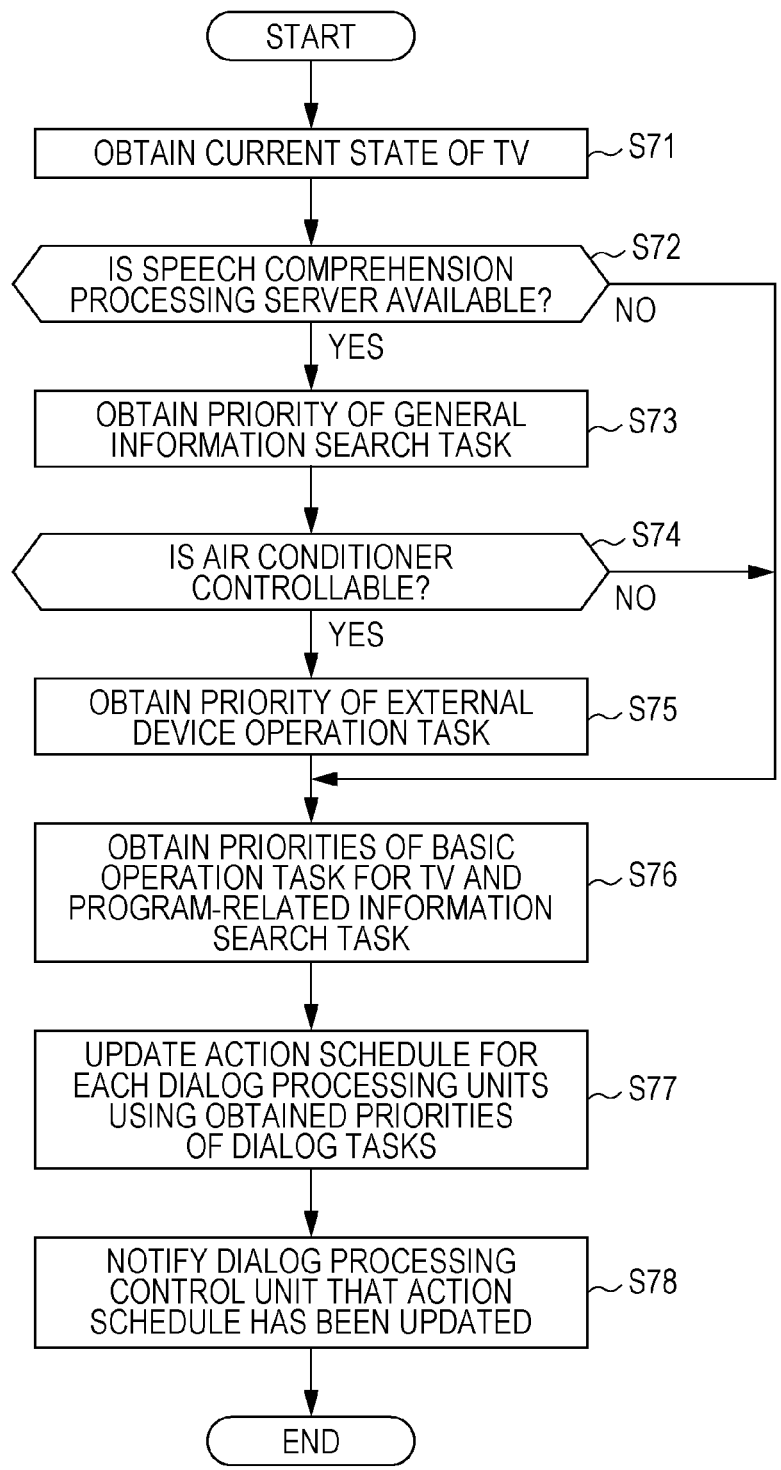
FIG. 18 is a flowchart for describing the flow of processing of a dialog task management unit according to the fourth embodiment creating action schedules for each dialog processing unit, each response generation unit, and each speech understanding unit.

FIG. 18 is a flowchart illustrating the flow of processing when the dialog task management unit 8 updates the action schedule of the dialog processing units and the speech understanding units and response generation units that are the components thereof. The operations of the dialog task management unit 8 will now be described with reference to FIG. 18.

The dialog task management unit 8 first obtains the state of the TV 100 that the device state management unit 19 is managing (S71). Next, the dialog task management unit 8 uses the state of the TV 100 that has been obtained to confirm whether or not the TV 100 is connected to the speech understanding processing server 400 by network, and is available (S72). In a case where the speech understanding processing server 400 is found to be available as the result of the confirmation (a case of Y in S72), the dialog task management unit 8 obtains, from the task priority storage unit 7, priority "4" for the general information search on the Internet that the fourth speech understanding unit 33 and fourth response generation unit 18 process (S73).

Next, in the same way, the dialog task management unit 8 uses the state of the TV 100 that has been obtained to confirm whether or not the air conditioner 101 is controllable from the TV 100 (S74). In a case where the air conditioner 101, which is an external device, is found to be controllable as the result of the confirmation (a case of Y in S74), the dialog task management unit 8 obtains, from the task priority storage unit 7, priority "2" for the operation task for the air conditioner 101 that the third speech understanding unit 32 and third response generation unit 17 process (S75), and the flow advances to S76.

On the other hand, in a case where the speech understanding processing server 400 is not available, due to a reason such as the TV 100 not being connected to the network or the system of the speech understanding processing server 400 being down (a case of N in S72), the dialog task management unit 8 does not obtain the priority of the general information search task using the Internet, and the flow advances to S76. In the same way, in a case where the air conditioner 101 cannot be controlled from the TV 100, due to a reason such as the TV 100 and air conditioner 101 not being connected by network or the air conditioner 101 malfunctioning (a case of N in S74), the dialog task management unit 8 does not obtained the priority of the task for the air conditioner 101, and the flow advances to S76.

In S76, the dialog task management unit 8 obtains the priority "1" of basic operation tasks of the TV 100 that the first dialog processing unit 5 processes, and the priority "3" of the program information search task for the TV 100 that the second dialog processing unit 6 processes, that are stored in the task priority storage unit 7.

The dialog task management unit 8 then updates the action schedule of the dialog processing units based on the priorities of the tasks obtained in accordance with the state of the TV 100 (S77).

Finally, the dialog task management unit 8 notifies the dialog processing control unit 9 that the action schedule has been updated in accordance with the state of the TV 100 (S78). This so far has been a description of the operation flow of processing where the dialog task management unit 8 updates the action schedule of the processing units (dialog processing units, speech understanding units, response generation units).

Now, the actions of the processing units (dialog processing units, speech understanding units, response generation units) are controlled by the dialog processing control unit 9 based on the action schedule updated in accordance with the state of the TV 100 in the dialog processing control system according to the fourth embodiment. Note however, that in a case where the TV 100, speech understanding processing server 400, and air conditioner 101 are correctly connected, the flow of operations of the system when the user has spoken a command is the same as that of the third embodiment illustrated in FIG. 16.

Figure 19:
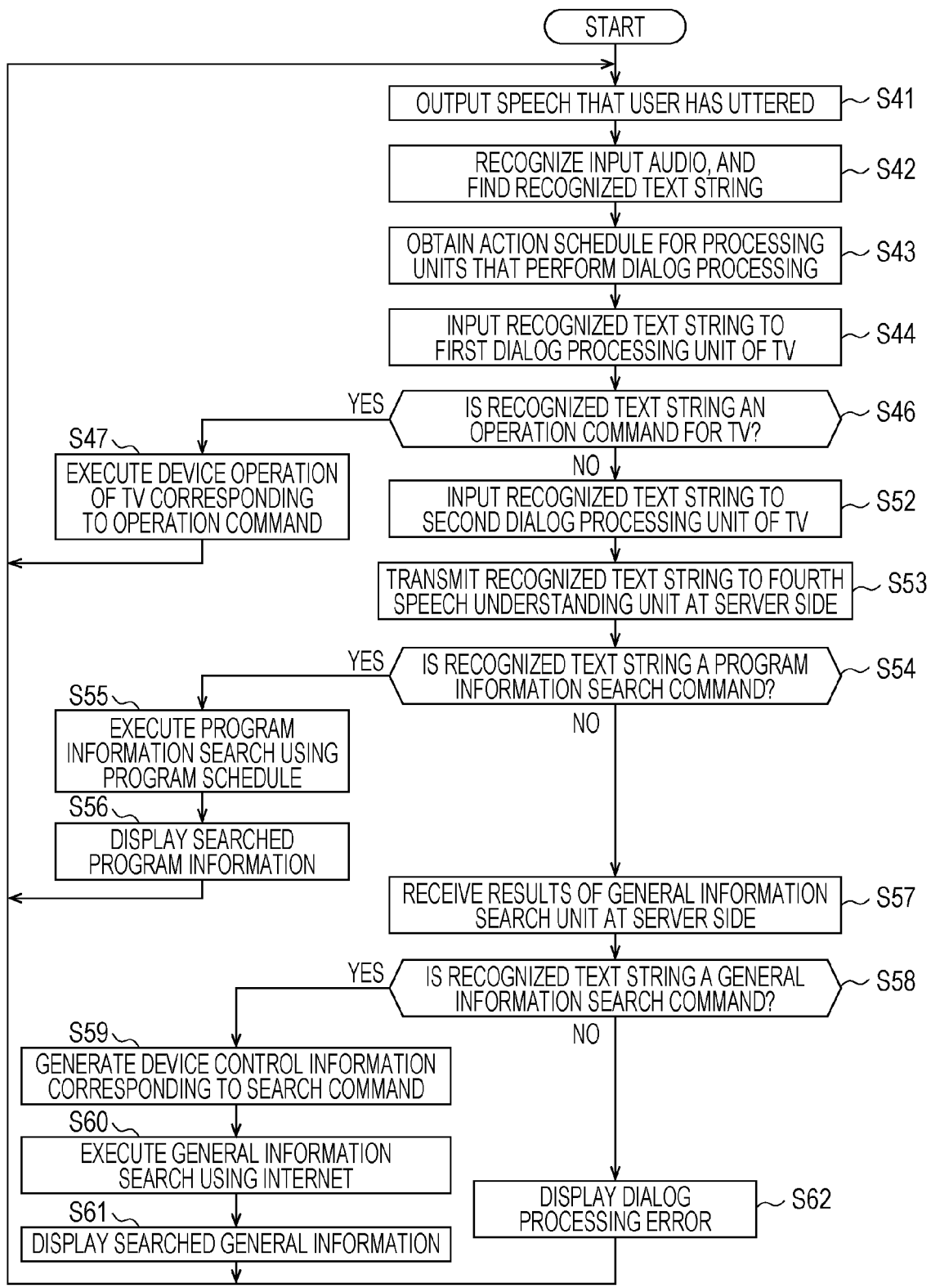
FIG. 19 is a flowchart for describing operations of the dialog processing control system in a case where a device according to the fourth embodiment cannot control an external device.

However, in a case where the speech understanding processing server 400 is available but the air conditioner 101 cannot be controlled from the TV 100, for example, the action schedule is decided based on the priorities of the basic operation tasks of the TV 100 that the first dialog processing unit 5 processes, the program information search tasks of the TV 100 that the second dialog processing unit 6 performs, and the general information search tasks by internet that the fourth speech understanding unit 33 and fourth response generation unit 18 perform in distributed dialog processing, with the task priority of the operation tasks of the external device 101 that the third speech understanding unit 32 and third response generation unit 17 perform in distributed dialog processing omitted. That is to say, the action schedule is updated by the dialog task management unit 8 such that basic operation tasks of the TV 100 are performed first, dialog processing for a program information search task is performed next, and finally dialog processing of a general information search task using the Internet is performed. Accordingly, the operation flow of the system in this case is an operation flow illustrated in FIG. 19, where dialog processing relating to the third speech understanding unit 32 and third response generation unit 17 (S45 and S48 through S51) has been omitted from the operation flow in FIG. 16.

Figure 20:
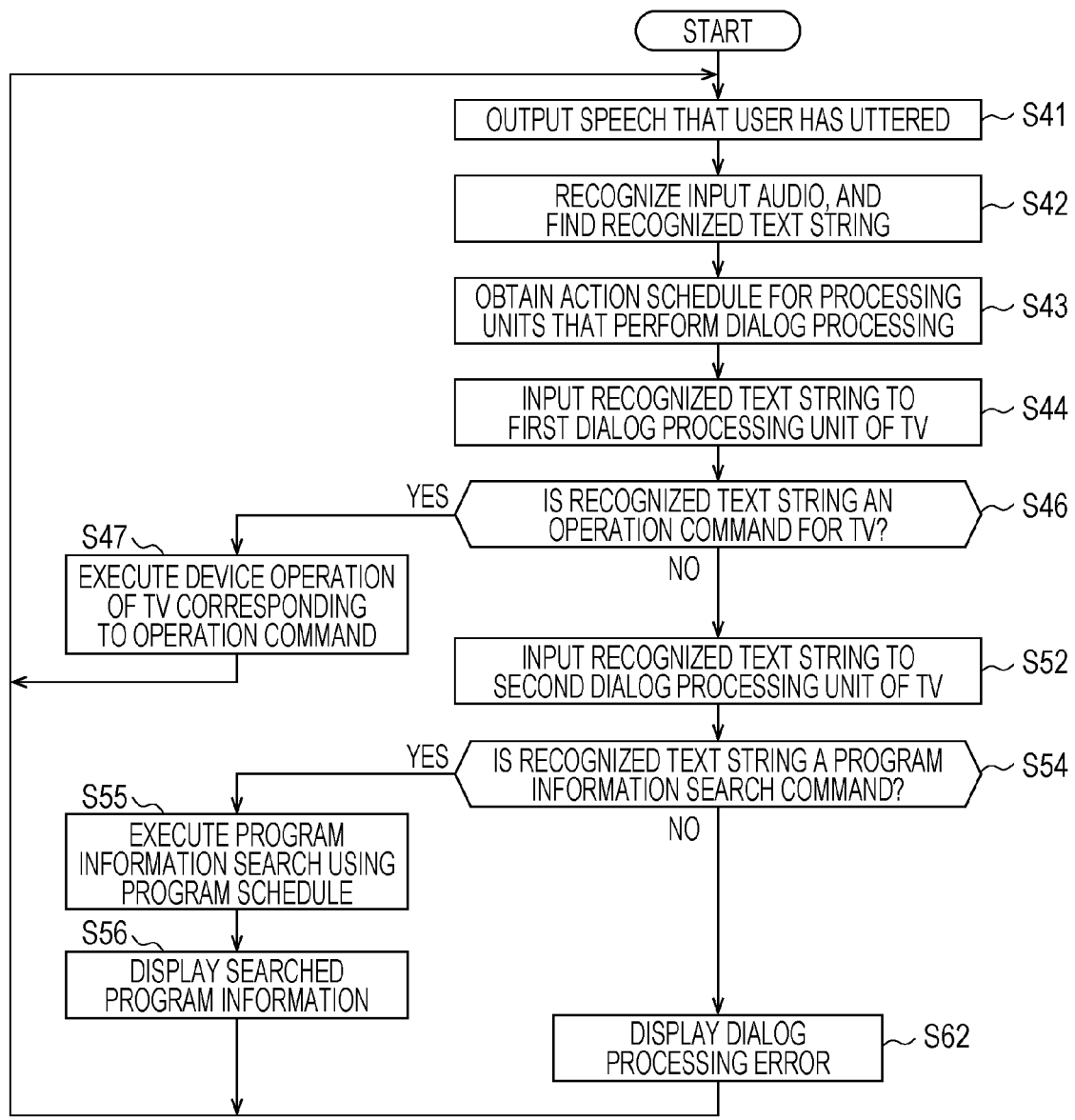
FIG. 20 is a flowchart for describing operations of the dialog processing control system in a case where the device according to the fourth embodiment cannot use a speech understanding processing server.

Also, in a case where the speech understanding processing server 400 is not available, the action schedule is decided based on the priorities of the basic operation tasks of the TV 100 that the first dialog processing unit 5 processes, and the program information search tasks of the TV 100 that the second dialog processing unit 6 performs, with the task priority of the operation tasks of the air conditioner 101 that the third speech understanding unit 32 and third response generation unit 17 perform in distributed dialog processing, and the general information search tasks by internet that the fourth speech understanding unit 33 and fourth response generation unit 18 perform in distributed dialog processing omitted. That is to say, the action schedule is updated by the dialog task management unit 8 such that dialog processing for basic operation tasks of the TV 100 is performed first, and dialog processing for a program information search task is performed next. Accordingly, the operation flow of the system in this case is an operation flow illustrated in FIG. 20, where dialog processing relating to the third speech understanding unit 32 and third response generation unit 17 of the speech understanding processing server 400 (S45 and S48 through S51) and the processing relating to the fourth speech understanding unit 33 and fourth response generation unit 18 of the speech understanding processing server 400 (S53 and S57 through S61) have been omitted from the operation flow in FIG. 16.

In the dialog processing control system according to the fourth embodiment of the present disclosure, the dialog processing control unit 9 controls the actions of the first dialog processing unit 5, second dialog processing unit 6, third response generation unit 17, and fourth response generation unit 18, of the TV 100, and the third speech understanding unit 32 and fourth speech understanding unit 33 of the speech understanding processing server 400, based on the action schedule obtained from the dialog task management unit 8, in the same way as in the third embodiment as described above. Note however, that in the fourth embodiment, the device state management unit 19 that has been newly added to the configuration of the third embodiment manages the state of the TV 100, such as the connection state with the speech understanding processing server 400, and the connection state with the air conditioner 101 and operating state of the air conditioner 101, which is an external device. The dialog task management unit 8 decides the action schedule of the first dialog processing unit 5, second dialog processing unit 6, third response generation unit 17, and fourth response generation unit 18, of the TV 100, and the third speech understanding unit 32 and fourth speech understanding unit 33 of the speech understanding processing server 400, based on the state of the TV 100, in addition to the priorities of the tasks stored in the task priority storage unit 7.

Accordingly, the action schedule of the dialog processing units and response generation units of the TV 100, and the speech understanding units of the speech understanding processing server 400, can be dynamically changed in according with the state of the TV 100, and more specifically, in accordance with the connection state with the speech understanding processing server 400, and the connection state with the air conditioner 101 and operating state of the air conditioner 101. For example, in a case where the air conditioner 101 cannot be controlled from the TV 100, the action schedule is updated by the dialog processing control unit 9 so that the dialog processing at the third speech understanding unit 32 of the speech understanding processing server 400 and the third response generation unit 17 is not performed. In the same way, in a case where the speech understanding processing server 400 is not available, the action schedule is updated so that the dialog processing at the third and fourth speech understanding units 32 and 33 and third and fourth response generation units 17 and 18 is not executed. Accordingly, the overall system can avoid needless dialog processing, i.e., optimal dialog processing can be performed, in accordance with the state of the TV 100, and the processing time of the overall system can be reduced.

Note that while the number of external devices 101 connected to the device 100 has been described as one in the above embodiments, multiple external devices (e.g., an air conditioner and a lighting fixture, etc.) may be connected. In this case, the correlation between the operation commands for the multiple external devices, and the operation content information of the multiple external devices that are the result of speech understanding processing, is described in the speech understanding rules for the third speech understanding unit 32. In the same way, the correlation between the operation content information of the multiple external devices, and the control information and response information of the multiple external devices that are the result of response generation processing, is described in the response generation rules for the third response generation unit 17. For example, in a case where the external devices are an air conditioner and a lighting fixture, operation commands for the lighting fixture, such as "turn on the light" and "turn off the light" are added to the speech understanding rules in FIG. 11. Operation content information, and control information and response information, corresponding to the above operation commands for the lighting fixtures, are also added to the response generation rules in FIG. 13. The external device control unit 12 controls the multiple external devices based on control information output from the fourth response generation unit 18.

While description has been made in the above embodiments that the tasks of the first dialog processing unit 5 are basic operations of the device 100, tasks of the second dialog processing unit 6 are information searching relating to the device 100, tasks regarding which the third speech understanding unit 32 and third response generation unit 17 perform distributed dialog processing are operation of the external device 101, and tasks regarding which the fourth speech understanding unit 33 and fourth response generation unit 18 perform distributed dialog processing are an Internet information search task, other tasks than those described above may be set, as long as the tasks of the first dialog processing unit 5 and second dialog processing unit 6 in the device 100 differ. For example, the tasks regarding which the third speech understanding unit 32 and third response generation unit 17 perform distributed dialog processing may be set to operation tasks of the device 100 other than basic operation tasks of the device 100. If the device 100 is a TV, the first dialog processing unit 5 may perform basic operation tasks such as shown in the dialog rules in FIG. 12, and the third speech understanding unit 32 may be set to perform operation tasks such as displaying subtitles, displaying help, selecting video/audio mode, and so forth, or may be set to perform operation tasks for the entire TV including basic operation tasks. Note, however, that the priorities of these task need to be stored in the task priority storage unit 7 beforehand.

In the above-described embodiments, the priority of basic operation tasks of the device 100 is set to "1", the priority of search tasks for device-related information to "3", the priority of external device operation tasks for the speech understanding processing server 400 to "2", and the priority of general information search tasks using the Internet to "4", in the task priority storage unit 7. However, other priorities than those described above may be set.

Also, while the speech understanding processing server 400 includes two speech understanding processing units (the third speech understanding unit 32 and fourth speech understanding unit 33) in the embodiments described above, it is sufficient for the speech understanding processing server 400 to have at least one or more speech understanding processing unit. However, the number of response generation units at the corresponding device 100 side needs to be the same as the number of speech understanding units.

Although the speech recognition processing server 300 and speech understanding processing server 400 have been provided in the above embodiments, thereby performing speech recognition processing and speech understanding processing at separate servers, this processing may be performed at the same server.

Further, while the device 100 has the sound collection unit 1 in the above embodiments, a separate device from the device 100, such as a remote controller, for example, may be provided. This remote controller may have the sound collection unit 1, and be arranged to transmit voice input to the sound collection unit 1 to the device 100 via wireless LAN or the like.

In the above-described embodiments, the components may be configured as dedicated hardware, or may be realized by executing a software program suitable for each component. Each component may be realized by a program execution unit such as a central processing unit (CPU) or other processor or the like reading out a software program recorded in a recording medium such as a hard disk, semiconductor memory, or the like, and executing the software program.

Further, part or all of the components making up the devices described above may be configured as a large-scale integration (LSI) circuit. A system LSI is a super-multi-functional LSI manufactured integrating multiple components on a single chip, and specifically is a computer system configured including a microprocessor, read-only memory (ROM), random access memory (RAM), and so forth. A computer program is recorded in the RAM. The system LSI realizes its functions by the microprocessor operating according to the computer program.

Part or all of the components of which the above-described devices may be configured as an integrated circuit (IC) card detachably mountable to each device or a stand-alone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

An aspect of the present disclosure may be a method of executing processing of the above-described devices, or may be a computer program which realizes the functions of the above-described devices by a computer, or may be digital signals made up of the computer program.

An aspect of the present disclosure may be the computer program or the digital signals recorded in a computer-readable recording medium, such as for example, a flexible disk, a hard disk, a compact disc (CD)-ROM, magneto-optical (MO) disc, digital versatile disc (DVD), DVD-ROM, DVD-RAM, Blu-ray (a registered trademark) Disc (BD), Universal Serial Bus (USB) memory, a memory card such as a Secure Digital (SD) Card, semiconductor memory, or the like. An aspect of the present disclosure may also be the digital signals recorded in these recording mediums.

An aspect of the present disclosure may be an arrangement where the computer program or the digital signals are transmitted over an electric communication line, wireless or cable communication line, a network of which the Internet is representative, data broadcasting, or the like.

An aspect of the present disclosure may be a computer system having a microprocessor and memory, where the memory records the computer program, and the microprocessor operates according to the computer program.

The above-described devices may also be carried out by another independent computer system, by the program or digital signals being recorded in the recording medium and being transported, or by the program or digital signals being transferred over the network or the like.

The numerals used in the above description are all only exemplary for making a detailed description of the embodiments of the present disclosure, and the present disclosure is not restricted to the exemplary numerals.

The divisions of functional blocks in the block diagrams are only exemplary. Multiple functional blocks may be realized as a single functional block, single functional blocks may be divided into a plurality, and part of functions may be transferred to other functional blocks. Multiple functional blocks having similar functions may be processed by singular hardware or software in parallel or time-division.

The order in which multiple steps included in the above method is only exemplary for making a detailed description of the embodiments of the present disclosure, and other orders that that described above may be used. Part of the above steps may be executed at the same time as (in parallel with) other steps.

While an information processing device according to one or multiple aspects has been described by way of embodiments, it is needless to say that the present description is not restricted to these embodiments. Arrangements where various modifications conceivable by one skilled in the art are made to the embodiments, and arrangements configured by combining components of different embodiments, may also be encompassed by the scope of one or multiple aspects.

The present disclosure is applicable to a device and system where a device is operated by speech.

What is claimed is:

1. An information processing device, comprising:
   a speech recognition result obtainer that obtains a speech recognition result, which is text data obtained by speech recognition processing;
   a priority obtainer that obtains priority corresponding to each of a plurality of tasks that are to be identified by a plurality of dialog processing based on the speech recognition result; and
   a dialog processing controller that controls a plurality of dialog processors to perform distributed execution of the plurality of dialog processing, mutually different from each other, based on the speech recognition result, and to identify the plurality of tasks by the distributed execution,
   wherein the plurality of dialog processors are included in the information processing device and an external device that is connected to the information processing device via network,
   wherein a dialog processor of the information processing device, being one of the plurality of dialog processors, performs one of the plurality of dialog processing based on the speech recognition result,
   wherein a dialog processor of the external device, being another one of the plurality of dialog processors, performs another one of the plurality of dialog processing based on the speech recognition result,
   wherein the dialog processing controller provides the speech recognition result to the dialog processor of the information processing device and the dialog processor of the external device at the same time to perform the distributed execution, and
   wherein the dialog processing controller provides, based on the priority, control information in accordance with a task, among the plurality of tasks, identified by the distributed execution to an executer that operates based on the control information.

2. The information processing device according to claim 1, further comprising:
   a device state manager that manages a state of a controlled device that is controlled by the executer,
   wherein the priority obtainer obtains the priority based on the state managed by the device state manager.

3. The information processing device according to claim 2,
   wherein the priority obtainer further determines whether or not the controlled device is controllable based on the state, and obtains the priority in accordance with the result of the determination,
   wherein the state is (i) a connection state indicating whether the information processing device connects to the controlled device, or (ii) an operating state indicating whether the controlled device is running, and
   wherein the priority obtainer determines that the controlled device is controllable (i) when the connection state indicates that the information processing device connects to the controlled device, or (ii) when the operating state indicates that the controlled device is running.

4. The information processing device according to claim 1,
   wherein the priority obtainer provides, to the dialog processing controller, an execution schedule of the dialog processing based on the priority, and
   wherein the dialog processing controller causes the plurality of dialog processors to perform the distributed execution, in an order based on the execution schedule.

5. The information processing device according to claim 4,
   wherein the execution schedule indicates an order in which the plurality of the dialog processing of the plurality of dialog processors are to be executed.

6. The information processing device according to claim 1, further comprising:
   a task priority storage that stores the priority,
   wherein the priority obtainer obtains the priority stored in the task priority storage, and
   wherein the one of the plurality of dialog processing based on the speech recognition result by the dialog processor of the information processing device and the other one of the plurality of dialog processing based on the speech recognition result by the dialog processor of the external device are performed in parallel.

7. The information processing device according to claim 6,
   wherein the external device includes a server that performs communication with the information processing device.

8. The information processing device according to claim 6,
   wherein each of the plurality of dialog processing includes at least speech understanding processing that generates operation content information,
   wherein the dialog processor of the external device performs the speech understanding processing, and
   wherein the dialog processor of the information processing device includes
      a speech understander that performs the speech understanding processing, and
      a response generator that generates response information and the control information based on the operation content information.

9. The information processing device according to claim 1, further comprising:
   the executer,
   wherein the executer includes an external device controller that controls the external device connected to the information processing device, based on the control information.

10. The information processing device according to claim 1, further comprising:
    the executer,
    wherein the executer includes a device controller that controls actions of the information processing device as to the user, based on the control information.

11. The information processing device according to claim 1,
    wherein, at least one of the speech recognition result obtainer, the priority obtainer and the dialog processing controller includes a processor.

12. An information processing method used in an information processing device, comprising:
    obtaining a speech recognition result, which is text data obtained by speech recognition processing;
    obtaining priority corresponding to each of a plurality of tasks that are to be identified by a plurality of dialog processing based on the speech recognition result; and
    controlling a plurality of dialog processors to perform distributed execution of the plurality of dialog processing, mutually different from each other, based on the speech recognition result, and to identify the plurality of tasks by the distributed execution, wherein the plurality of dialog processors are included in the information processing device and an external device that is connected to the information processing device via network, wherein a dialog processor of the information processing device, being one of the plurality of dialog processors, performs one of the plurality of dialog processing based on the speech recognition result, wherein a dialog processor of the external device, being another one of the plurality of dialog processors, performs another one of the plurality of dialog processing based on the speech recognition result, wherein the controlling provides the speech recognition result to the dialog processor of the information processing device and the dialog processor of the external device at the same time to perform the distributed execution, and wherein the information processing method further includes providing, based on the priority, control information in accordance with a task, among the plurality of tasks, identified by the distributed execution to an executer that operates based on the control information.

13. The information processing device according to claim 1, wherein the priority corresponding to each of the plurality of tasks relates to one of (i) a priority of a first operation task to operate the information processing device, (ii) a priority of a first search task to search information related to the information processing device, (iii) a priority of a second operation task to operate an apparatus connected to the information processing device, and (iv) a priority of a second search task to search information using internet, and wherein the priority of the first operation task, the priority of the first search task, the priority of the second operation task, and the priority of the second search task are stored in the task priority storage.

* * * * *